United States Patent
Bigott et al.

(10) Patent No.: US 10,918,112 B2
(45) Date of Patent: Feb. 16, 2021

(54) DOUGH PREPARATION APPARATUS AND METHODS

(71) Applicant: DUKE MANUFACTURING CO., St. Louis, MO (US)

(72) Inventors: James W. Bigott, Fenton, MO (US); Daryl R. Monroe, Granite City, IL (US); Scott E. Willis, Sedalia, MO (US); Phillip Tiberio, St. Charles, MO (US); Michael W. McGaha, Sedalia, MO (US); Robert J. Reese, Edwardsville, IL (US); Jeffrey A. Stafford, Godfrey, IL (US); Gregory Glen Stettes, Pacific, MO (US); Thomas E. Kieffer, St. Louis, MO (US); Kim Charles Fietsam, New Athens, IL (US)

(73) Assignee: DUKE MANUFACTURING CO., St. Louis, MO (US)

( * ) Notice: Subject to any disclaimer, the term of this patent is extended or adjusted under 35 U.S.C. 154(b) by 523 days.

(21) Appl. No.: 15/621,781

(22) Filed: Jun. 13, 2017

(65) Prior Publication Data

US 2017/0273314 A1 Sep. 28, 2017

Related U.S. Application Data

(63) Continuation-in-part of application No. 14/947,130, filed on Nov. 20, 2015, now abandoned, which is a
(Continued)

(51) Int. Cl.
*F24C 15/00* (2006.01)
*A21B 1/40* (2006.01)
(Continued)

(52) U.S. Cl.
CPC .................. *A21B 1/40* (2013.01); *A21B 1/26* (2013.01); *A21D 8/06* (2013.01); *F24C 7/08* (2013.01);
(Continued)

(58) Field of Classification Search
CPC ...... F24C 15/327; F24C 15/322; F24C 7/006; A21D 8/06; A21B 1/26
(Continued)

(56) References Cited

U.S. PATENT DOCUMENTS 2,502,172 A 3/1950 Paulsen
3,214,566 A 10/1965 Wilson
(Continued)

FOREIGN PATENT DOCUMENTS

CN 1942103 A 4/2007
DE 10245773 C1 4/2003
(Continued)

OTHER PUBLICATIONS

International Preliminary Report on Patentability in related PCT/US2014/039367 dated Dec. 3, 2015, 8 pages.
(Continued)

*Primary Examiner* — Reginald Alexander
(74) *Attorney, Agent, or Firm* — Stinson LLP

(57) ABSTRACT

Dough preparation apparatus and associated methods. The dough preparation apparatus can store and be configured to execute a plurality of dough preparation recipes. In one example, the dough preparation apparatus is configured for thawing or slacking frozen dough and conditioning the dough prior to baking. The dough preparation apparatus facilitates production of baked bread having higher and more consistent quality.

17 Claims, 53 Drawing Sheets

Related U.S. Application Data continuation of application No. PCT/US2014/039367, filed on May 23, 2014.

(60) Provisional application No. 61/826,849, filed on May 23, 2013, provisional application No. 62/349,448, filed on Jun. 13, 2016.

(51) Int. Cl.
| | |
|---|---|
| *A21D 8/06* | (2006.01) |
| *F24C 15/32* | (2006.01) |
| *F24C 7/08* | (2006.01) |
| *G05B 19/10* | (2006.01) |
| *G06F 3/0481* | (2013.01) |
| *A21B 1/26* | (2006.01) |
| *G06F 3/0482* | (2013.01) |

(52) U.S. Cl.
CPC .......... *F24C 15/322* (2013.01); *F24C 15/327* (2013.01); *G05B 19/106* (2013.01); *G06F 3/0481* (2013.01); *G06F 3/0482* (2013.01)

(58) Field of Classification Search
USPC .......... 99/470, 474, 476; 126/21 A; 219/400
See application file for complete search history.

(56) References Cited

U.S. PATENT DOCUMENTS

| | | | |
|---|---|---|---|
| 3,479,971 A | 11/1969 | Bender et al. | |
| 3,518,949 A | 7/1970 | Stock | |
| 4,026,616 A | 5/1977 | Kuehl | |
| 4,162,381 A | 7/1979 | Buck | |
| 4,179,985 A | 12/1979 | Baker et al. | |
| 4,181,613 A | 1/1980 | Welsh et al. | |
| 4,208,572 A | 6/1980 | Melgaard | |
| 4,298,341 A | 11/1981 | Nowack | |
| 4,309,584 A | 1/1982 | Terakami | |
| 4,385,075 A | 5/1983 | Brooks | |
| 4,415,799 A | 11/1983 | Tanaka et al. | |
| 4,418,261 A | 11/1983 | Jailor et al. | |
| 4,420,679 A | 12/1983 | Howe | |
| 4,491,375 A | 1/1985 | Ugalde | |
| 4,516,012 A | 5/1985 | Smith et al. | |
| 4,587,946 A | 5/1986 | Doyon et al. | |
| 4,674,402 A * | 6/1987 | Raufeisen | A21C 13/00 219/400 |
| 4,698,487 A | 10/1987 | Meister | |
| 4,700,685 A | 10/1987 | Miller | |
| 4,771,163 A | 9/1988 | Thiboutot | |
| 4,813,398 A | 3/1989 | Savage | |
| 4,817,582 A | 4/1989 | Oslin et al. | |
| 4,851,644 A | 7/1989 | Oslin et al. | |
| 4,884,626 A | 12/1989 | Filipowski | |
| 4,914,277 A | 4/1990 | Guerin et al. | |
| 4,924,072 A | 5/1990 | Oslin et al. | |
| 5,072,666 A * | 12/1991 | Hullstrung | A21B 3/04 126/21 A |
| 5,113,600 A | 5/1992 | Telchuk | |
| 5,442,994 A | 8/1995 | Parker | |
| 5,451,744 A | 9/1995 | Koopman et al. | |
| 5,463,940 A | 11/1995 | Cataldo | |
| 5,494,690 A | 2/1996 | Shelton | |
| 5,525,782 A | 6/1996 | Yoneno et al. | |
| 5,568,802 A | 10/1996 | Buday et al. | |
| 5,619,983 A | 4/1997 | Smith | |
| 5,786,568 A | 7/1998 | McKinney | |
| 5,830,353 A | 11/1998 | Henderson | |
| 5,877,477 A | 3/1999 | Petty et al. | |
| 5,918,589 A | 7/1999 | Valle et al. | |
| 5,958,271 A | 9/1999 | Westerberg et al. | |
| 6,070,517 A | 6/2000 | Helm | |
| 6,098,473 A | 8/2000 | Hafner | |
| 6,113,966 A | 9/2000 | Belongia et al. | |
| 6,196,113 B1 | 3/2001 | Yung | |
| 6,203,423 B1 | 3/2001 | Craw et al. | |
| 6,244,165 B1 | 6/2001 | Trumbley et al. | |
| 6,273,970 B1 | 8/2001 | Kopeliovich et al. | |
| 6,465,762 B1 | 10/2002 | Swayne et al. | |
| 6,555,791 B2 | 4/2003 | Lubrina et al. | |
| 6,564,699 B1 * | 5/2003 | Vincente | A21C 13/00 99/468 |
| 6,564,792 B2 | 5/2003 | Bassoli et al. | |
| 6,637,320 B2 * | 10/2003 | Grandi | A47J 39/006 165/48.1 |
| 6,656,036 B1 | 12/2003 | Quigley | |
| 6,658,995 B1 * | 12/2003 | DeYoung | A21C 13/00 165/267 |
| 6,723,970 B1 | 4/2004 | Whipple | |
| 6,727,478 B2 | 4/2004 | Rael et al. | |
| 6,730,880 B2 | 5/2004 | Smith et al. | |
| 6,766,267 B2 | 7/2004 | Floyd et al. | |
| 6,831,254 B2 | 12/2004 | Barritt | |
| 6,847,013 B2 * | 1/2005 | Audette | A21C 13/00 126/21 A |
| 6,854,457 B2 | 2/2005 | Rabas et al. | |
| 6,862,494 B2 | 3/2005 | Hu et al. | |
| 6,936,794 B2 | 8/2005 | Zhang et al. | |
| 6,943,321 B2 | 9/2005 | Carbone et al. | |
| 6,943,324 B2 | 9/2005 | Ahuja | |
| 6,987,246 B2 | 1/2006 | Hansen et al. | |
| 7,060,940 B2 | 6/2006 | Kim et al. | |
| 7,092,988 B1 | 8/2006 | Bogatin et al. | |
| 7,102,105 B2 | 9/2006 | Oh | |
| 7,117,937 B2 | 10/2006 | Clark et al. | |
| 7,141,258 B2 | 11/2006 | Hillmann | |
| 7,188,481 B2 | 3/2007 | DeYoe et al. | |
| 7,193,185 B2 | 3/2007 | Fisher | |
| 7,223,943 B2 | 5/2007 | Kohlstrung et al. | |
| 7,249,356 B1 | 7/2007 | Wilson et al. | |
| 7,325,481 B2 | 2/2008 | Helm | |
| 7,368,683 B2 | 5/2008 | Kim et al. | |
| 7,378,620 B2 | 5/2008 | Lubrina | |
| 7,461,588 B2 | 12/2008 | Head | |
| 7,488,919 B2 | 2/2009 | Gagas et al. | |
| 7,610,864 B2 | 11/2009 | LaMarche, II et al. | |
| 7,634,992 B2 | 12/2009 | Bujeau et al. | |
| 7,699,237 B2 | 4/2010 | Berkenkoetter et al. | |
| 7,704,535 B2 | 4/2010 | Zhang et al. | |
| 7,705,274 B2 | 4/2010 | Andoh et al. | |
| 7,787,964 B2 | 8/2010 | Schuette et al. | |
| 7,823,626 B2 | 11/2010 | Mueller et al. | |
| 7,867,534 B2 | 1/2011 | Sells et al. | |
| 7,875,834 B2 | 1/2011 | Bujeau et al. | |
| 8,006,685 B2 | 8/2011 | Bolton et al. | |
| 8,042,532 B2 | 10/2011 | Kaneko et al. | |
| 8,087,407 B2 | 1/2012 | Wiker et al. | |
| 8,193,470 B1 | 6/2012 | Harlamert | |
| 8,378,265 B2 | 2/2013 | Greenwood et al. | |
| 8,399,812 B2 | 3/2013 | Thorneywork et al. | |
| 8,555,206 B2 | 10/2013 | Pederson et al. | |
| 8,600,539 B2 | 12/2013 | Yoneda | |
| 8,612,042 B2 | 12/2013 | Pettus et al. | |
| 8,616,026 B2 | 12/2013 | Yoon et al. | |
| 8,674,270 B2 | 3/2014 | Anderson et al. | |
| 8,783,051 B2 * | 7/2014 | Kundapur | H05K 7/20736 62/259.2 |
| 8,851,061 B2 | 10/2014 | Johnson | |
| 9,157,640 B2 | 10/2015 | Distaso et al. | |
| 9,357,787 B2 | 6/2016 | Deming et al. | |
| 9,936,706 B2 | 4/2018 | Deming et al. | |
| 2002/0105355 A1 | 8/2002 | Floyd et al. | |
| 2002/0179588 A1 | 12/2002 | Lubrina et al. | |
| 2003/0139843 A1 | 7/2003 | Hu et al. | |
| 2003/0146205 A1 | 8/2003 | Rael et al. | |
| 2003/0173352 A1 | 9/2003 | Patterson et al. | |
| 2003/0211215 A1 | 11/2003 | Correll et al. | |
| 2004/0131741 A1 | 7/2004 | Guilfoyle et al. | |
| 2004/0200082 A1 | 10/2004 | Dinicola | |
| 2004/0200827 A1 | 10/2004 | Bennett et al. | |
| 2004/0261632 A1 | 12/2004 | Hansen et al. | |
| 2004/0267382 A1 | 12/2004 | Cunningham et al. | |
| 2005/0051529 A1 | 3/2005 | Day et al. | |
| 2005/0074534 A1 | 4/2005 | Goedeken et al. | |

(56) References Cited

U.S. PATENT DOCUMENTS

| | | |
|---|---|---|
| 2005/0103466 A1 | 5/2005 | Landry et al. |
| 2005/0202126 A1 | 9/2005 | Zhang |
| 2005/0212233 A1 | 9/2005 | Hall |
| 2006/0043087 A1 | 3/2006 | Gagas |
| 2006/0137675 A1 | 6/2006 | Kim |
| 2006/0233939 A1 | 10/2006 | Sanders et al. |
| 2006/0266229 A1 | 11/2006 | Ribich |
| 2007/0158335 A1 | 7/2007 | Mansbery |
| 2007/0233284 A1 | 10/2007 | Schuette et al. |
| 2008/0110875 A1 | 5/2008 | Fisher |
| 2008/0149088 A1 | 6/2008 | Inada et al. |
| 2008/0171120 A1 | 7/2008 | Willett |
| 2008/0229936 A1 | 9/2008 | Kaneko |
| 2008/0236404 A1 | 10/2008 | Ose et al. |
| 2009/0018692 A1 | 1/2009 | Yoneda |
| 2009/0164933 A1 | 6/2009 | Pederson et al. |
| 2010/0139641 A1 | 6/2010 | Distaso |
| 2010/0196561 A1 | 8/2010 | Kling et al. |
| 2010/0203193 A1 | 8/2010 | Zhang et al. |
| 2010/0282097 A1 | 11/2010 | Schulte |
| 2010/0301034 A1 | 12/2010 | Greenwood et al. |
| 2011/0132346 A1 | 6/2011 | Sakane et al. |
| 2011/0151072 A1 | 6/2011 | Anderson et al. |
| 2011/0168690 A1 | 7/2011 | Tomomura et al. |
| 2011/0210144 A1 | 9/2011 | Lauer |
| 2011/0278279 A1 | 11/2011 | Giazzon et al. |
| 2012/0003364 A1 | 1/2012 | Kling et al. |
| 2012/0074121 A1 | 3/2012 | Gagas |
| 2012/0152223 A1 | 6/2012 | Sillmen et al. |
| 2012/0294992 A1 | 11/2012 | Sager |
| 2013/0036918 A1 | 2/2013 | Sakane |
| 2013/0053996 A1 | 2/2013 | Wu |
| 2013/0092145 A1 | 4/2013 | Murphy et al. |
| 2013/0152913 A1 | 6/2013 | Raghavan et al. |
| 2013/0156906 A1 | 6/2013 | Raghaven et al. |
| 2013/0156913 A1 | 6/2013 | Buttiker |
| 2013/0243923 A1 | 9/2013 | Greenwood et al. |
| 2013/0255655 A1 | 10/2013 | Johnson |
| 2013/0277353 A1 | 10/2013 | Joseph et al. |
| 2013/0284161 A1 | 10/2013 | Johnson |
| 2013/0333684 A1 | 12/2013 | Cescot et al. |
| 2014/0020670 A1 | 1/2014 | Lee et al. |
| 2014/0040830 A1 | 2/2014 | Montanye et al. |
| 2014/0048058 A1 | 2/2014 | Donarski |
| 2014/0083309 A1 | 3/2014 | Reese et al. |
| 2014/0094946 A1 | 4/2014 | Pettus et al. |
| 2014/0116267 A1 | 5/2014 | Hochschild et al. |
| 2015/0000429 A1 | 1/2015 | Deming et al. |
| 2016/0025351 A1 | 1/2016 | Koos et al. |
| 2016/0050940 A1 | 2/2016 | Gomez Jimenez et al. |
| 2016/0174574 A1 | 6/2016 | Deming et al. |

FOREIGN PATENT DOCUMENTS

| | | |
|---|---|---|
| DE | 10236961 A1 | 2/2004 |
| DE | 102007023767 A1 | 11/2008 |
| DE | 102010036639 A1 | 2/2012 |
| EP | 0732549 A2 | 9/1996 |
| EP | 1209420 A1 | 5/2002 |
| EP | 2083223 A1 | 7/2009 |
| EP | 2187133 A2 | 5/2010 |
| EP | 2 417 880 A2 | 2/2012 |
| EP | 2466211 A1 | 6/2012 |
| EP | 2472187 A1 | 7/2012 |
| EP | 2681490 B1 | 1/2014 |
| EP | 2687787 A2 | 1/2014 |
| EP | 2786659 A1 | 10/2014 |
| FR | 2797682 A1 | 2/2001 |
| FR | 2975871 A1 | 12/2012 |
| GB | 1233256 A | 5/1971 |
| GB | 2 258 126 A | 1/1993 |
| JP | H02249446 A | 10/1990 |
| JP | 0959305 A | 10/1997 |
| JP | H09264541 A | 10/1997 |
| JP | H10215754 A | 8/1998 |
| JP | H11155469 A | 6/1999 |
| JP | 2000193356 A | 7/2000 |
| JP | 2000314579 A | 11/2000 |
| JP | 2004097068 A | 4/2004 |
| JP | 2006220359 A | 8/2006 |
| JP | 2006288295 A | 10/2006 |
| JP | 2008199935 A | 9/2008 |
| JP | 2009240203 A | 10/2009 |
| JP | 2011027273 A | 2/2011 |
| KR | 20130069697 A | 6/2013 |
| WO | 92/13456 | 8/1992 |
| WO | 2006051409 A1 | 5/2006 |
| WO | 2006085317 | 8/2006 |
| WO | 2011004317 A1 | 1/2011 |
| WO | 2011026819 A2 | 3/2011 |
| WO | 2012/112704 A2 | 8/2012 |
| WO | 2012117100 A2 | 9/2012 |
| WO | 2014190274 A1 | 11/2014 |
| WO | 2015/002678 A1 | 1/2015 |
| WO | 2015164875 A1 | 12/2015 |

OTHER PUBLICATIONS

International Search Report in related PCT/US15/27815 dated Sep. 30, 2015, 4 pages.

Written Opinion in related PCT/US15/27815 dated Sep. 30, 2015, 8 pages.

Written Opinion in related PCT/US2014/039367 dated Sep. 30, 2014, 6 pages.

International Search Report in related PCT/US2014/039367 dated Sep. 30, 2014, 3 pages.

Search Report in related European Application 14801265.1 dated Feb. 28, 2017, 10 pages.

* cited by examiner

DOUGH PREPARATION APPARATUS AND METHODS

CROSS-REFERENCE TO RELATED APPLICATIONS

The present application claims priority to U.S. Provisional Patent Application No. 62/349,448, filed Jun. 13, 2016, and the present application is a continuation-in-part of U.S. patent application Ser. No. 14/947,130, filed Nov. 20, 2015, which is a continuation of PCT Patent Application No. PCT/US14/39367, filed May 23, 2014, which claims priority to U.S. Provisional Patent Application No. 61/826,849, filed May 23, 2013, all of which are hereby incorporated by reference in their entireties.

FIELD OF THE DISCLOSURE

The present disclosure generally relates to dough preparation apparatus and more particularly to apparatus for preparing dough for proofing and baking.

BACKGROUND

In many food preparation establishments, bread and other baked goods are prepared from frozen dough. Some food preparation establishments have prescribed dough preparation processes for preparing frozen dough for proofing and baking. The environmental conditions at which frozen dough is prepared for baking can affect the quality of the baked product.

SUMMARY

In one aspect, a dough preparation apparatus includes a cabinet defining a dough preparation chamber. The apparatus includes recirculation ducting for recirculating air from the dough preparation chamber back to the dough preparation chamber. The apparatus includes a fan configured to move air in the recirculation ducting from the dough preparation chamber back to the dough preparation chamber. At least one heating element or cooling element outside the recirculation ducting is configured to heat or cool air in the recirculation ducting. A dough preparation controller is configured to operate the fan and the heating or cooling element for preparing dough in the dough preparation chamber.

In another aspect, a dough preparation apparatus includes a cabinet defining a dough preparation chamber. The apparatus includes recirculation ducting for recirculating gas from the dough preparation chamber back to the dough preparation chamber. The recirculation ducting includes an outlet for supplying air from the recirculation ducting to the dough preparation chamber and includes an inlet for exhausting air from the dough preparation chamber to the recirculation ducting. The recirculation ducting includes a return duct portion extending downstream from the outlet to said inlet for bypassing the dough preparation chamber. The apparatus includes a fan configured to move air in the recirculation ducting for moving the air from the dough preparation chamber back to the dough preparation chamber. The apparatus includes at least one of a heating element or a cooling element for heating or cooling air in the recirculation ducting. A dough preparation controller is configured to operate the fan and said at least one of the heating element or cooling element for preparing dough in the dough preparation chamber.

In yet another aspect, a dough preparation apparatus includes a cabinet having first and second dough preparation chambers. The chambers have a plurality of storage locations each sized for holding a container of dough. The cabinet includes first and second doors at a front of the cabinet. The first door permits access to the first chamber, and the second door permits access to the second chamber. A temperature control system is provided for controlling the temperature in the first and second chambers. The temperature control system includes a refrigeration system configured for refrigerating the first and second chambers independently. The temperature control system includes a heating system configured for heating the first and second chambers independently. The apparatus includes a dough preparation controller operatively connected to the temperature control system. The dough preparation controller is operative to control the temperature control system to control dough preparation environments in the first and second chambers for preparing the dough. The apparatus includes a tangible storage medium storing recipes executable by the dough preparation controller for preparing the dough. The tangible storage medium stores a dough thawing or slacking recipe that, when executed by the dough preparation controller, controls the temperature control system for thawing the dough to a thawed or slacked state and for maintaining the dough in the thawed or slacked state. The thawing or slacking recipe includes a thawed or slacked dough holding temperature set point in the inclusive range of about 25 degrees F. to about 40 degrees F. for maintaining the dough in the thawed or slacked state. The tangible storage medium stores a dough conditioning recipe that, when executed by the dough preparation controller, controls the temperature control system for conditioning the thawed or slacked dough to a conditioned state and for maintaining the dough in the conditioned state, said recipe including a conditioned dough holding temperature set point higher than the thawed or slacked dough holding temperature and being in the inclusive range of about 40 degrees F. to about 60 degrees F. for maintaining the dough in the conditioned state. The apparatus includes a user interface associated with the cabinet. The user interface includes a user input and a display. The user input includes at least one actuator for receiving input from a user to selectively execute the thawing or slacking recipe and the dough conditioning recipe for preparing dough in at least one of the first or second dough preparation chambers.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
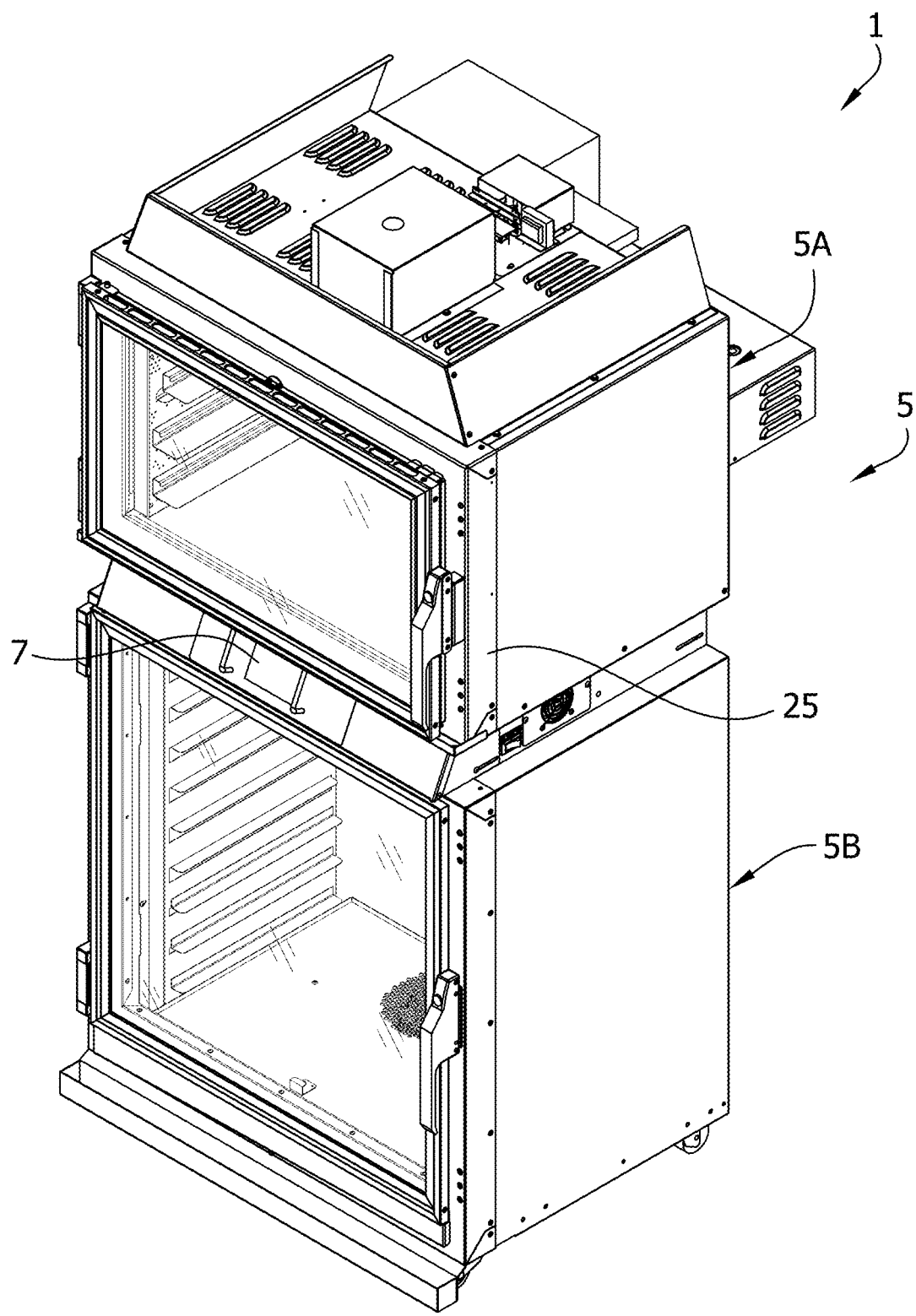
FIG. 1 is a perspective of an oven of the present invention.

Referring to the drawings, FIG. 1 illustrates one embodiment of an oven (broadly "food preparation apparatus") according to the present invention, indicated generally by the reference number 1. The oven 1 may be used for cooking or baking food products, such as bread, among other things. As will become apparent, the oven 1 has customizable, independently programmable parameters permitting precise tailoring and testing of various recipes for retarding, proofing, and/or baking dough.

The oven 1 illustrated in FIG. 1 includes a cabinet, generally designated by the reference number 5, having an upper section 5A and a lower section 5B. The oven 1 includes a user interface 7 positioned between the upper and lower sections 5A, 5B for controlling oven operation. The upper section 5A is adapted for retarding, proofing, and/or baking dough. The upper section 5A will be described in further detail hereafter, with the understanding that the lower section 5B can include its own components or components shared with the upper section configured for executing the same or different operations in the lower section as in the upper section, using a shared controller or separate controllers. Both of the sections 5A and 5B may be configured for retarding, proofing, and/or baking dough, or any combination thereof. Alternatively, for example, the lower section 5B may be adapted for retarding and/or proofing, and the upper section 5A may be adapted for proofing and/or baking. Other configurations may be used without departing from the scope of the present invention. Moreover, the cabinet 5 may include more (e.g., three, four, etc.) or fewer (e.g., one) sections without departing from the scope of the present invention. For example, the oven may comprise a single chamber (e.g., sized for receiving about 10 pans) without departing from the scope of the present invention.

Figure 2:
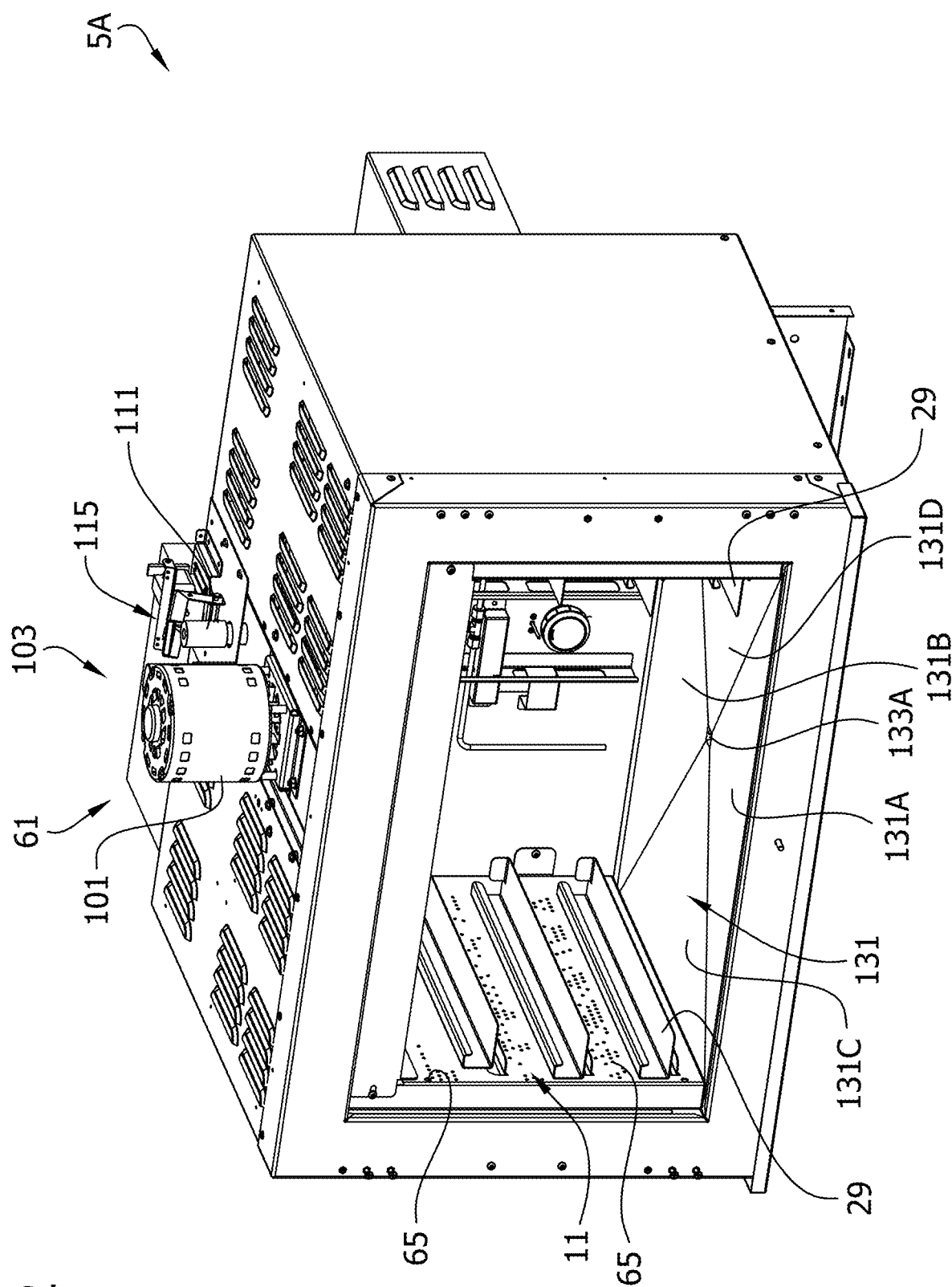
FIG. 2 is a perspective of an upper section of the oven, shrouds and covers of the upper section not being shown.
Figure 3:
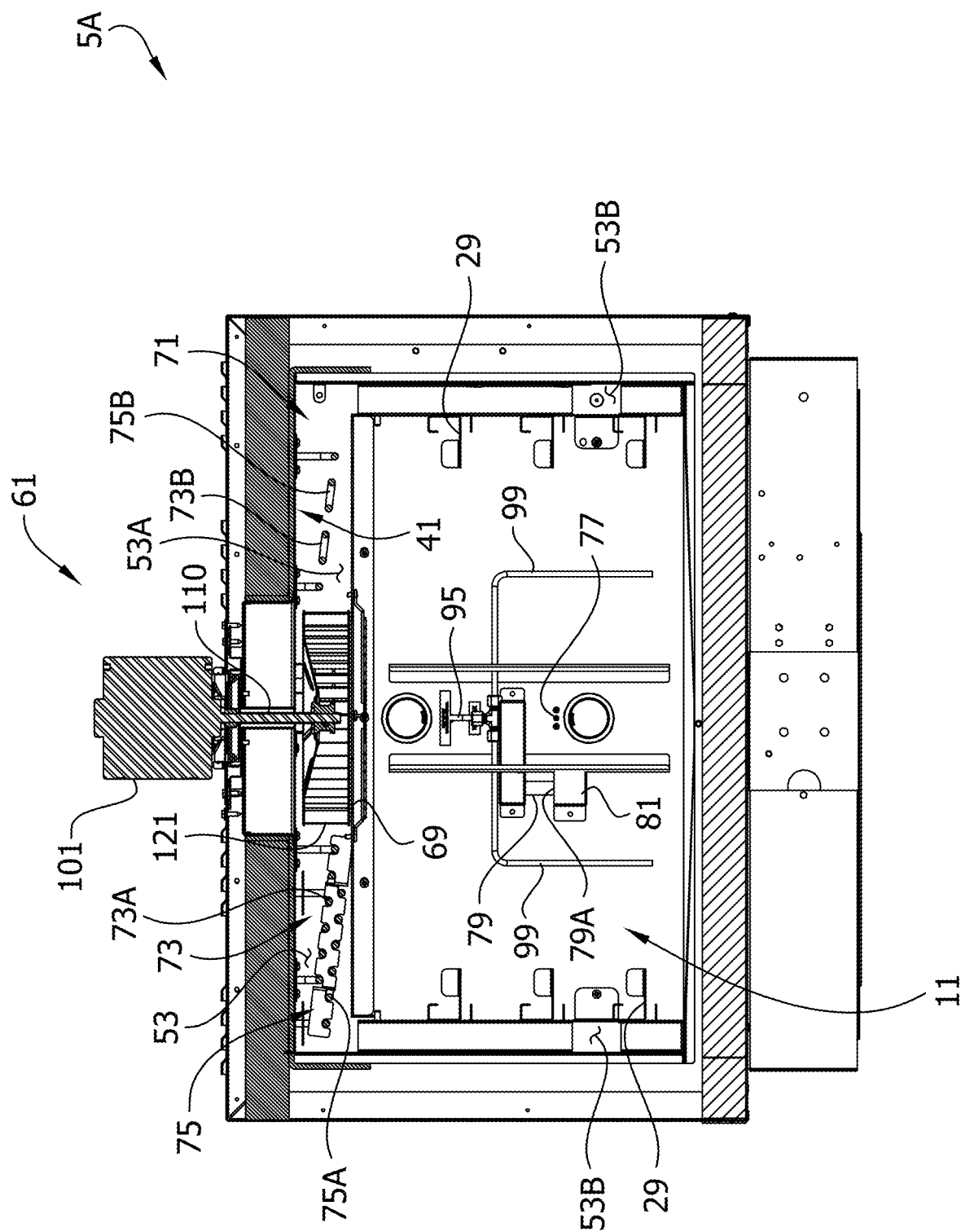
FIG. 3 is a section of the upper section of FIG. 1 taken widthwise with respect to the upper section.

Referring to FIGS. 2-5, the upper section 5A is shown separated from the lower section 5B and having covers, shrouds, and other parts removed to expose various components. As shown in FIGS. 2 and 3, the upper section 5A comprises a chamber 11 defined by a top wall, a bottom wall, opposite side walls, and a back wall. The chamber 11 is accessible by opening a door 25 which closes the front of the chamber. The door 25 is shown in FIG. 1 but is removed from the upper section 5A in the remainder of the figures. One or more rack supports 29 are secured to the side walls of the chamber 11 for supporting a number of food racks (not shown) in the chamber. Each rack is sized to hold a number of pans of bread dough. It will be understood that the number and size of the racks can vary without departing from the scope of this invention. The chamber houses food placed therein in a food preparation environment that can be controlled by one or more food preparation environment control devices, described in more detail below, to, for example, change the temperature, humidity, air flow, and/or venting of the food preparation environment. The chamber 11 is surrounded by an upper housing, generally designated 41 in FIG. 3, having a top wall, a bottom wall, opposite side walls, and a back wall. The top and side walls of the housing 41 are spaced from respective walls of the cooking chamber 11 to provide a conduit system or flow path 53 for circulating air (or other gas) to, through and from the cooking chamber 11. As shown in FIG. 3, the conduit system 53 comprises an upper portion 53A above the cooking chamber 11 and side portions 53B at opposite sides of the cooking chamber 11. Other flow path configurations may be used without departing from the scope of the present invention.

A blower, generally indicated at 61 in FIG. 3, (broadly "food preparation environment control device") is mounted in the upper portion 53A of the conduit system 53, adjacent the top of the upper section 5A of the oven, for circulating air (or other gas) through the conduit system. In the illustrated embodiment, air enters the cooking chamber 11 through a plurality of entry openings 65 in the side walls of the chamber (see FIGS. 2 and 4) and exits the chamber through an exhaust opening 69 in the top wall of the chamber below the blower 61. The blower 61 comprises a blower motor 101 and a blower wheel 121. The blower motor 101 is mounted on a top wall of the oven. The blower motor 101 drives rotation of the blower wheel 121 via output shaft 110, which rotates in a bearing about a generally vertical axis. The blower wheel 121 is located in the upper portion 53A of the air conduit system 53 adjacent (e.g., immediately above) the exhaust opening 69 in the top wall of the cooking chamber 11. The blower motor 101 is operable to rotate the blower wheel 121 to circulate air through the conduit system 53 and cooking chamber 11 at velocities and flow rates suitable for retarding, proofing, and/or baking dough. Exemplary velocities include 0-600 ft/min. The blower motor 101 may rotate the blower wheel 121 in constant or pulsed manners (e.g., blower energized for time periods separated by time periods of the blower not being energized), as needed. Rotation of the blower wheel 121 creates suction at the suction side of the blower wheel (i.e., the lower portion of the blower wheel adjacent the exhaust opening 69) to pull gas from the cooking chamber 11 through the exhaust opening 69. Gas is expelled from the blower wheel 121 at the output (exhaust) side of the blower wheel (i.e., the left and right sides of the blower wheel as shown in FIG. 3) to circulate air through the conduit system 53 to the cooking chamber 11. The blower 61 may be a variable-speed, reversible blower. More specifically, the blower motor 101 may be adapted to rotate the blower wheel 121 at variable rates and may be adapted to rotate the blower wheel in forward and reverse directions. Such a blower is disclosed in further detail in U.S. Pat. No. 8,378,265, which is hereby incorporated by reference in its entirety. For example, the oven 1 may be programmed to operate the blower 61 at different speeds for different recipes (e.g., faster or slower for bread recipe as compared to cookie recipe).

A heating system 71 (broadly "food preparation environment control device") is provided for heating the air being circulated. The heating system 71 heats the air in the conduit system 53 after it leaves the chamber 11 and before it is re-circulated back to the chamber via the conduit system. By way of example, the heating system 71 may comprise one or more electric resistance heating elements in the upper portion 53A of the conduit system 53 located adjacent the top wall of the chamber 11. In the illustrated embodiment, the heating system 71 includes a primary heater 73 including first and second heating elements 73A, 73B on opposite sides of the blower wheel 121 and a secondary or auxiliary heater 75 including third and fourth heating elements 75A, 75B on opposite sides of the blower wheel adjacent the first and second heating elements, respectively. Other forms of primary and auxiliary heaters may be used without departing from the scope of the present invention. As will become apparent, the heaters 73, 75 may be operated at the same or different times, for the same or different durations, and/or at the same or different duty cycles. For example, the primary heater 73 may be operated as the main heater for heating the circulating air, and the auxiliary heater 75 may be used at times when it is desired to rapidly increase the temperature of the circulating air (e.g., during pre-heat, temperature ramp up to start of bake recipe, etc.). The auxiliary heater 75 may be programmable to operate at duty cycles ranging from 0-100 percent at 1 percent increments. Other heating system configurations may be used without departing from the scope of the present invention. For example, the auxiliary heater 75 may be omitted. Variations in heat output may be achieved by varying the duty cycle of the primary heater 73. For high heat output, the duty cycle may be increased, and for lower heat output, the duty cycle may be decreased. For example, the duty cycle for the primary heater 73 may be programmed differently for different recipes (e.g., higher duty cycle and thus higher heat for ciabatta bread bake recipe than bake recipes for other types of bread). The auxiliary heater 75 and/or higher duty cycle of the primary heater 73 may be used for rapid recovery to temperature set point following a loss of temperature in the chamber 11 due to a door cycle open/close or food loading.

The oven 1 may include various sensors for indicating to control system of the oven relevant aspects of the retarding, proofing, and/or baking operations. For example, a temperature sensor 77 (FIGS. 3 and 4) is provided in the chamber 11 for sensing the temperature in the chamber and indicating the sensed temperature to a control system of the oven. A relative humidity sensor 79 is provided in the chamber 11 for sensing and communicating to the control system the relative humidity in the chamber. In the illustrated embodiment, the head or tip 79A of the humidity sensor is covered by a shield 81 to shield it from direct flow of a steam injection system, described in further detail below, to prevent artificially high relative humidity readings. The chamber 11 is selectively illuminated by lights 83 mounted on the back wall of the chamber 11.

Figure 5:
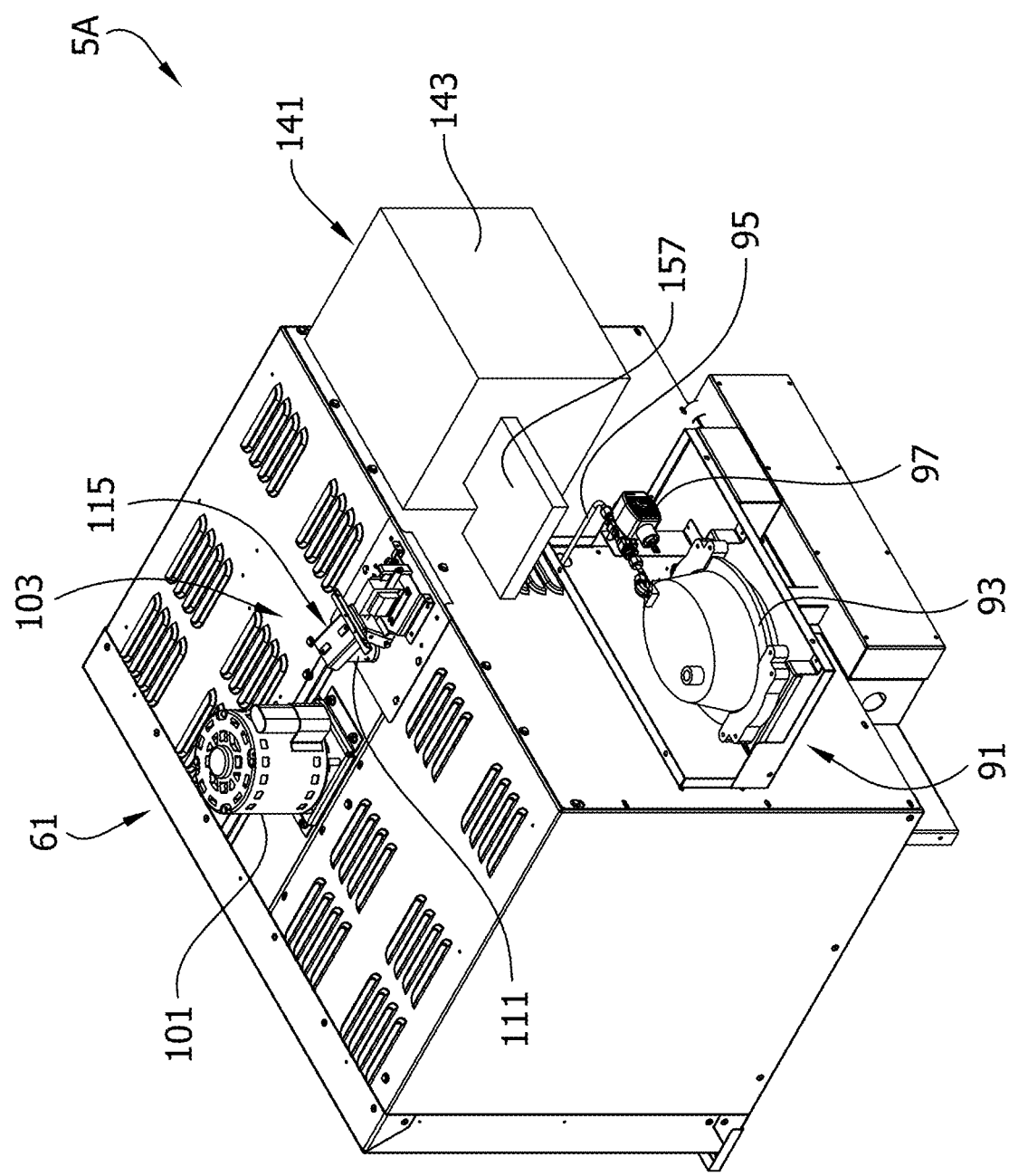
FIG. 5 is a rear perspective of the upper section.

Referring to FIG. 5, the oven 1 includes a steam injection system or humidification system, generally indicated by the reference number 91, (broadly "food preparation environment control device") adapted for introducing steam into the chamber 11. As explained in further detail below, the steam injection system 91 may be used in operations such as bread baking to improve the color, texture, or crunchiness of the crust of the baked bread. For example, steam may be injected in the chamber 11 at the beginning of a bake recipe, after the beginning of a bake recipe, and/or intermittently during a bake recipe. Condensation of the steam on the outside or "skin" of the bread and subsequent baking may provide the desirable characteristics noted above. Moreover, the steam injection system 91 may be used in controlling the humidity in the chamber 11 during recipes calling for humidity (e.g., during a proof recipe).

The steam injection system 91 includes a source of steam 93 supported on the oven 1 and a steam delivery conduit 95 extending between the source of steam and the chamber 11. In the illustrated embodiment, the source of steam 93 is a steam generator vessel which generates and holds a supply of steam in a reservoir. A solenoid valve 97 is positioned downstream from the steam generator 93 and upstream from the chamber 11 for selectively permitting steam injection into the chamber. The solenoid valve 97 has an open position in which it permits steam to enter the chamber 11 and a closed position in which it blocks steam from entering the chamber. As shown in FIG. 3, the steam delivery conduit 95 extends from behind the chamber 11 into the rear of the chamber, where the conduit is connected to two steam distribution conduits 99 that extend outwardly and downwardly inside the chamber along its rear wall. Steam is introduced into the chamber 11 through the ends of the steam distribution conduits 99. Other sources of steam, other steam delivery and distribution conduits, and other valves may be used without departing from the scope of the present invention. For example, the steam delivery conduits 99 may be arranged to distribute steam more evenly in the chamber to the various tray levels. Moreover, components of the steam injection system 91, such as the valve 93, may be omitted without departing from the scope of the present invention. For example, the source of steam 93 may produce steam "on demand" such that a valve is not required. When steam is needed, the steam is generated. An amount of water needed to produce the desired amount of steam may be introduced into the steam generator when called for by the control system such that a valve is not required to prevent excess steam from entering the chamber 11. As another example, steam may be generated by introducing water onto the blower 61, such as disclosed in U.S. Pat. No. 8,378,265, which is hereby incorporated by reference in its entirety.

Figure 3A:
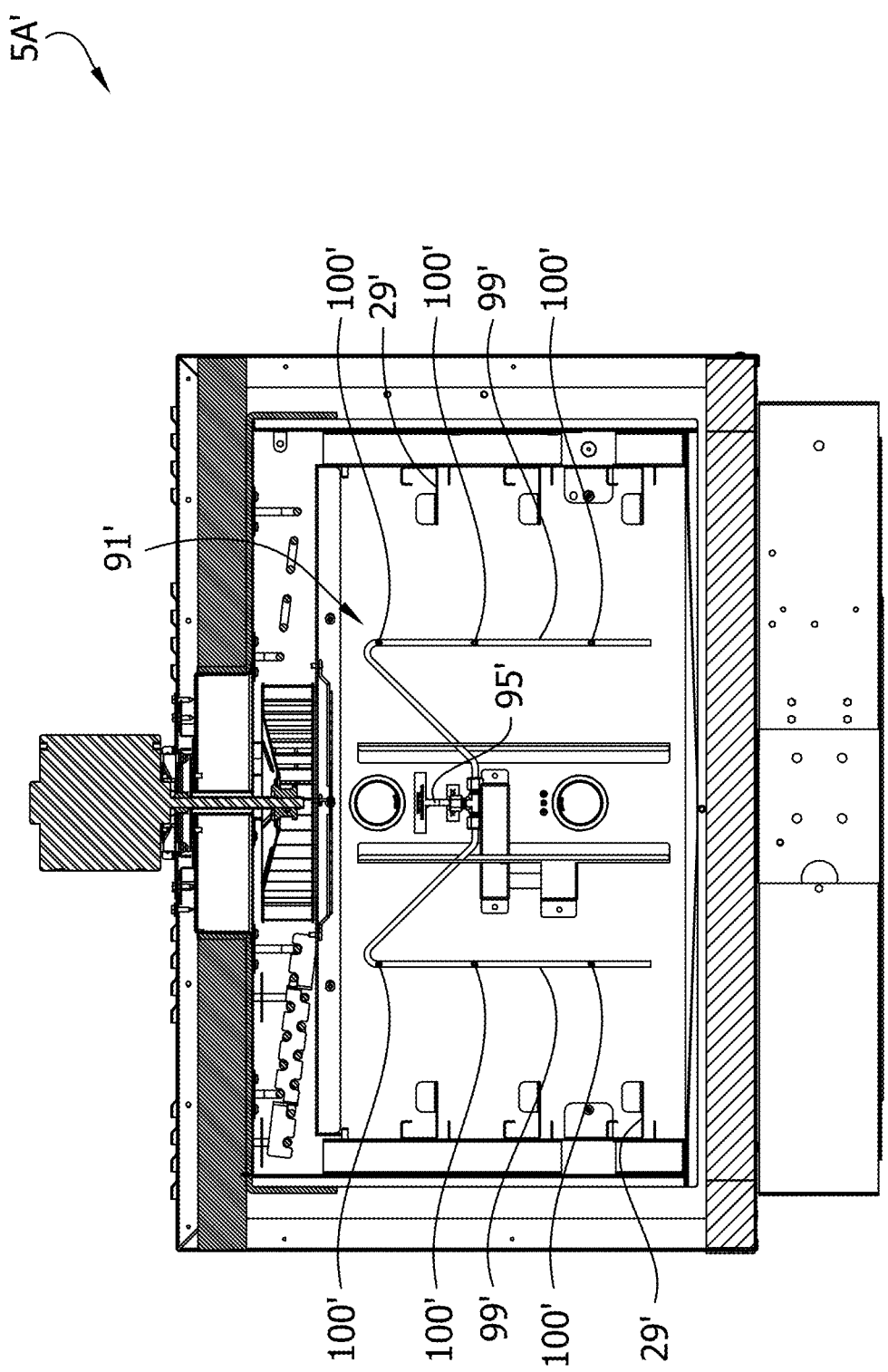
FIG. 3A is a view similar to FIG. 3 but showing an alternative embodiment of a steam injection system.

As shown in an alternative embodiment, illustrated in FIG. 3A, the steam injection system 91' may include steam outlet portions (e.g., one or more holes 100') positioned for delivering steam above each of the trays when held by the tray supports 29'. The injection system 91' includes a steam delivery conduit 95' and steam distribution conduits 99' having steam outlet openings 100' positioned above each set of rack supports 29' for introducing steam to the region above each of the trays. The number of steam outlet portions corresponds generally to the number of levels of rack supports 29', and the vertical position of the steam outlet portions is offset above respective tray supports 29' for delivering steam to food on each of the trays supported on the tray supports.

Figure 4:
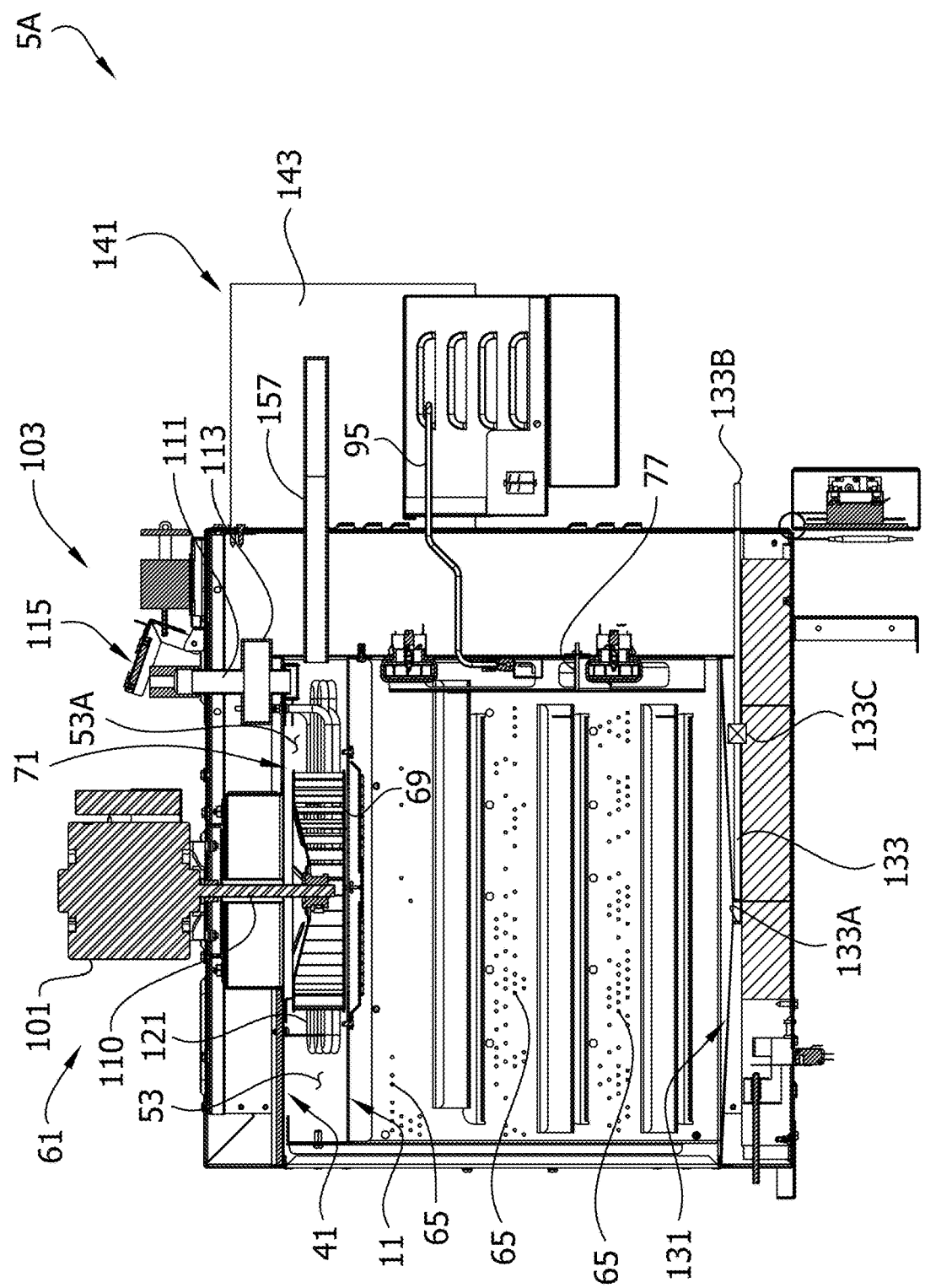
FIG. 4 is a section of the upper section taken lengthwise with respect to the upper section.
Figure 6:
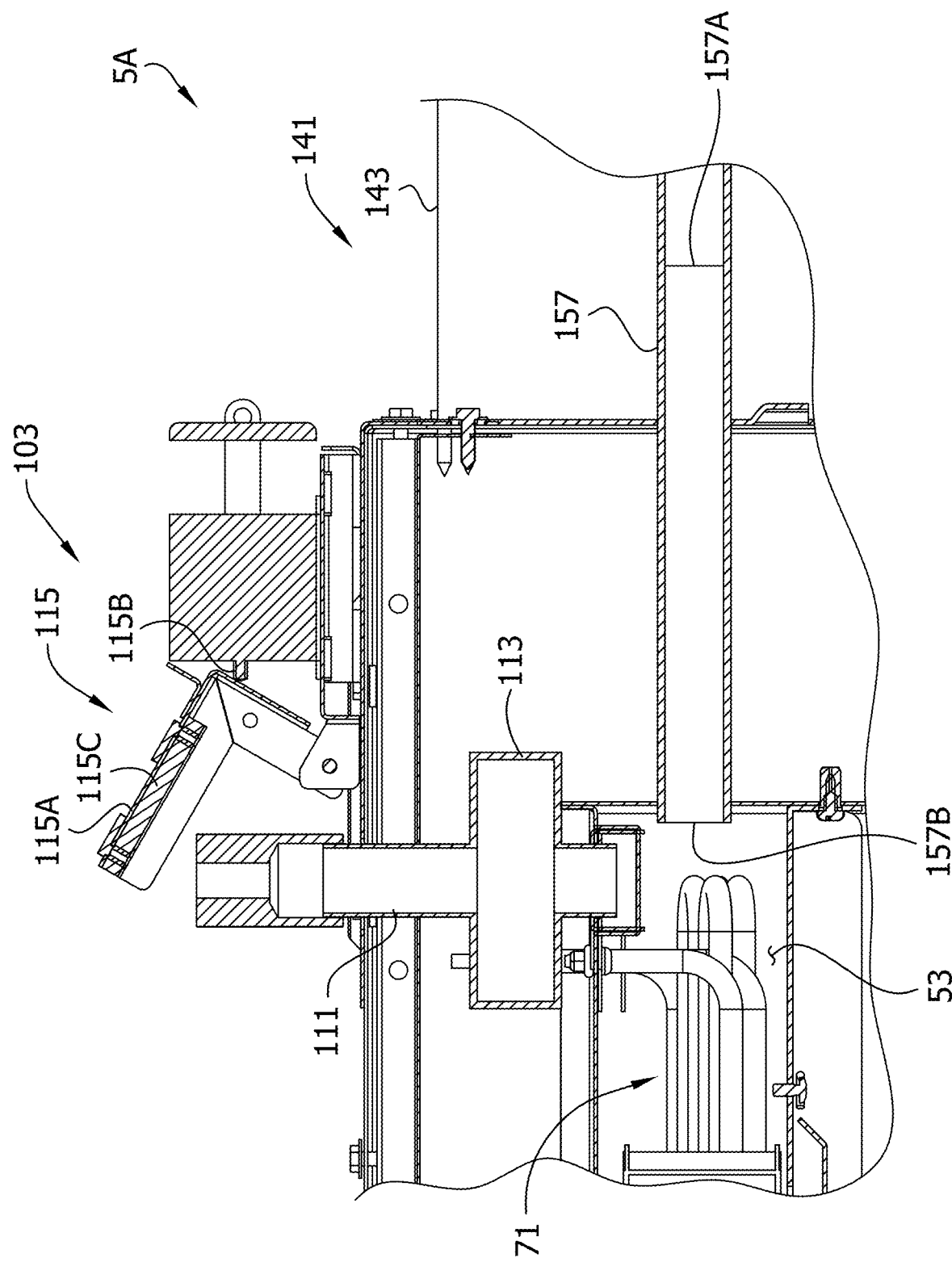
FIG. 6 is an enlarged view of a portion of the section of FIG. 4 showing a flue valve in an open position.
Figure 7:
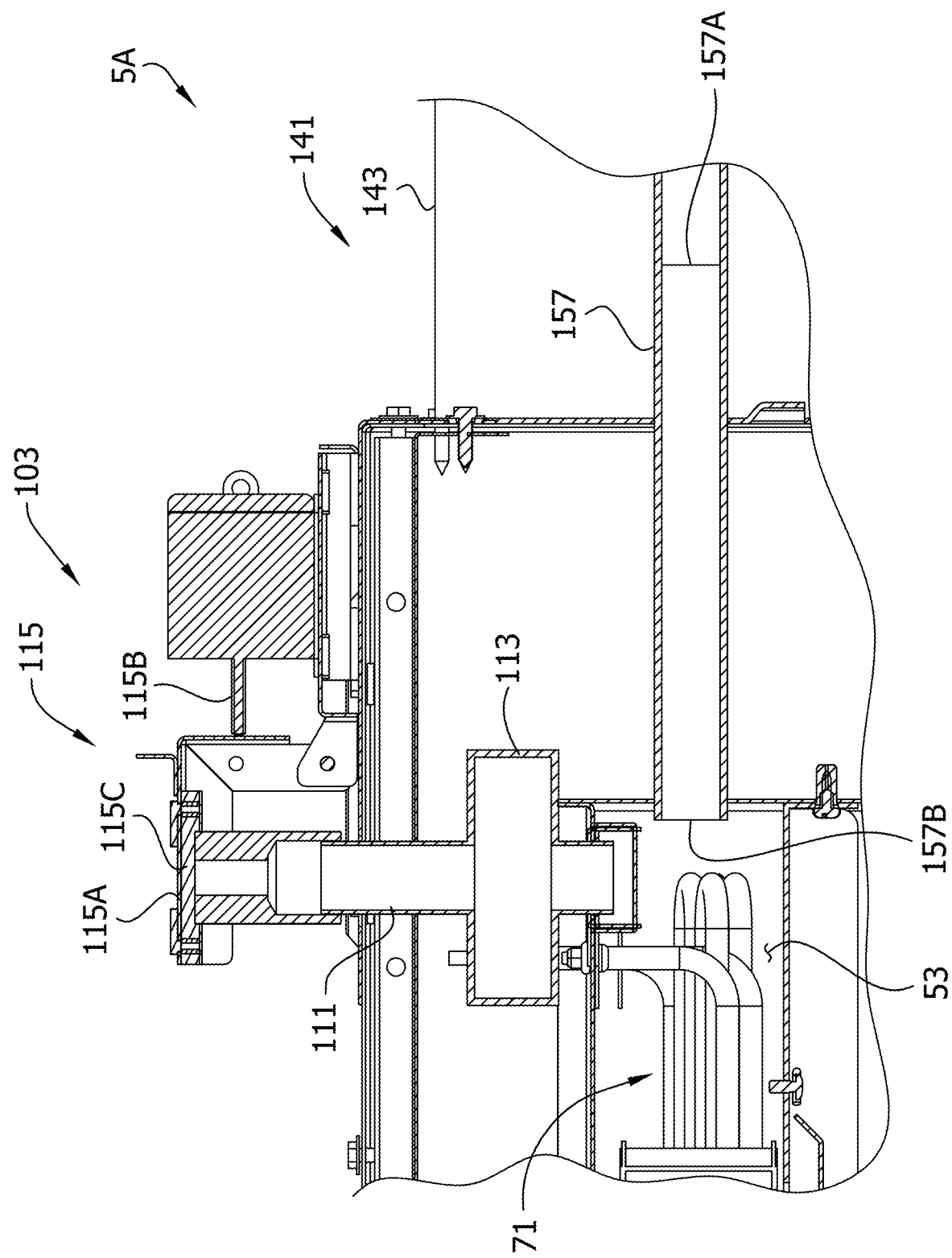
FIG. 7 is a view similar to FIG. 6 but showing the flue valve in a closed position.
Figure 8:
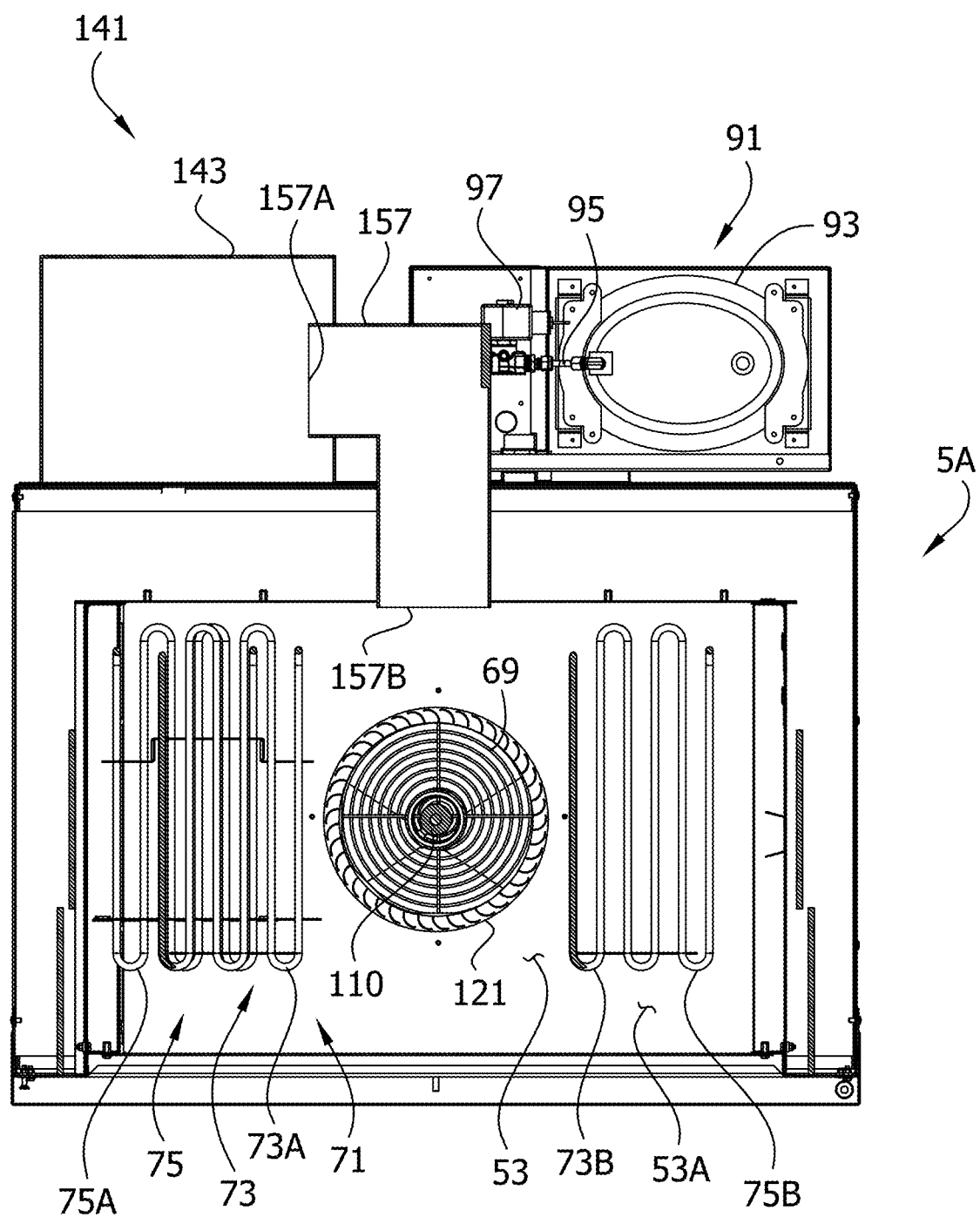
FIG. 8 is a section of the upper section taken lengthwise with respect to the upper section through an upper portion of a conduit system.

Referring to FIGS. 2, 4, and 5, a venting system 103 (broadly "food preparation environment control device") of the oven includes a vent conduit or flue 111 for permitting gas to escape from the chamber 11 to ambient. The chamber 11 and air conduit system 53 is generally a closed system in which substantially the same air re-circulates over and over. However, at various times, it may be desired to passively or actively vent the chamber 11. As shown in closer detail in FIGS. 6 and 7, the flue 111 extends from an inlet end communicating with the air conduit system 53 to an outlet end above the chamber. By way of example, the opening may be a 0.375-in. diameter opening. The venting system 103 includes a fan 113 is provided at an intermediate portion of the flue 111 between the inlet and outlet ends for actively exhausting gas from the chamber 11 via the flue. The venting system also includes a valve or cap 115 adjacent the outlet end of the flue 111 adapted for sealing the outlet of the flue to prevent venting. The valve 115 includes a valve member 115A selectively movable by a solenoid 115B for moving the valve member between an open position (e.g., FIG. 6) in which the valve member permits flow through the flue 111 and a closed position (e.g., FIG. 7) in which the valve member blocks fluid flow through the flue. In the illustrated embodiment, the valve member 115A includes a gasket 115C comprising resiliently compressible material which is compressed when pressed against the outlet end of the flue 111 for forming a suitable seal. For example, it may be desirable while injecting steam into the chamber 11 to close the flue 111 to prevent steam from escaping the chamber. Moreover, when a high-humidity operation such as proofing is finished, it may be desirable to actively vent the chamber 11 using the fan 113 to prepare for the baking cycle. With less relative humidity in the chamber 11, it requires less energy to heat the gas in the chamber to the higher baking temperature.

Referring to FIGS. 2 and 4, the chamber 11 includes a sloped floor 131 and drain 133 for collecting and draining condensed liquid from the bottom of the chamber 11. For example, some of the steam injected by the steam injection system 91 into the chamber 11 may condense inside the chamber. The sloped floor 131 of the chamber 11 promotes draining of the condensed liquid by gravity to the drain 133. In the illustrated embodiment, the floor includes front, rear, left and right sections 131A-131D sloping toward a central region of the floor to an inlet 133A of the drain 133. The drain 133 extends from the drain inlet 133A to a drain outlet 133B positioned for delivery of the drained condensate outside of the chamber 11 (e.g., to a catch basin). The drain 133 includes a valve 133C (FIG. 4) having an open position in which the valve permits flow of liquid through the drain and a closed position in which the valve blocks flow of liquid (and gas) through the drain. The valve 133C may be closed at various stages of recipes or for entire recipes, depending on whether it is desired to prevent liquid from draining from the chamber 11 and/or to prevent gas from entering the chamber through the drain. Generally speaking, the drain 133 may be closed by the valve 133C at the same times the flue 111 is closed by the valve 115. Sloped chamber floors having other configurations (e.g., primarily toward a rear of the chamber rather than the center of the chamber) and other types of drains may be used without departing from the scope of the present invention. For example, the drain inlet 133A may serve as a steam injection port into the chamber 11. The steam delivery conduit 95 may be in communication with the drain inlet 133A via a three-way valve having a first open position in which steam is permitted to flow into the chamber 11 from the steam delivery conduit 95, a second open position in which liquid from the chamber 11 is permitted to enter the drain 133A, and a third closed position in which the valve blocks flow of steam and condensate.

Figure 9:
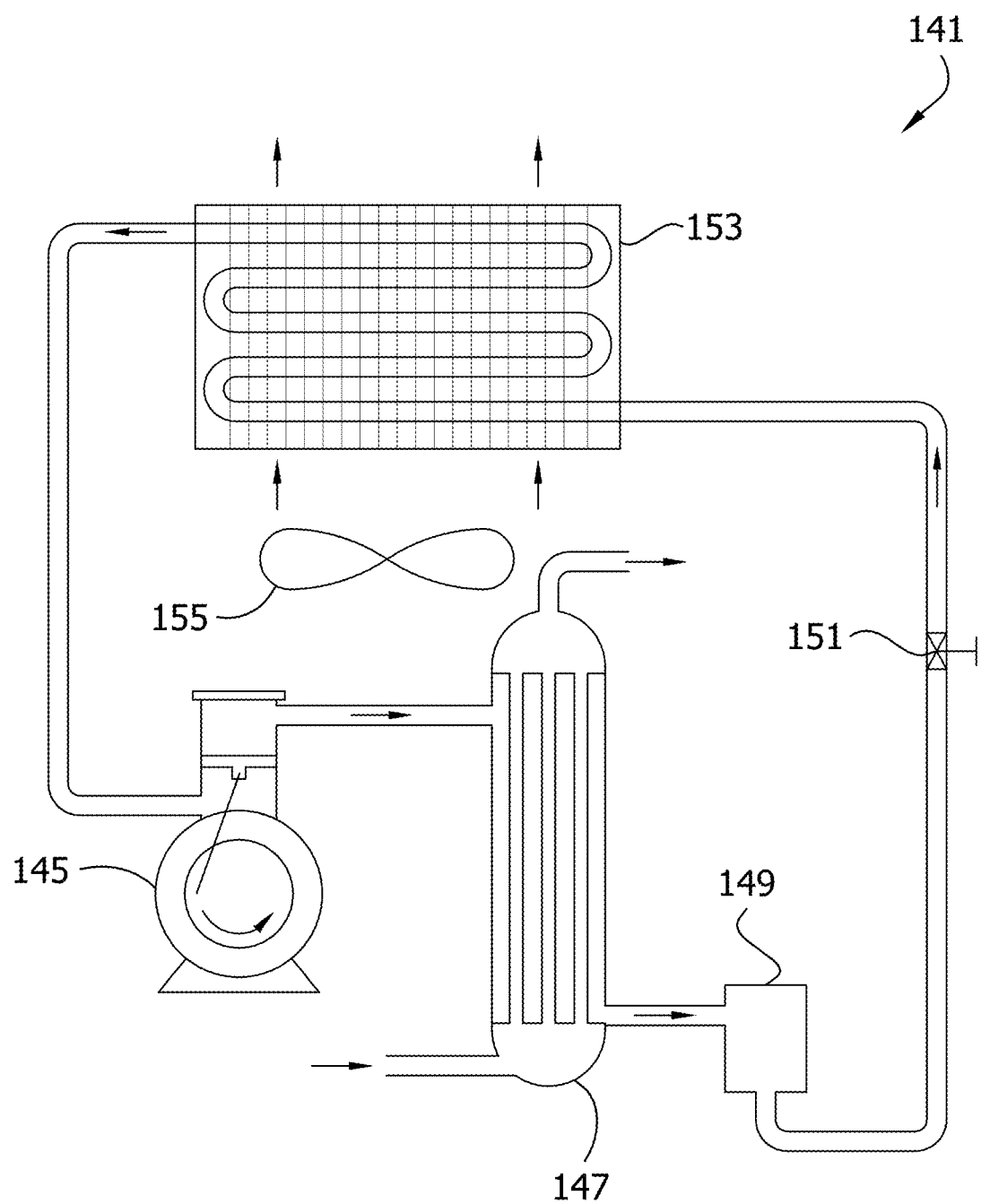
FIG. 9 is a schematic of a refrigeration system of the upper section.

As shown in FIGS. 4, 5, and 9, the oven 1 includes a refrigeration system 141 (broadly "food preparation environment control device") that may be used for a retarding operation in the same chamber 11 in which the dough is proofed and/or baked. In addition, the refrigeration system may be used during other recipes, such as for proofing or baking recipes, or between recipes to rapidly cool the chamber to prepare for a recipe calling for a lesser temperature than a previously executed recipe. The refrigeration system 141 is supported on the oven 1, and more particularly in a housing 143 on the rear side of the upper section 5A. Example refrigeration system components which may be supported in the housing 143 are shown schematically in FIG. 9. For example, the refrigeration system 141 may include a compressor 145, a condenser 147, a refrigerant receiver 149, an expansion valve 151, and an evaporator 153. Persons having ordinary skill in the art will understand air blown over the evaporator 153 (e.g., by a fan 155) will be cooled. The cooled air is delivered from the refrigeration system 141 via a cool air conduit 157 having an inlet end 157A connected to the refrigeration housing 143 and an outlet end 157B in communication with the rear, upper portion of the duct system 53 above the chamber 11. The cool air moves through the duct system 53 and enters the chamber 11 via the outlet openings 65 in the sides of the chamber. Accordingly, dough may be placed in the chamber 11 to be held in refrigerated conditions in a retarding operation (e.g., prior to proofing and baking the dough in the same chamber). Moreover, the dough may be held in a frozen or slacked state for a period of time prior to a retarding operation. In addition, the refrigeration system 141 may be used to rapidly cool the chamber 11 between baking and proofing operations, or to rapidly cool the chamber at or near an end of a bake operation to permit the bread to be served for consumption more quickly. Refrigeration systems having other configurations may be used without departing from the scope of the present invention. For example, the refrigeration system 141 may include a warm air return from the chamber 11 to the refrigeration housing 143. Moreover, refrigeration systems other than vapor-compression refrigeration systems may be used. For example, the refrigeration system may include a heat pump, Peltier device, solid state refrigerator, or thermoelectric cooler.

As is now apparent, the oven 1 includes suitable components and systems (e.g., food preparation environment control devices) such that the chamber 11 may be used for retarding, proofing, and baking, if desired. Ovens not having all of these capabilities (e.g., capable of only proofing and baking, or only baking) may be used without departing from the scope of the present invention. For example, the refrigeration system 141 may be omitted.

Figure 10:
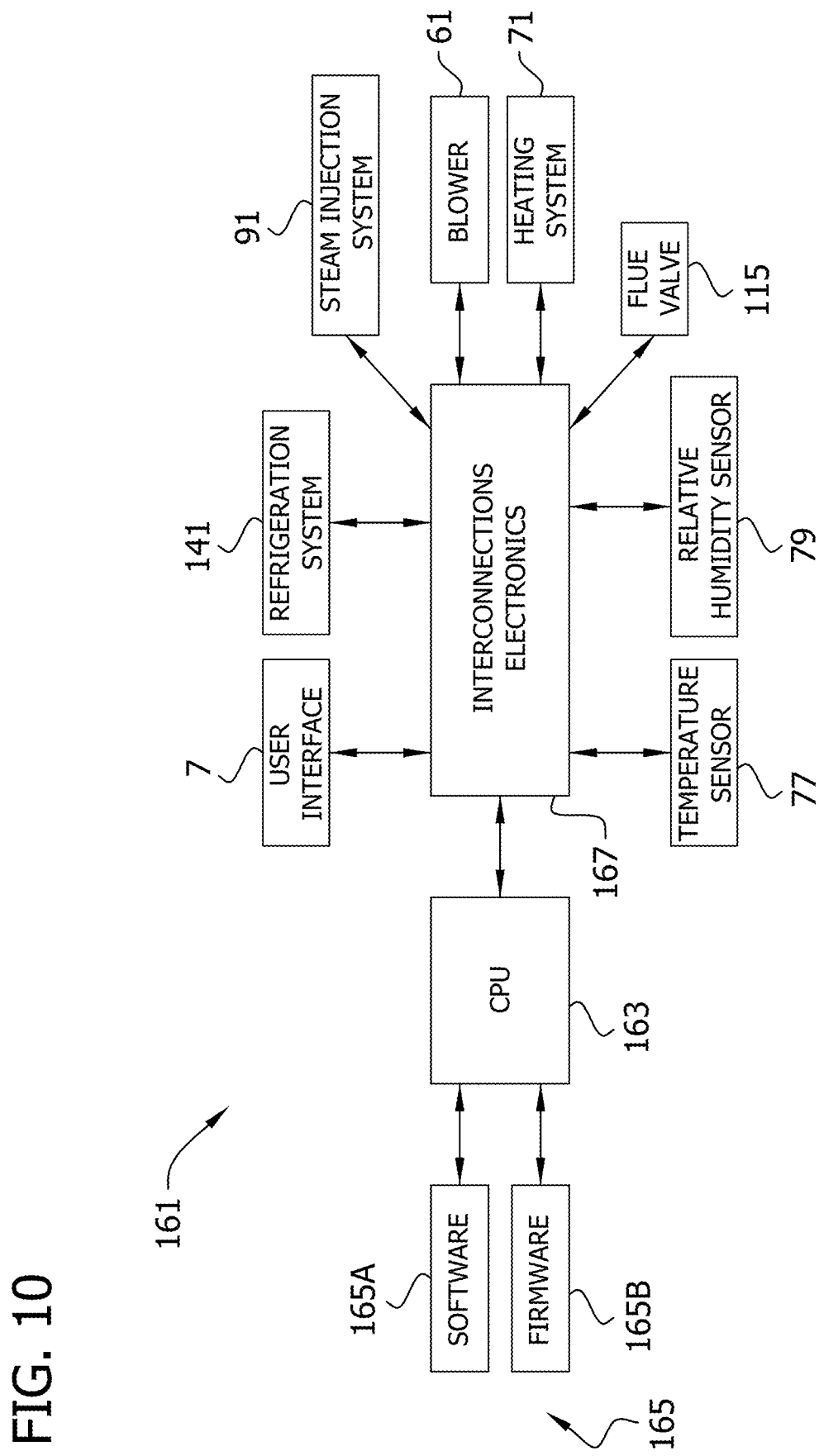
FIG. 10 is a schematic of a control system for the oven.

As shown schematically in FIG. 10, a control system 161 for the oven may include a central processing unit (CPU) 163, a tangible storage medium 165 (e.g., including forms of storage such as software 165A and firmware 165B), and the user interface 7. The CPU 163 may be a microprocessor or the like. The control system 161 includes interconnection electronics 167 that operatively connect the various components of the control system with other components of the oven, such as the refrigeration system 141, steam injection system 91, flue valve 115, blower 61, heating system 71, and temperature and relative humidity sensors 77, 79. The CPU 163 is adapted for reading and executing instructions stored in the storage medium 165, and is responsive to the user interface 7, for controlling the various components and systems of the oven 1. A user can enter or modify instructions stored on the storage medium 165 via the user interface 7. In the illustrated embodiment, the user interface 7 is a touch screen, as explained in further detail below. Other types of user interfaces may be used without departing from the present invention. The user interface 7 provides command signals via the interconnection electronics 167 to the CPU 163. The command signals can include changes to the parameters (e.g., time, temperature, humidity, etc.) stored in the tangible storage medium 165. The CPU 163 responds to the command signals and provides control signals corresponding thereto via the interconnection electronics 167 to the various components and systems of the oven 1. For example, the interconnection electronics 167 may include electrical or fiber optic lines or wireless communication devices.

As will be described with reference to FIGS. 11-15, 29, and 30, the user interface 7 is adapted for permitting a user to program various retarding, proofing, and baking recipes (broadly "food preparation recipes"). The user interface 7 provides the user the ability to program individual parameters or aspects of retarding, proofing, and baking recipes independently of each other for controlling the food preparation environment control devices. The parameters can define operational states (e.g., active or inactive) of the food preparation environment control devices, such as the blower 61, heating system 71, humidification system 91, venting system 103, and/or refrigeration system 141. For example, start times and durations of various stages of a baking recipe can be customized and defined with respect to a recipe time (e.g., countdown time). The user interface 7 illustrates to the user in graphical format operational states of the food preparation environment control devices according to the programmed parameters of a recipe for enhanced user understanding of the programmed parameters and recipe. This may be particularly useful when a recipe such as a baking recipe includes various functions such as humidification (e.g., steam injection) and venting which may include stages and/or operational states having overlapping durations. For example, operational states for the food preparation environment control devices may include the state of being "active" (e.g., "on") or "inactive" (e.g., "off"). It will be appreciated the user interface 7 may be used with other food preparation apparatus (e.g., for food cooking, baking, frying, mixing, washing, sanitizing, etc.) and/or for programming other types of food preparation recipes without departing from the scope of the present invention.

Figure 11:
FIG. 11 is a photograph of a screenshot of a user interface of the oven showing a recipe menu home screen.

Referring to FIG. 11, in the illustrated embodiment, the user interface 7 is a touch screen, including both a user input and a display. The display includes a color liquid crystal display screen, and the user input includes a touch-sensitive panel overlaying the display screen. The display includes a graphical display 201 (e.g., see FIG. 15) for displaying graphical representations associated with a programmed recipe, as will be explained in further detail below. The user input includes "actuators" at various areas of the touch screen where the touch screen is responsive to the touch of a user. The actuators may be identifiable to the user by text or graphic information on the display underlying respective areas of the touch sensitive panel. Accordingly, to an extent, the user input includes the display or portions of the display (e.g., for making the actuators and their functions identifiable to the user). Other types of user interfaces may be used without departing from the present invention. For example, the display and user input may be separate from one another. The display may include other types of screens or indicators. Moreover, the user input may comprise other types of actuators, such as keyboards, mice, buttons, switches, or even microphones for receiving information from the user.

As shown in FIG. 11, a Recipe Menu Home Screen is displayed on the touch screen 7. The screen is divided into upper and lower sections corresponding to the upper and lower sections of the oven 1. The lower section is shown as being configured as a proofer and having corresponding controls. Operation of the upper section will be described in further detail hereafter, with the understanding that the lower section could be configured to execute the same or different operations as the upper section, as explained above. The upper section of the screen includes an icon representative of the upper section of the oven to indicate to the user that the controls relate to the upper oven section. On this screen, the user has the option of selecting from a plurality of recipes stored on the tangible storage medium. As illustrated, three recipes are displayed, including Retard, Proof, and Bread (Bake). The user could begin execution of one of these recipes by pressing the respective actuator. Other recipes could be accessed by using Page Left or Page Right actuators.

Figure 12:
FIG. 12 is a photograph of a screenshot of the user interface showing a recipe edit home screen.

If it is desired to program a new recipe or modify an existing recipe, the user may press the actuator at the top right of the screen represented by an exclamation point. This brings the user to a Recipe Edit Home Screen, as shown in FIG. 12. The Recipe Edit Home Screen provides a list of all recipes stored in the tangible storage medium 165. The list of recipes includes the Retard, Proof, and Bread (Bake) recipes displayed previously on the Recipe Menu Home Screen (FIG. 11). The user may select any of the recipes by pressing the respective actuator.

Figure 13:
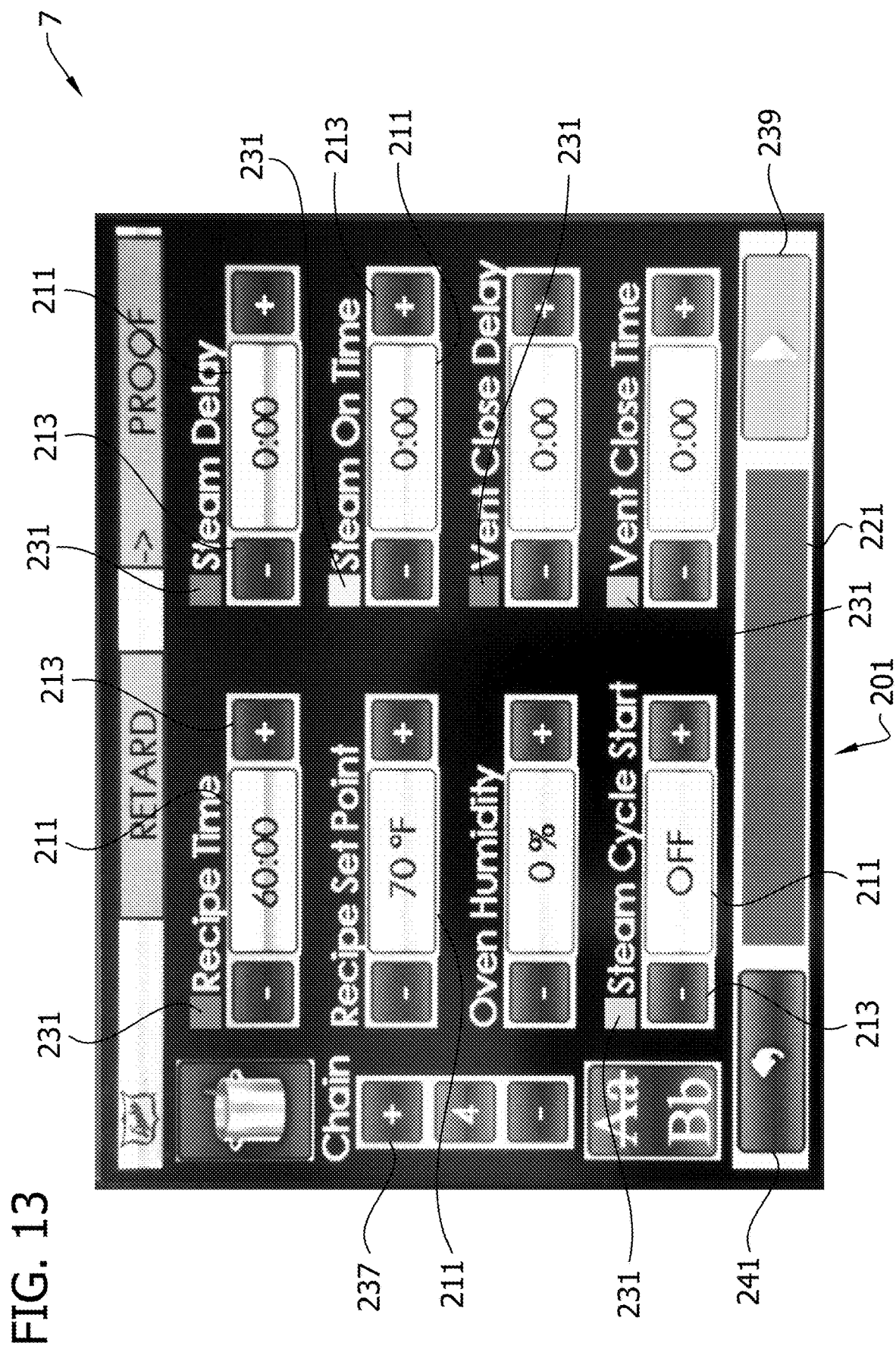
FIG. 13 is a photograph of a screenshot of the user interface showing a retard recipe program screen.

For example, pressing the Retard actuator causes the display to show the Retard Recipe Program Screen of FIG. 13. The recipe being programmed is indicated by the word "RETARD" displayed at the top of the screen. The screen lists several parameters on the user input which may be programmed in a given recipe. For example, the parameters include Recipe Time, Recipe Set Point (temperature), Oven Humidity, Steam Cycle Start, Steam Delay, Steam On Time, Vent Close Delay, and Vent Close Time. Each of the parameters includes a parameter value display 211 (i.e., indicating the programmed value for the respective parameter) and an actuator 213 permitting the user to change the displayed value. In the illustrated case, the actuators 213 each include plus and minus buttons for increasing or decreasing the programmed value. In the Retard recipe as displayed, the Recipe Time is 60:00 minutes and the Recipe Set Point (temperature) is 38 degrees F. All of the other programmable parameters are not used or set to zero. The graphical display 201 on the screen includes a graphical representation 221 of the programmed recipe in the form of a two-dimensional bar graph adjacent the bottom of the screen. Colors used in the bar graph correspond to colors of parameter color indicators 231 (e.g., colored boxes) adjacent each programmable parameter label. The bar graph 221 represents the operational states of food preparation environment control devices used in the recipe according to the parameters displayed by the screen as a function of time (horizontal axis). The recipe has a beginning at the left side of the bar graph, an end at the right side of the bar graph, and a duration (recipe time) extending between the two ends. In this case, the graph is a solid red bar extending from the left to the right. The red color of the graph corresponds to the red color of the color indicator 231 next to the Recipe Time parameter label. The user can select whether to "chain" a second recipe to the recipe being programmed such that the control system operates the chained recipe automatically after execution of the displayed recipe. In the illustrated case, the Proof recipe is chained to the Retard recipe, as indicated by the arrow and word "PROOF" displayed at the top right of the screen. The chained recipe can be changed by adjusting the Chain parameter using a chain actuator 237 (i.e., plus or minus actuators) on the left side of the screen. The Proof recipe is the fourth recipe listed on the Recipe Edit Screen (FIG. 12). Accordingly, a number 4 is displayed in the value display of the Chain parameter. When the recipe is programmed as desired, the recipe is saved to the tangible memory 165 by pressing the save actuator 239 represented by the arrow at the bottom right of the screen. Pressing the back arrow actuator 241 at the bottom left of the screen brings the user back to the Recipe Edit Home Screen, where the user can then select a different recipe to be programmed.

Figure 14:
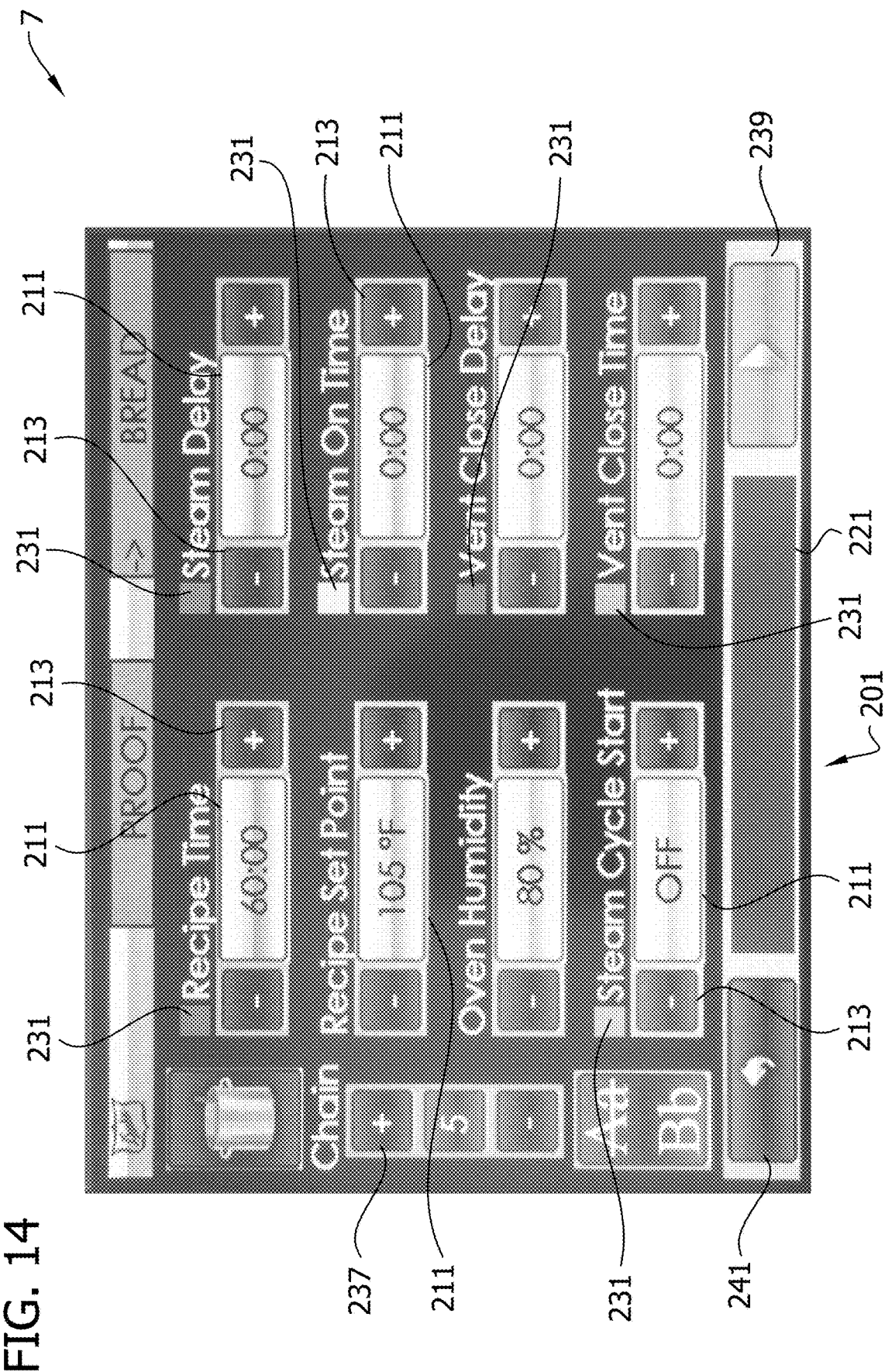
FIG. 14 is a photograph of a screenshot of the user interface showing a proof recipe program screen.

FIG. 14 shows a Proof Recipe Program Screen including similar parameters as listed on the Retard Recipe Program Screen. In this case, the Proof recipe parameters include a Recipe Time of 60:00 minutes, a Recipe Set Point (temperature) of 105 degrees F., and an Oven Humidity of 80%. All of the other parameters are turned off or set to zero. The graphical representation 251 (bar graph) of the recipe on the graphical display 201 at the bottom of the screen is similar to the bar graph 231 (FIG. 13) representing the Retard recipe. The chained recipe in this case is the Bread (Bake) recipe. After the Proof recipe is programmed as desired, it is saved to the tangible storage medium 165.

Figure 15:
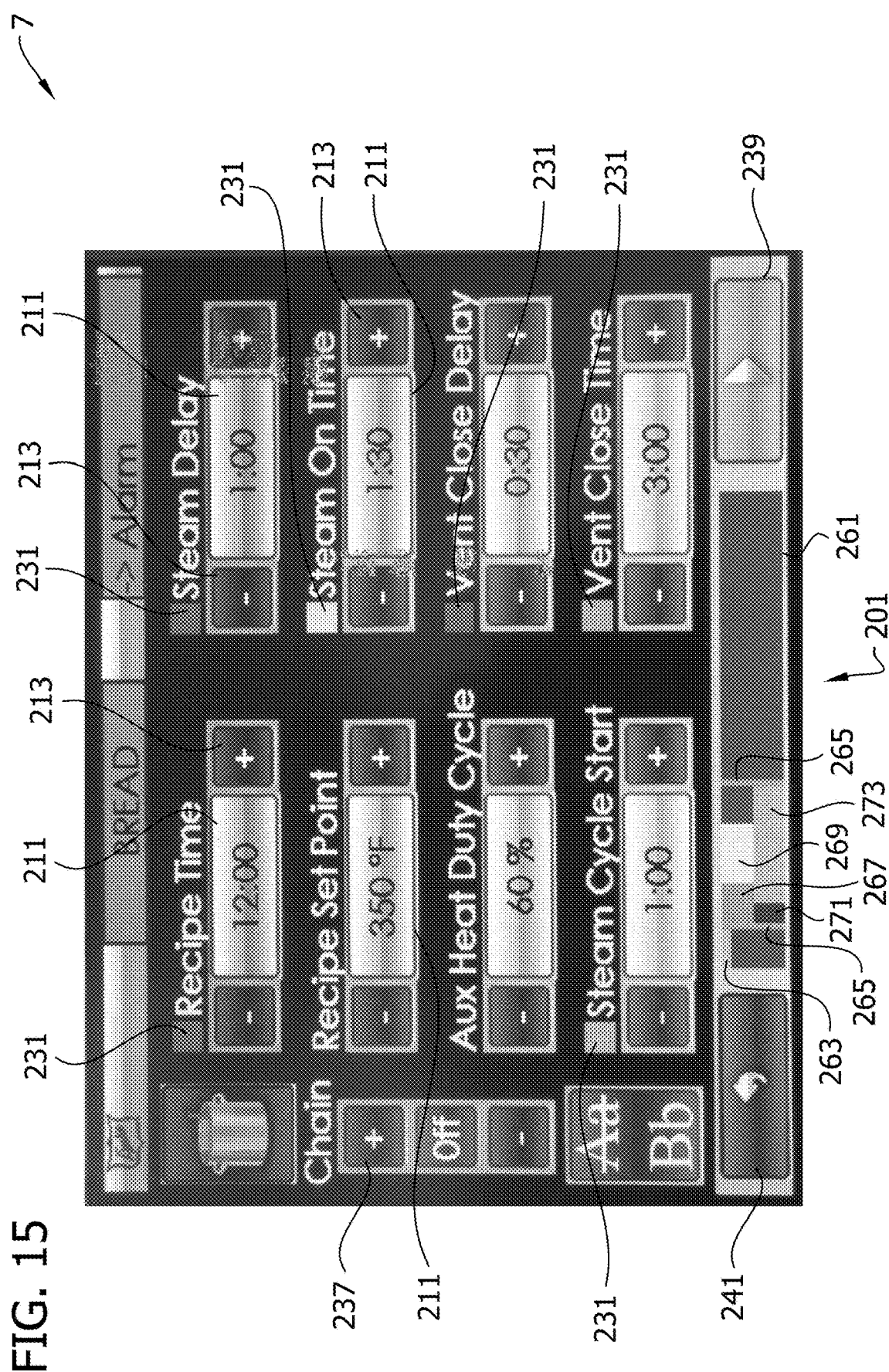
FIG. 15 is a photograph of a screenshot of the user interface showing a bread recipe program screen.

FIG. 15 shows a Bread Recipe Program Screen including similar parameters as listed on the prior recipe program screens. The chained recipe is programmed for "off," such that no recipe will be automatically executed following the Bread recipe, and an alarm will sound at the end of the recipe, as indicated by the word "ALARM" at the top right of the screen. For the Bread recipe, the parameter Aux Heat Duty Cycle is provided in place of Oven Humidity. Moreover, all of the available parameters are used as part of the recipe, including steam cycle parameters Steam Delay, Steam On Time, Vent Close Delay, and Vent Close Time. It will be appreciated that the Steam Delay parameter defines an inactive operational status of the humidification system 91, the Steam On Time defines an active operational status of the humidification system, the Vent Close Delay defines an active operational status of the venting system 103 (i.e., flue open), and the Vent Close Time defines an inactive operation status of the venting system (i.e., flue valve closed). As explained above, a steam cycle may be advantageous in a bake recipe to improve the color, taste, and/or texture of the bread crust. The programmed parameters for the displayed recipe include Recipe Time at 12:00 minutes, Recipe Set Point (temperature) at 350 degrees F., Aux Heat Duty Cycle at 60%, Steam Cycle Start at 1:00 minute, Steam Delay at 1:00 minute, Steam On Time at 1:30 minutes, Vent Close Delay at 0:30 minute, and Vent Close Time at 3:00 minutes.

Still referring to FIG. 15, the graphical representation 261 of operational status of the food preparation environment control devices used in the recipe is displayed in the graphic display 201 at the bottom of the screen and includes several colors for this recipe. The horizontal scale of the bar graph 261 is set by the recipe time of 12:00 minutes. The operational status of the food preparation environment control devices associated with the programmed parameters are displayed with respect to one another as a function of time along the bar graph 261 in proportion to the scale of the recipe time. For example, at the left side of the bar graph, a blue bar 263 corresponds to the light blue color indicator 231 of Steam Cycle Start and has a length extending from the left to the right corresponding to the programmed 1:00 minute and shown in proportion to the 12:00 minute length of the red bar (i.e., the full width of the bar graph 261) indicating the Recipe Time. The Steam Cycle Start bar 263 has a beginning, an end, and a duration, as with the other bars displayed on the bar graph. The Steam Cycle Start bar 263 represents a delay in the start of the steam cycle. During the Steam Cycle Start, the chamber 11 may be heated at the Recipe Set Point as a "pre-bake" before the beginning of the steam cycle. The blower 61 and heating system 71 may operate to maintain the set point temperature in the chamber 11. At the end of the Steam Cycle Start, the steam cycle begins. The blower 61 and heating system 71 may be de-energized or turned off during the steam cycle and re-energized after the steam cycle is finished. Alternatively, the blower 61 may operate at a low speed or may be pulsed to provide gentle gas flow during the steam cycle. As shown in the graph, the steam cycle includes a beginning and an end indicated by vertically extending orange bars 265. The duration of the steam cycle extends between the vertical bars and includes colored bars representative of different stages of the steam cycle. The steam cycle includes a first or steaming function and a second or venting function. The two functions are displayed separately on the bar graph in two rows, one above the other. The steaming function is indicated by the top row on the graph 261 and includes the stages Steam Delay and Steam On Time. The Steam Delay is indicated by a dark green bar 267 corresponding to the dark green color indicator 231 next to the Steam Delay parameter label. The Steam On Time is indicated by a yellow bar 269 corresponding to the yellow color indicator 231 next to the Steam On Time parameter label. The venting function is indicated by the bottom row on the graph and includes stages Vent Close Delay and Vent Close Time. The Vent Close Delay and Vent Close Time are indicated by a blue bar 271 and a light green bar 273, respectively, corresponding to the blue and light green color indicators 231 next to the Vent Close Delay and Vent Close Time parameter labels. Accordingly, the stages of the two functions of the steam cycle are displayed with respect to each other as a function of time. The graphical representation of the programmed steam cycle permits a user to quickly and conveniently understand how the beginning, end, and duration of each of the functions and their stages relate to each other. For example, it is readily apparent by comparison of the beginning of the light green bar 273 at the bottom of the graph 261 to the beginning of the yellow bar 269 at the top of the graph that the steam injection (Steam On Time) is programmed to begin after the flue valve 115 is closed (Vent Close Time). The graph 261 permits the user to rapidly understand how adjustment of one or more parameters affects the recipe as a whole. The programmed parameters are saved to the tangible storage medium 165.

As noted herein, the screen of the user interface 7 includes a graphical representation 221, 251, 261 of the operational statuses associated with the recipe according to the parameters displayed by the screen. When a user touches the screen and changes one of the parameters, the touch screen 7 provides command signals indicative of the changed parameter to the CPU 163, which responds by providing corresponding control signals to the affected components and systems of the oven 1. The CPU 163 stores the parameter changes in the tangible storage medium 165. In addition, the CPU 163 responds to the parameter changes stored in the medium 165 by revising the graphical representation of the programmed recipe illustrated on the screen to reflect the changed parameters. Thus, the screen illustrates in real time as a bar graph the recipe according to the parameters displayed by the screen. Other graphical representations of the recipe may be displayed by the screen without departing from the scope of the present invention.

It will be appreciated that the programmable parameters shown in the recipe program screens of FIGS. 13, 14, and 15, are provided by example without limitation. For example, the user interface 7 may be configured, for retard, proof, bake, or other recipes, to permit the user to program other functions such as various temperature set points at different times of a recipe, start times and run durations for the blower 61 and/or flue vent fan 113, open times and durations for the flue valve 115 and drain valve, start and run durations for the refrigeration system 141, and/or other parameters. This would provide the user with increased adjustability for tailoring recipes to achieve desired characteristics. Moreover, it will be understood that these parameters may be displayed in a graphical representation like discussed above. For example, if the user interface 7 permitted the user to define the start time and run duration of the blower 61 that parameter could be reflected on the bar graph in the form of a third function including a suitable bar or bars (e.g., positioned above or below the illustrated function bars).

Figure 16:
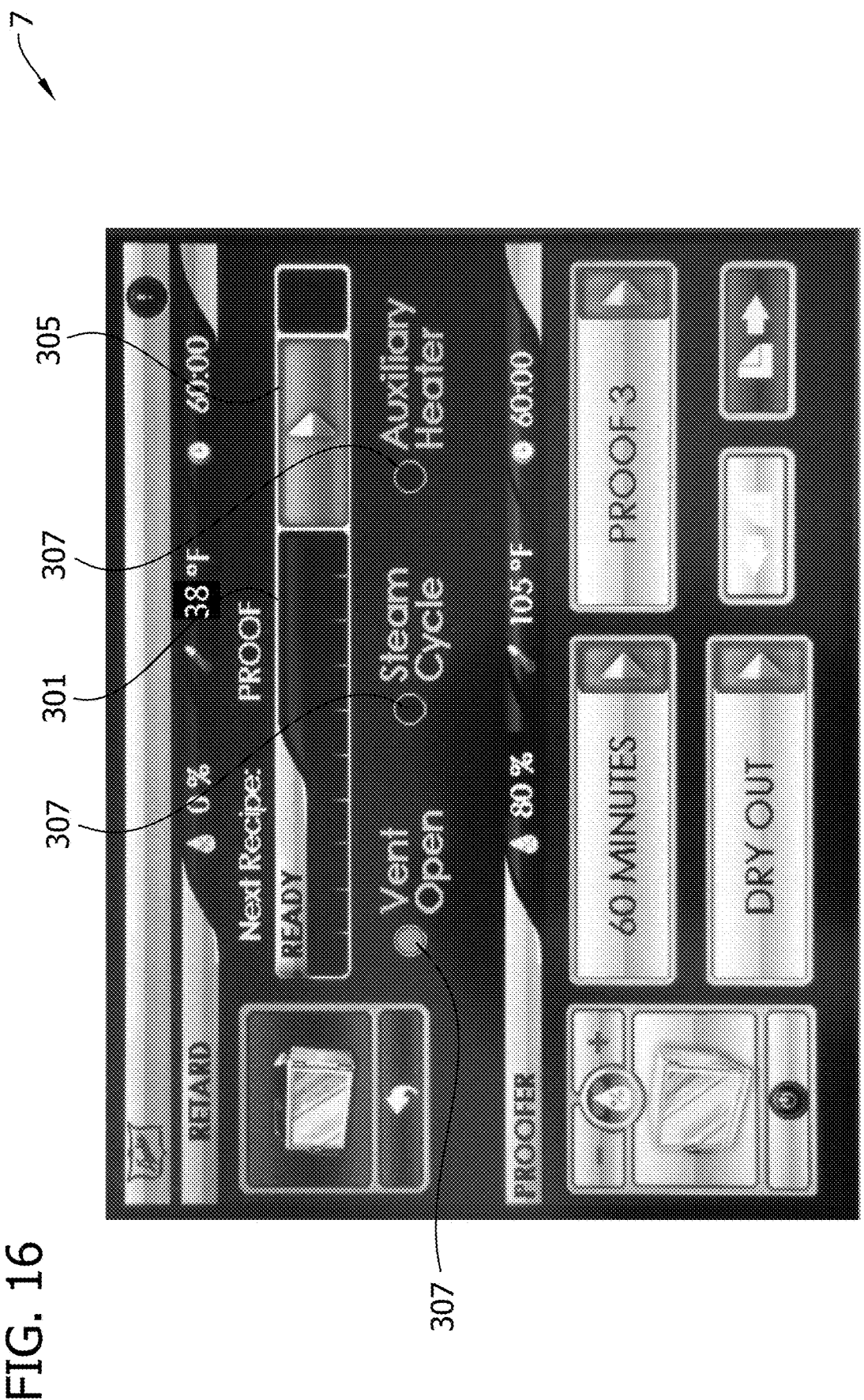
FIG. 16 is a photograph of a screenshot of the user interface showing a retard recipe ready screen.

An example operation of the oven will now be described with respect to the user interface views of FIGS. 11 and 16-28. Referring again to FIG. 11, a programmed recipe may be selected for execution from the Recipe Menu Home Screen. Assuming the user pressed the Retard actuator, the Retard Recipe Ready Screen of FIG. 16 would be shown. This screen includes recipe set point indicators along the top of the screen indicating the 0% Oven Humidity, 38 degrees F. Recipe Set Point, and 60:00 minute Recipe Time previously programmed. Below the recipe set point indicators, the screen indicates the "chained" recipe by the text "Next Recipe: PROOF," which was previously programmed. The screen also includes a time bar 301, a start actuator 305 represented by an arrow outlined in green, and a series of operational status indicators 307 relating to the programmed parameters, including Vent Open, Steam Cycle, and Auxiliary Heater. The operational status indicators 307 are shown as active (illuminated) or inactive (dark), and may show different active colors, depending on the status of the respective parameter or food preparation environment control device at any given time during execution of the recipe. The colors shown on the operational status indicators 307 when illuminated may correspond to the colors of the parameter color indicators next to the parameter labels on the recipe program screen.

Figure 17:
FIG. 17 is a photograph of a screenshot of the user interface showing a retard recipe run screen.
Figure 18:
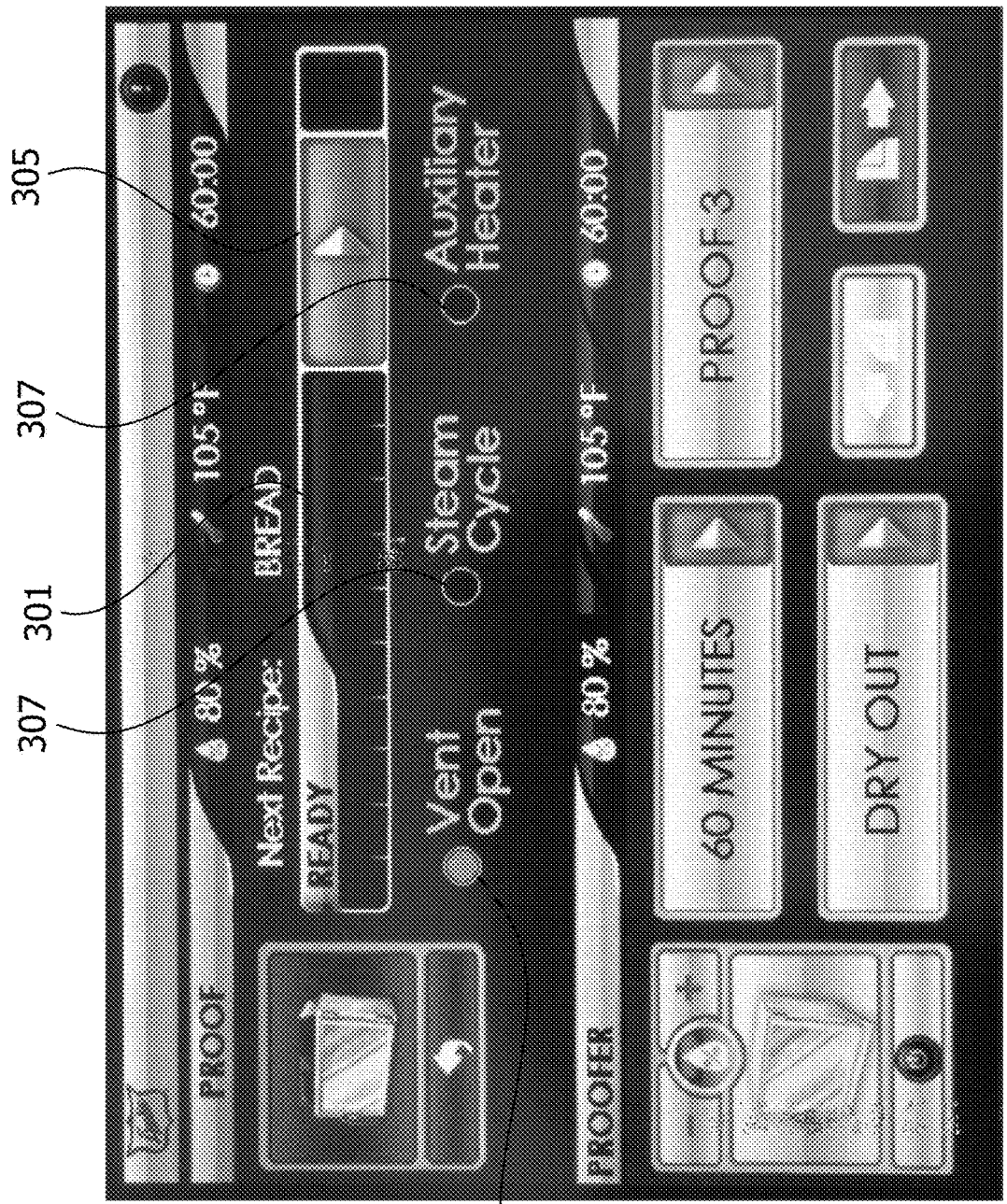
FIG. 18 is a photograph of a screenshot of the user interface showing a proof recipe ready screen.

After the user presses the start actuator 305, the oven will begin executing the recipe and the screen will change to the Retard Recipe Run Screen shown in FIG. 17. As the Retard recipe runs, the screen will look substantially the same as that displayed in FIG. 17 for the duration of the recipe, except the time bar 301 and a countdown timer 311 (collectively or separately, broadly referred to as "countdown display") will be continuously updated to indicate the passage of recipe time. The Vent Open operational status indicator 307 will be dark to indicate the flue valve 115 is closed. The refrigeration system 141 will be operated to maintain the 38 degrees F. set point for 60 minutes. The blower 61 may be off or operated in a relatively slow or pulsed fashion.

Figure 19:
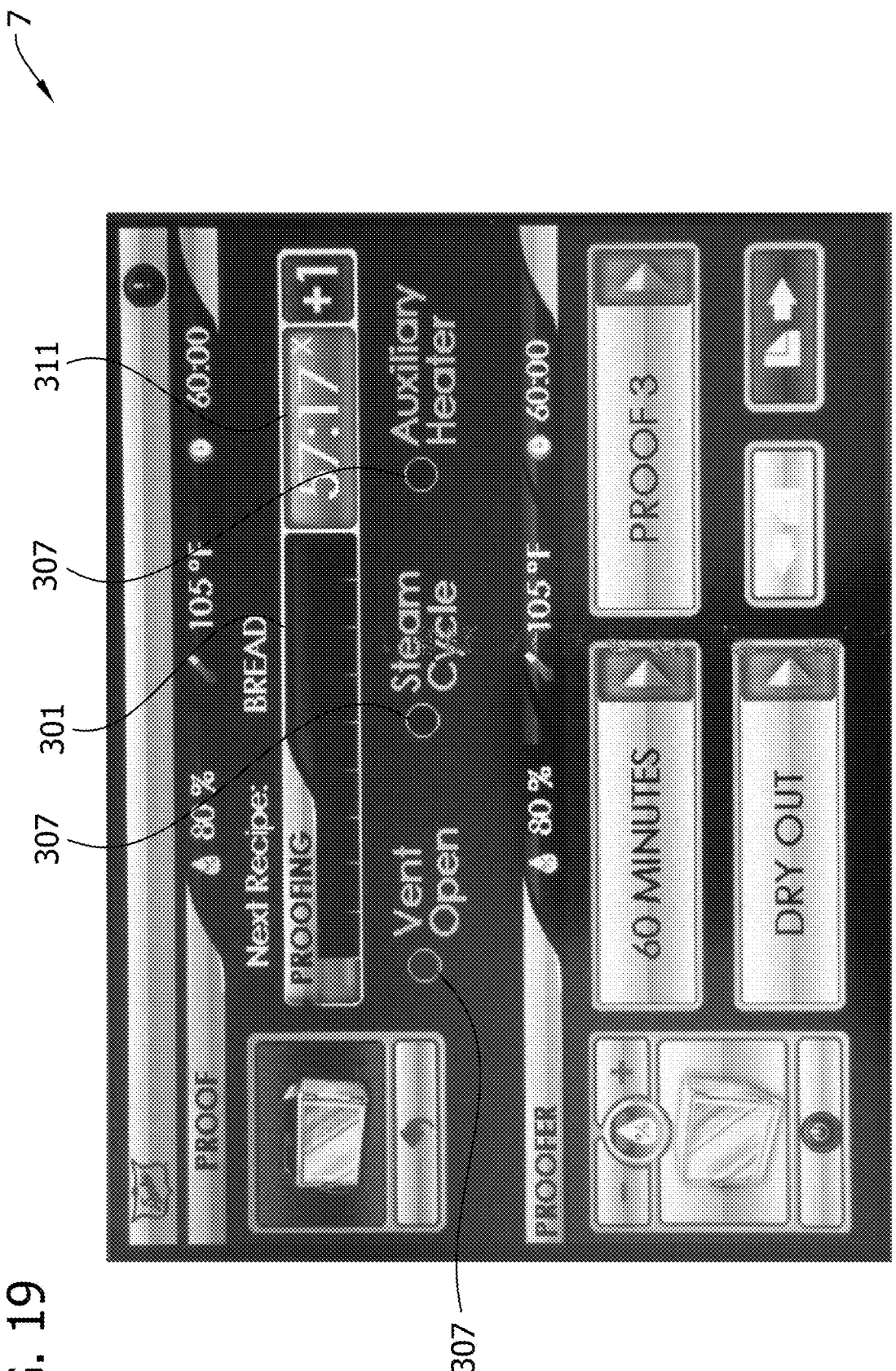
FIG. 19 is a photograph of a screenshot of the user interface showing a proof recipe run screen.
Figure 20:
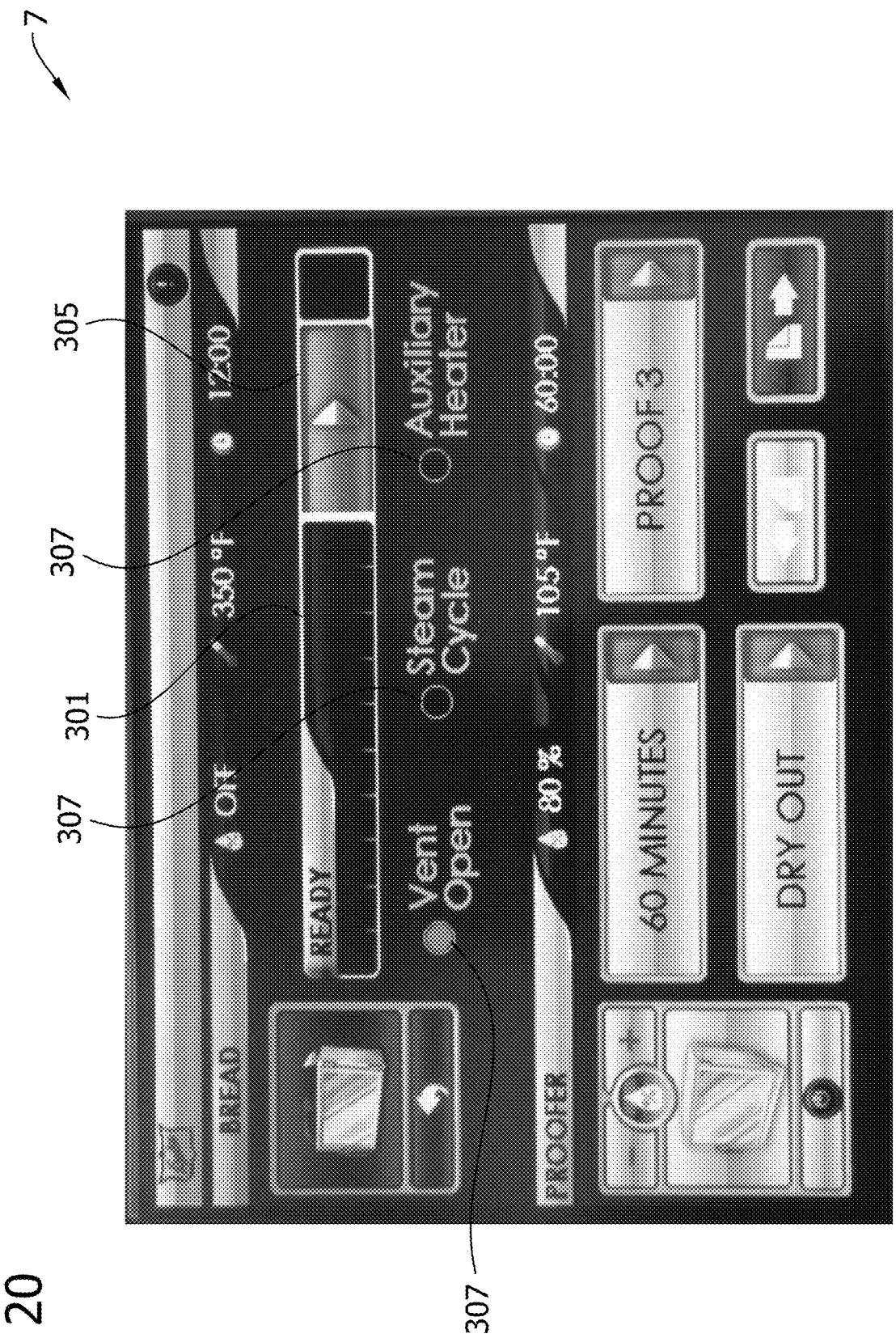
FIG. 20 is a photograph of a screenshot of the user interface showing a bread recipe ready screen.

At the end of the Retard recipe, the chained Proof recipe will begin automatically, and the Proof Recipe Run Screen of FIG. 19 will be shown. If the Proof recipe were not chained to start automatically, the user could navigate to the Proof Recipe Ready Screen shown in FIG. 18 and press the start actuator 305 to initiate the Proof recipe. As the Proof recipe runs, the screen will look substantially the same as that displayed in FIG. 19 for the duration of the recipe, except the time bar 301 and countdown timer 311 will be continuously updated to indicate the passage of recipe time.

The Vent Open operational status indicator 307 is dark to indicate the flue valve is closed. The blower 61 and heating system 71 will operate to maintain the 105 degree F. set point, and the steam injection system 91 will operate as needed to maintain the 80% relative humidity set point for 60 minutes. Alternatively, a humidification system separate from the steam injection system 91 may be used in maintaining the 80% relative humidity set point. The blower 61 may be off or operated in a relatively slow or pulsed fashion.

Figure 21:
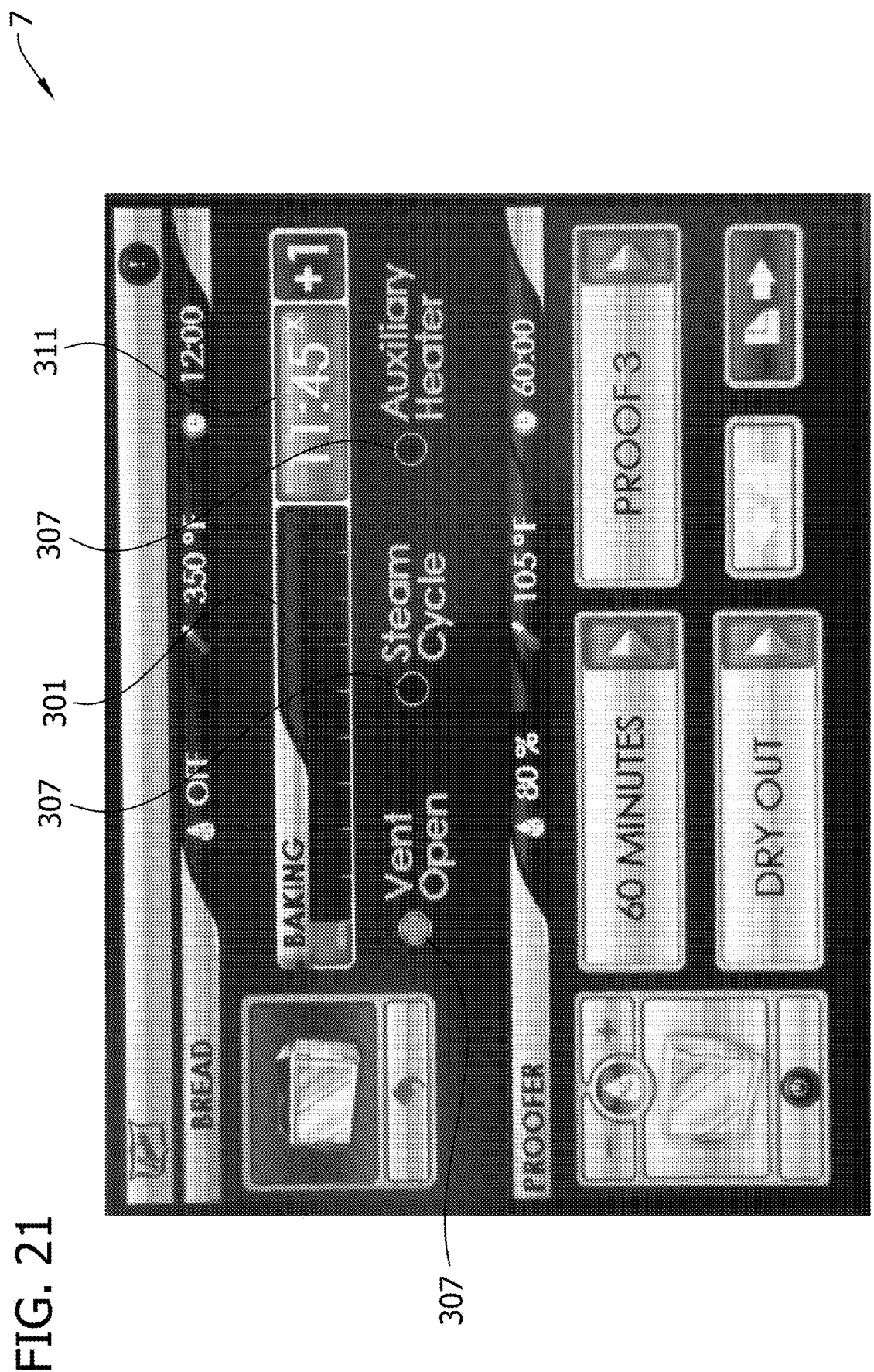
FIGS. 21-28 are photographs of screenshots of the user interface showing a bread recipe run screen at various stages of executing the bread recipe, with Vent Open, Steam Cycle, and Auxiliary Heat operational status indicators being shown in various states.
Figure 22:
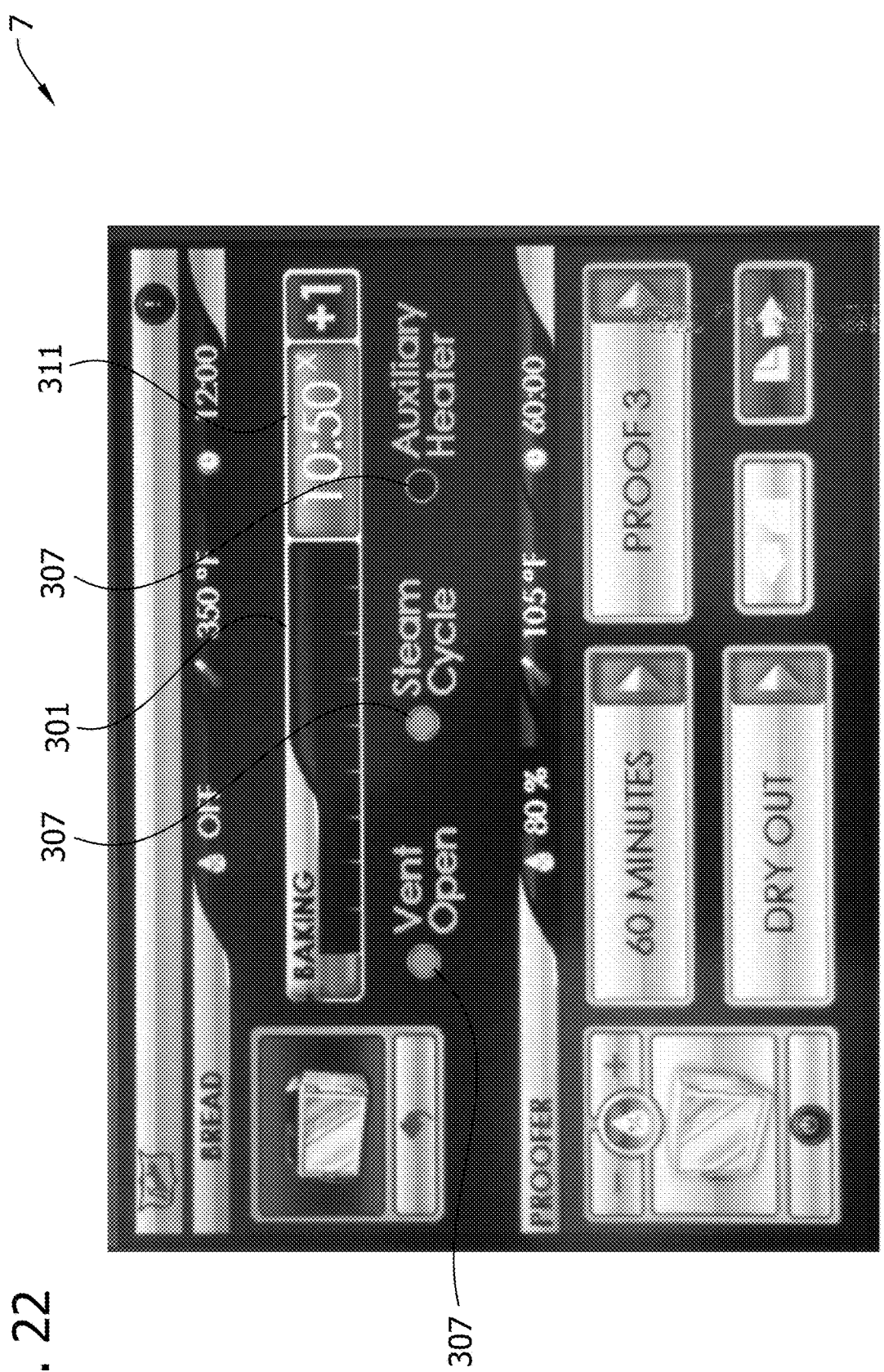
Figure 23:
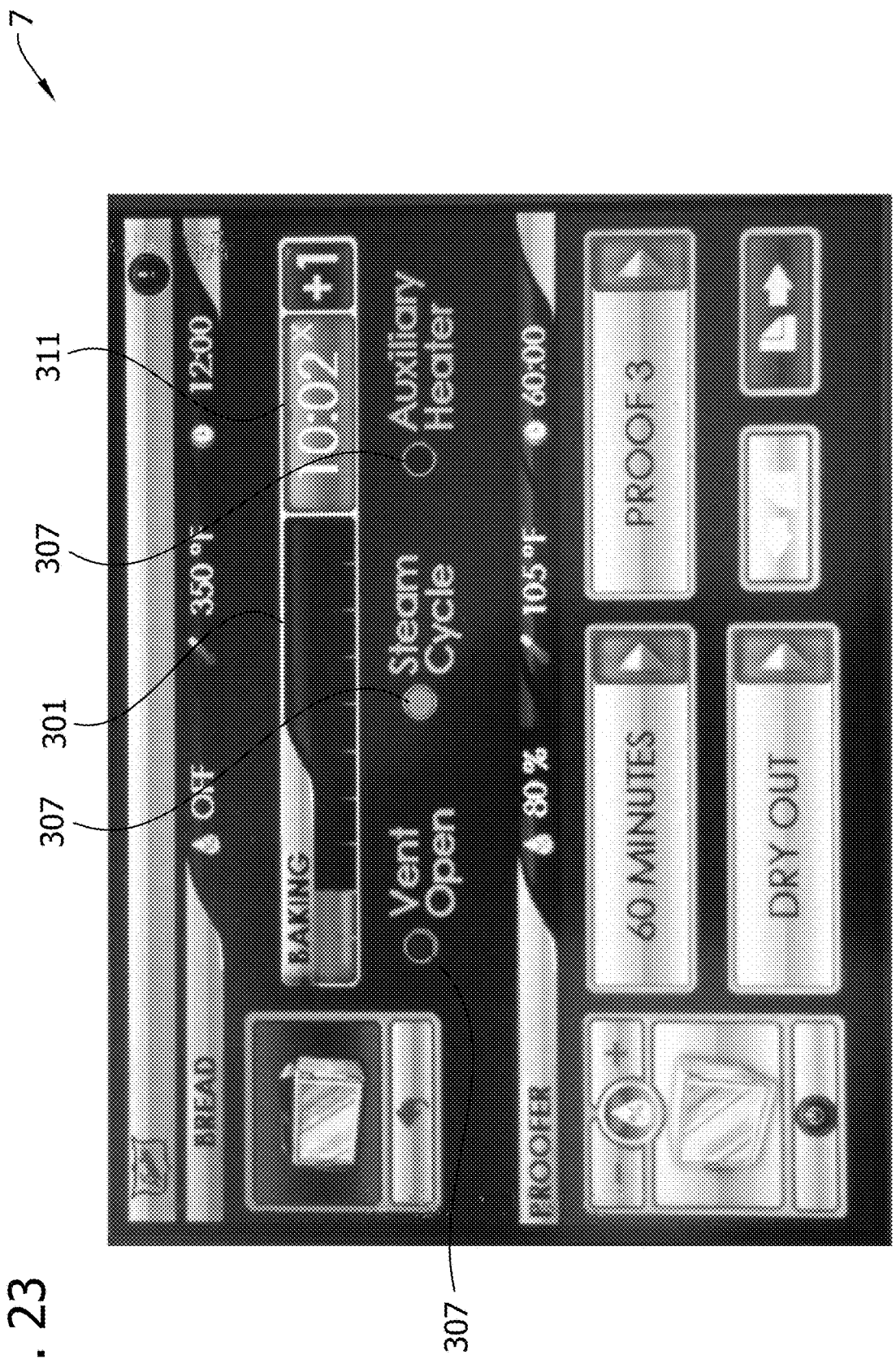
Figure 24:
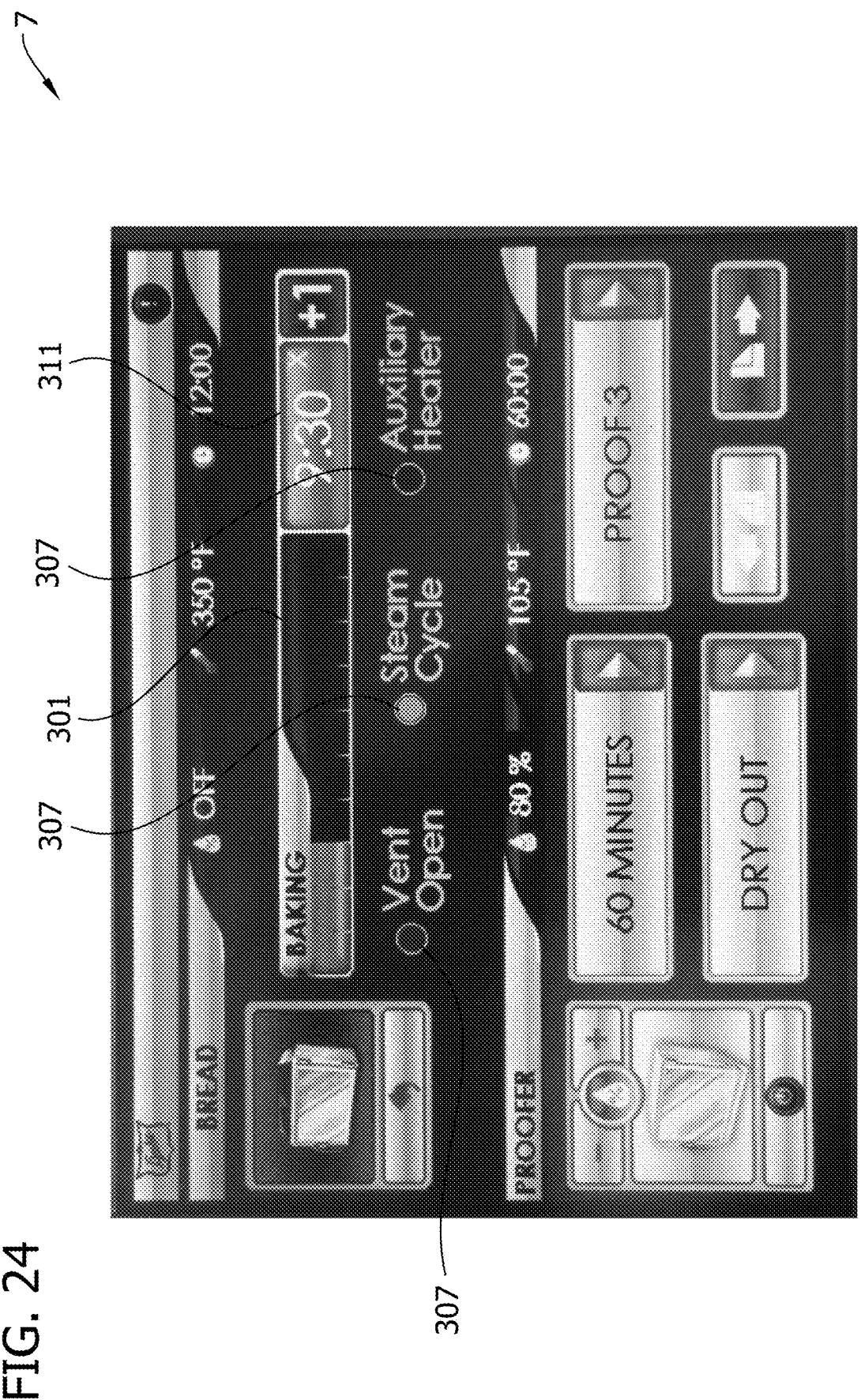
Figure 25:
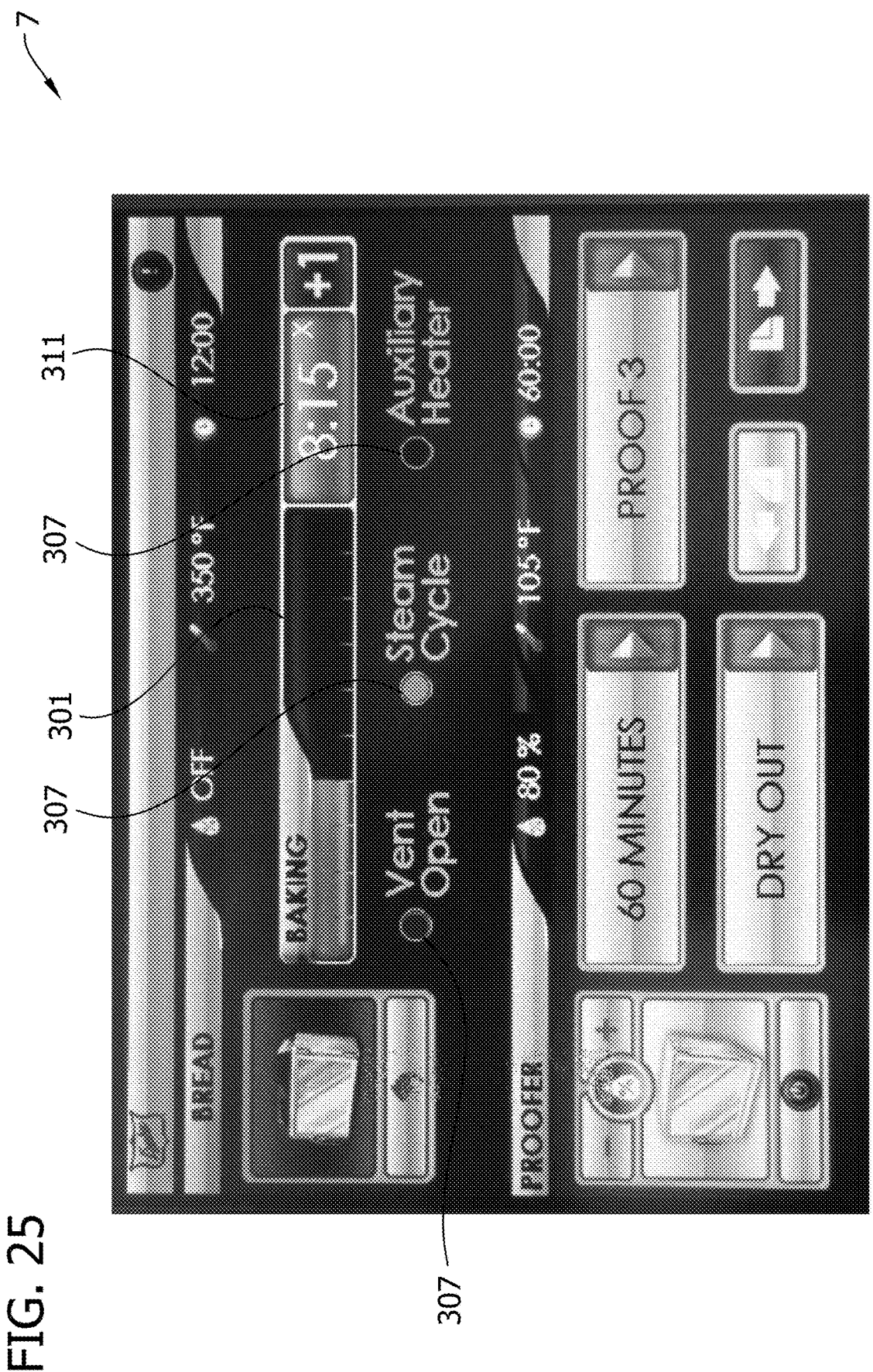
Figure 26:
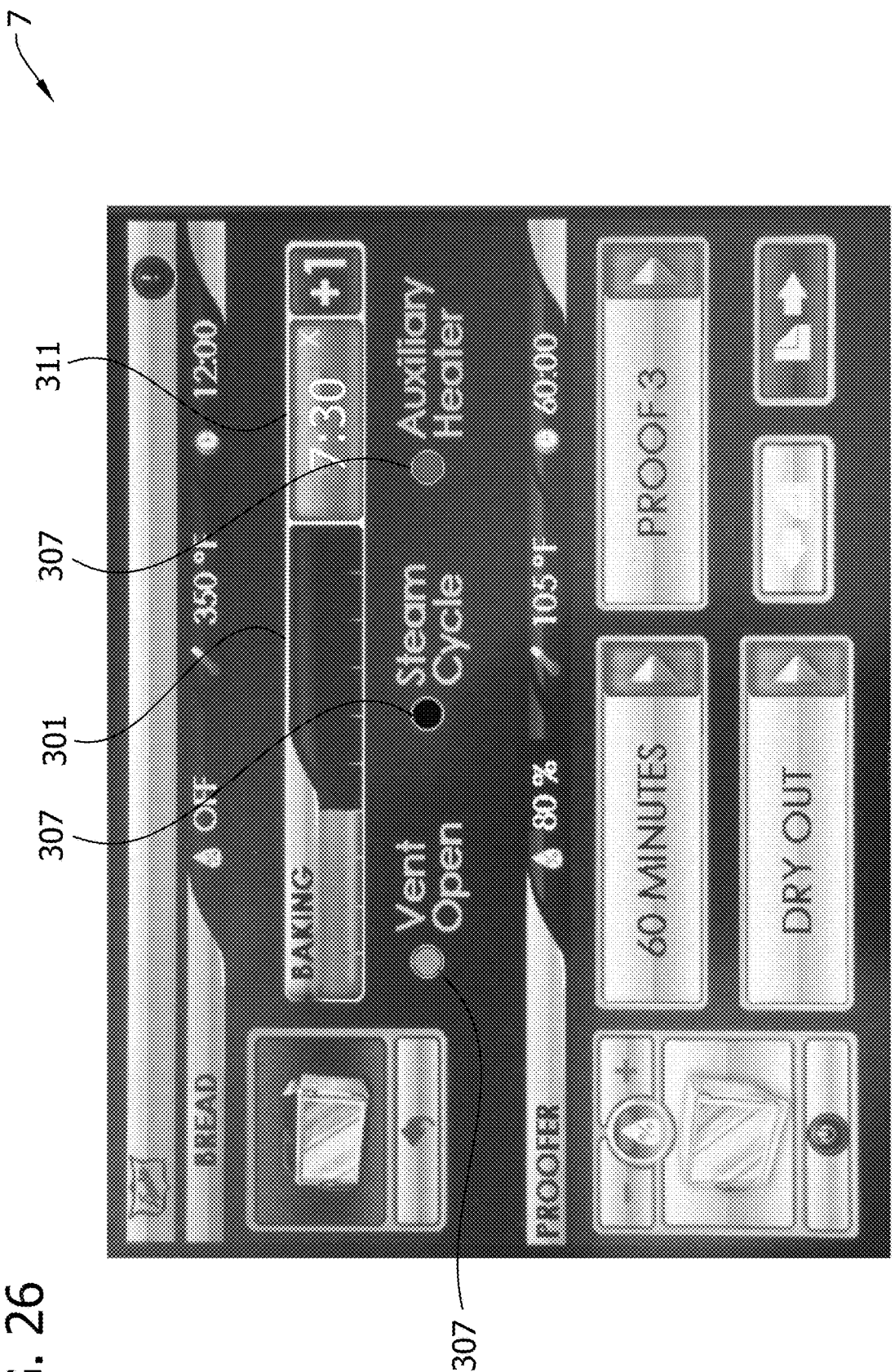
Figure 27:
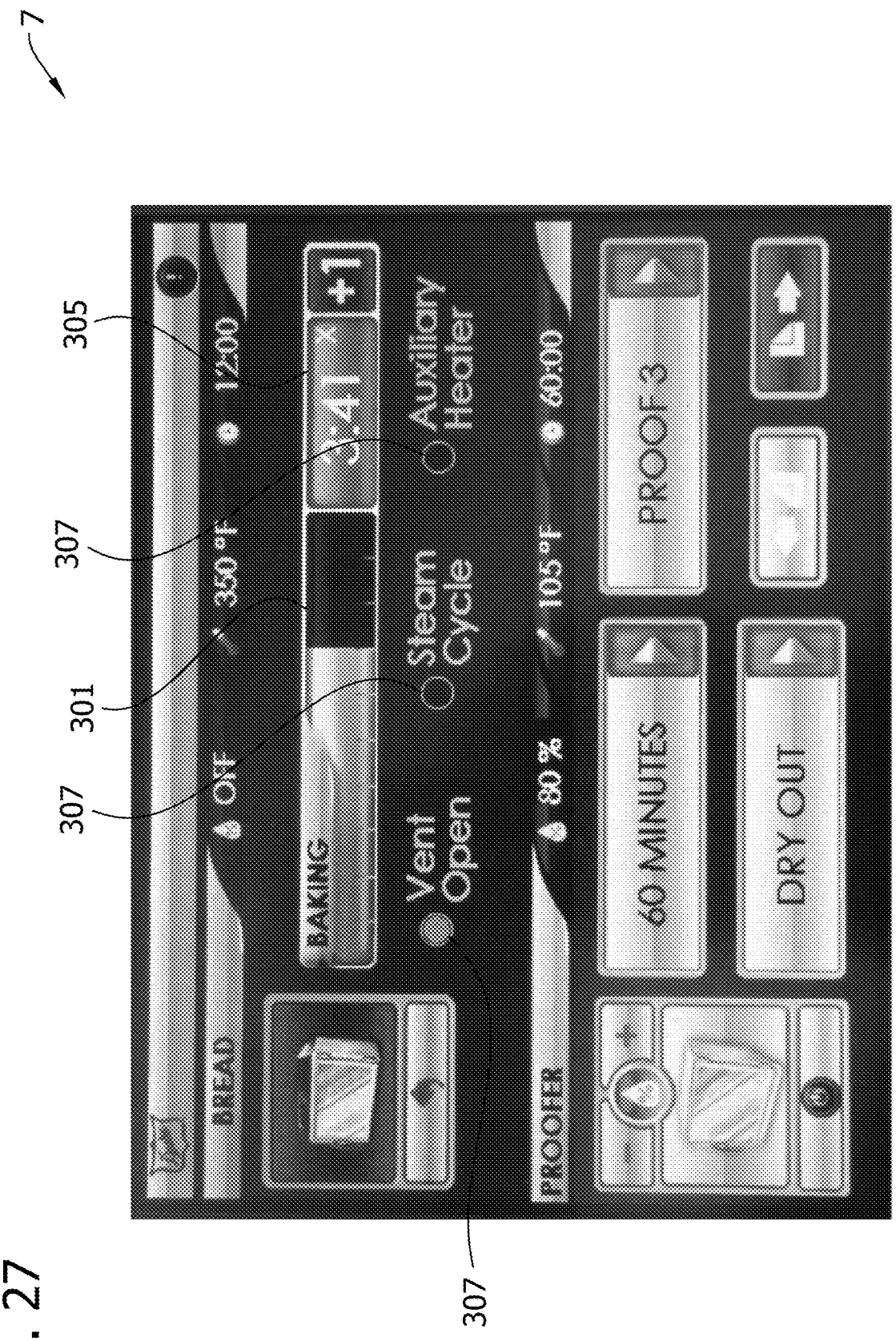
Figure 28:
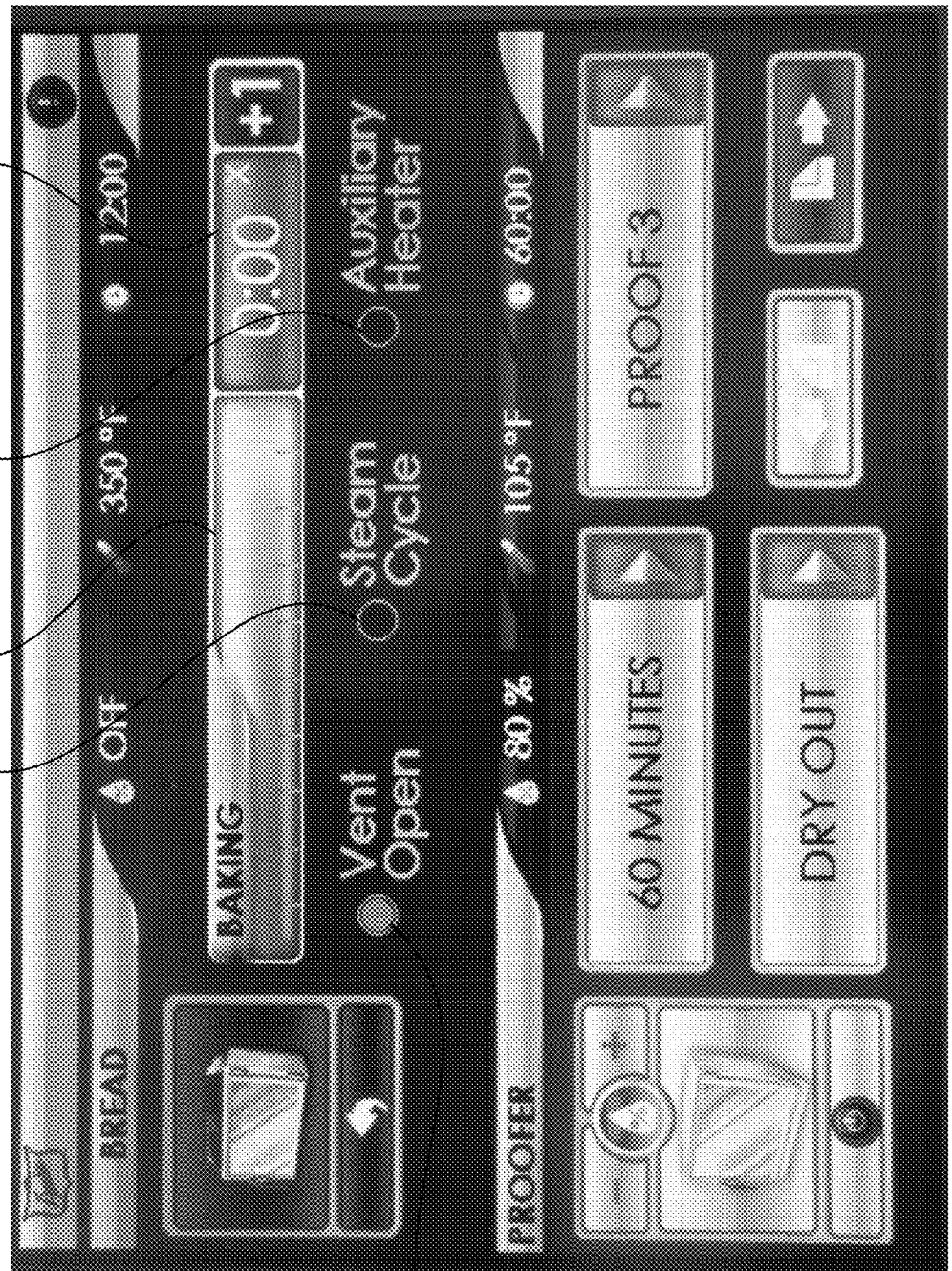

At the end of the Proof recipe, the chained Bread (bake) recipe will begin automatically, and the Bread Recipe Run Screen of FIG. 21 will be shown. If the Bread recipe were not chained to start automatically, the user could navigate to the Bread Recipe Ready Screen shown in FIG. 20 and press the start actuator 305 to initiate the Bread recipe. As the Bread recipe runs, the time bar 301 and countdown timer 311 will be continuously updated to indicate the passage of recipe time, and the operational status indicators 307 will be lit and unlit based on the status of the respective parameters or food preparation environment control devices. Between countdown times 12:00 and 11:00 (e.g., at countdown time 11:45 as shown in FIG. 21), the Vent Open operational status indicator 307 will be illuminated because the flue valve 115 will be open during the pre-bake before the steam cycle. Between countdown times 11:00 and 10:30 (e.g., at countdown time 10:50 as shown in FIG. 22), the Steam Cycle operational status indicator 307 will be illuminated to show the steam cycle has begun. The status indicator 307 will be illuminated in blue to indicate delay before injecting steam. The blower 61 and heating system 71 may be de-energized at the beginning of the steam cycle (i.e., at the beginning of the Steam Delay stage). Desirably, this provides the blower 61 with sufficient time to "spin down" or stop rotating before steam injection begins. The Vent Open operational status indicator 307 is still illuminated. Between countdown times 10:30 and 10:00 (e.g., at countdown time 10:02 shown in FIG. 23), the Vent Open operational status indicator 307 will be dark indicating the flue valve 115 is closed. The flue valve 115 is closed before steam injection so steam is not lost out of the flue when it is injected into the chamber. The Steam Cycle operational status indicator 307 is still illuminated in blue to indicate delay before steam injection. Presumably, the blower 61 has stopped or almost stopped spinning by now. Between countdown times 10:00 and 8:30 (e.g., at countdown time 9:30 as shown in FIG. 24), the Vent Open operational status indicator 307 will remain dark, and the Steam Cycle operational status indicator will be illuminated in yellow to indicate steam is being injected into the chamber 11. The yellow color corresponds to the yellow color indicator 231 next to the Steam On Time parameter label on the Bread Recipe Program Screen (see FIG. 15). The blower 61 and heating system 71 may remain off, or they may be pulsed. For example, the blower 61 may be pulsed to provide minimal gas circulation in the chamber 11 to cause steam in the chamber to flow into contact with the dough. Between countdown times 8:30 and 7:30 (e.g., at countdown time 8:15 as shown in FIG. 25), the Steam Cycle operational status indicator 307 will be illuminated in blue to indicate the steam injection has ended. The Vent Open operational status indicator 307 will remain dark until the end of the Vent Close Time (i.e., at countdown time 7:30). The flue valve 115 may be kept closed during this time to provide the injected steam with additional time to saturate the chamber 11 and contact the dough. At the end of the steam cycle (i.e., at countdown time 7:30), the blower 61 and heating system 71 may re-energize to bring the temperature in the chamber 11 back to the Recipe Set Point for the remainder of the recipe time. As shown in FIG. 26, the Auxiliary Heater operational status indicator 307 may be illuminated red for a period of time after the end of the steam cycle indicating that the auxiliary heater 75 is being used to assist the primary heater 73 in re-establishing the Recipe Set Point. The auxiliary heater 75 will be operated at the programmed Aux Heat Duty Cycle. After the Recipe Set Point is achieved again in the chamber 11 (e.g., by countdown time 3:41 as shown in FIG. 27), the auxiliary heater 75 may be turned off, as indicated by the Auxiliary Heater operational status indicator 307 being dark. The blower 61 and heating system 71 operate for the remainder of the countdown time to maintain the Recipe Set Point temperature. At the end of the recipe, the time bar 301 has timed out, the countdown timer 311 shows 0:00, and an alarm may sound.

Figure 29:
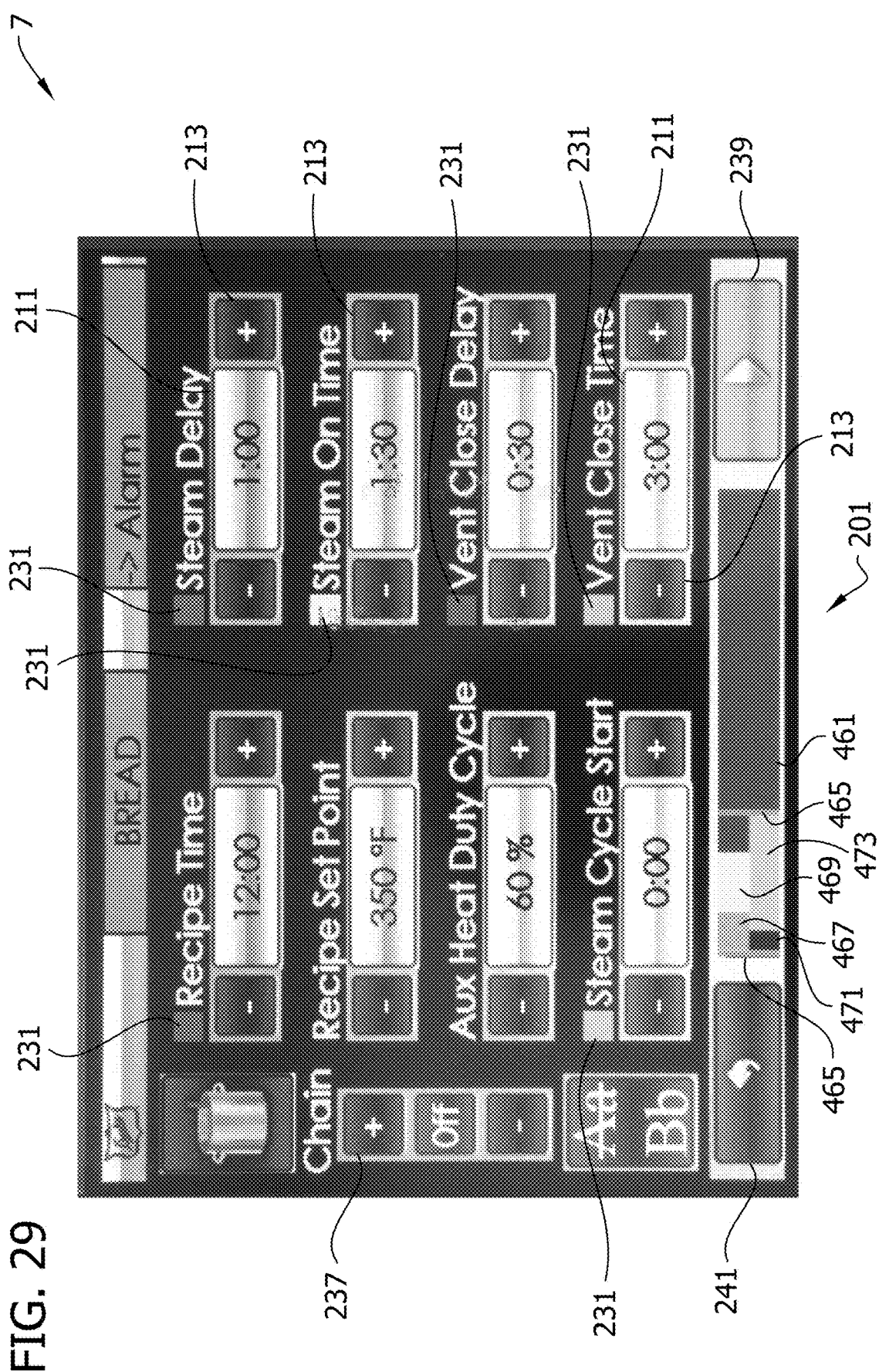
FIG. 29 is a photograph of a screenshot of the user interface showing the bread recipe program screen with an alternative recipe.
Figure 30:
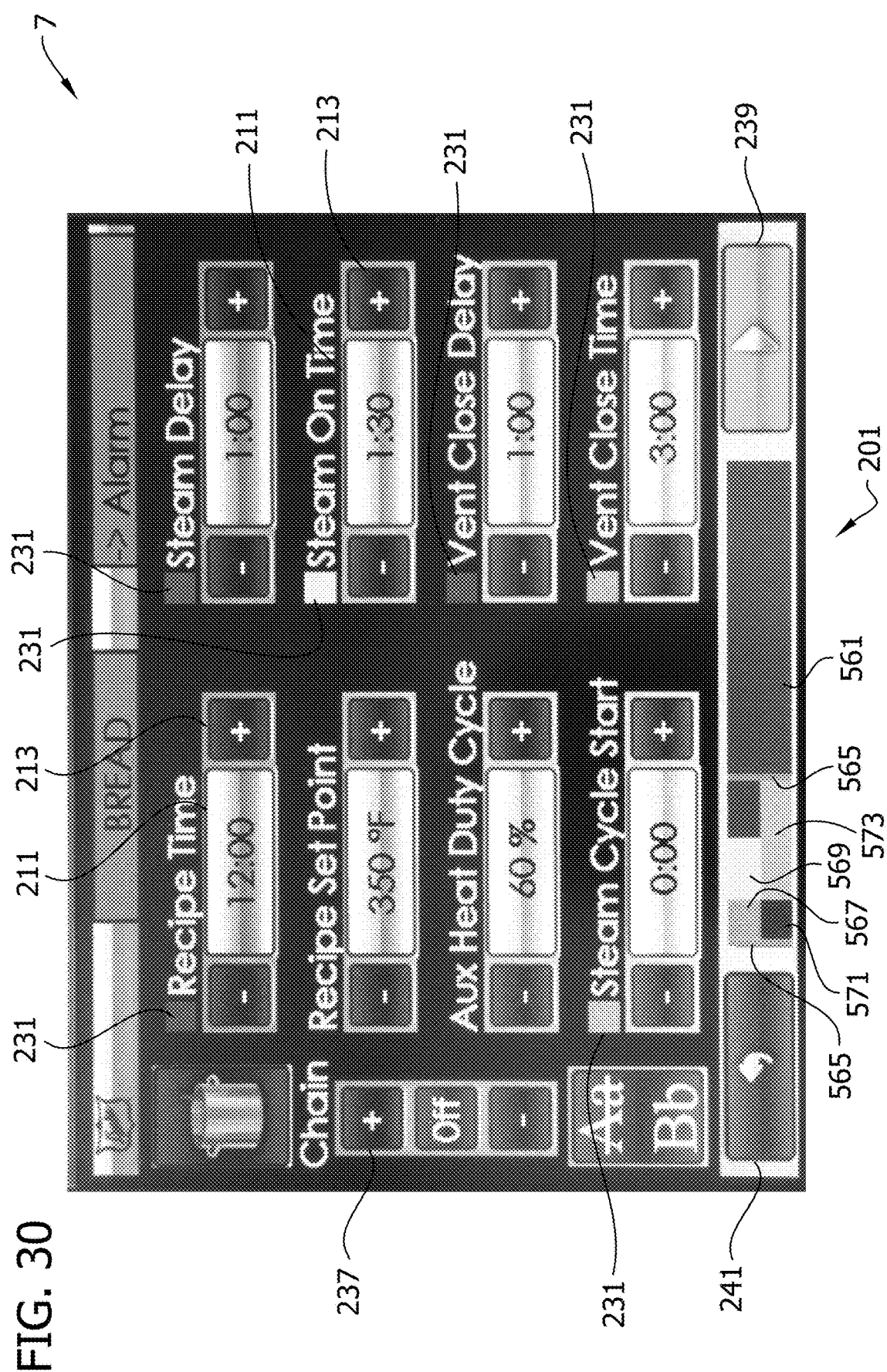
FIG. 30 is a photograph of a screenshot of the user interface showing the bread recipe program screen with another alternative recipe.
Figure 31:
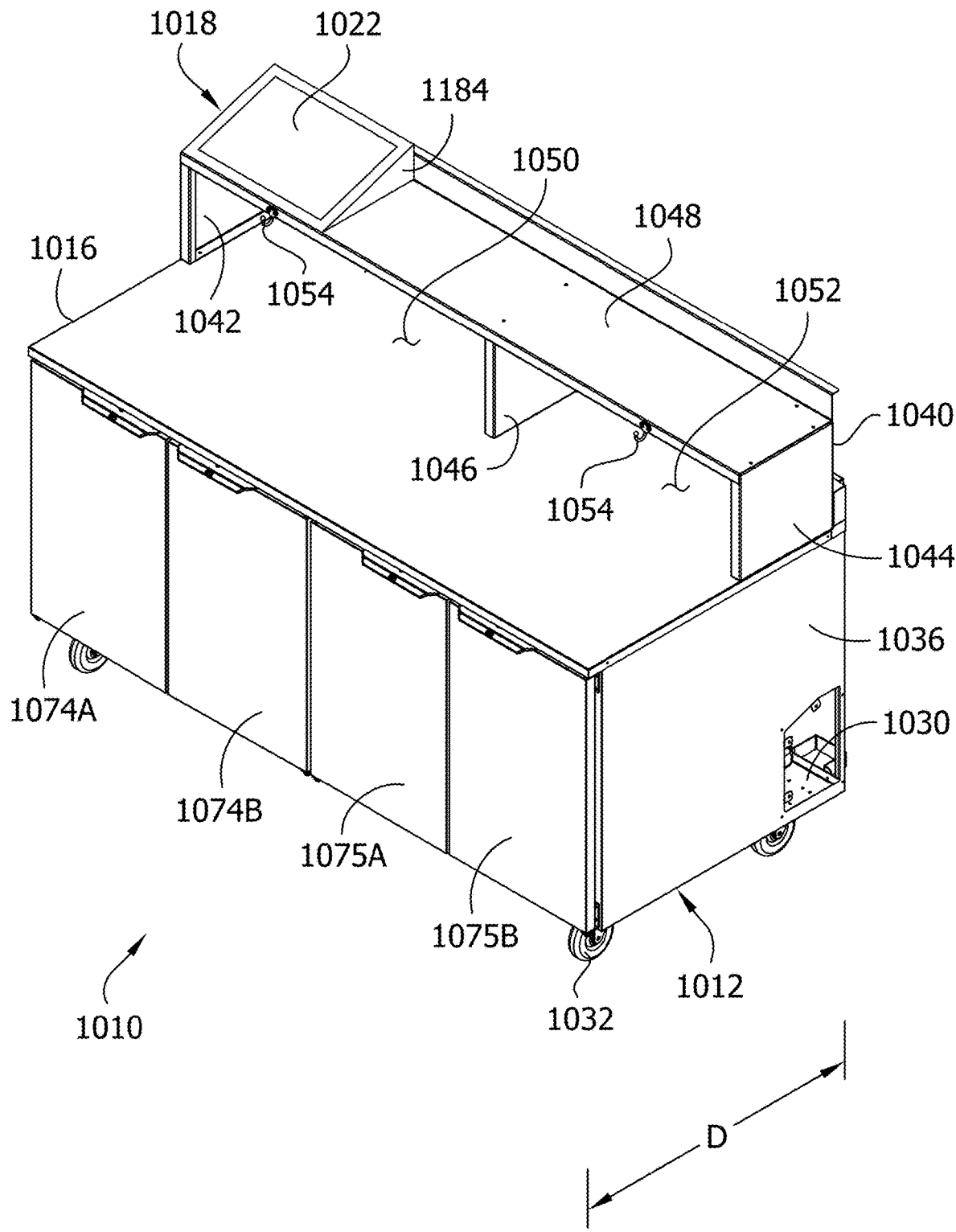
FIG. 31 is a perspective of a dough preparation apparatus.

FIGS. 29 and 30 illustrate alternative embodiments of Bread (Bake) recipes and corresponding graphical representations 461, 561. The recipe of FIG. 29 includes similar parameters as the Bread recipe described above, except for the Steam Cycle Start parameter is 0:00, meaning the steam cycle will start at the beginning of the recipe rather than after a delay. Like the graphical representation 261, this graphical representation 461 includes vertically extending orange bars 465 designating the steam cycle, a dark green bar 467 indicating the Steam Delay, a yellow bar 469 designating the Steam On Time, a blue bar 471 designating the Vent Close Delay, and a light green bar 473 designating the Vent Close Time. The recipe of FIG. 30 includes similar parameters as the Bread recipe described above, except there is no delay before the start of the steam cycle, and the Steam Delay and Vent Close Delay parameters have the same values such that the steam injection begins at the same time as the flue valve 115 closes. The graphical representation 561 includes vertically extending orange bars 565 designating the steam cycle, a dark green bar 567 indicating the Steam Delay, a yellow bar 569 designating the Steam On Time, a blue bar 571 designating the Vent Close Delay, and a light green bar 573 designating the Vent Close Time. Other recipes may be used without departing from the scope of the present invention. For example, the flue valve 115 may not be closed until after steam injection begins. It will be understood that the user interface permits custom tailoring of the respective variables such that recipes can be programmed by controlling parameters (e.g., operational status of different food preparation environment control devices) independently from each other.

It will be appreciated that the retard, proof, and bake recipes described above are provided by way of example without limitation. Other recipes may be used without departing from the scope of the present invention. For example, the storage medium 165 may include instructions for executing any one of the examples below or combinations thereof. A hold recipe may be used to hold dough in a frozen or slacked state before a retard recipe. The oven 1 may be programmed for holding food such as grilled chicken, fried chicken, hamburger patties, etc. in a cooked state prior to serving. The oven 1 may be programmed to execute a retard recipe in which the steam injection system 91 is used (e.g., delivers a small volume of steam) to introduce moisture into the chamber 11 to assist in the retard process. A retard recipe may be chained directly to a bake recipe such that the oven executes a bake recipe automatically after executing a retard recipe (no intermediate proof recipe). The refrigeration system 141 may be used in a bake recipe. For example, the refrigeration system 141 may be used at or near the end of a bake recipe to rapidly cool the chamber 11 so that less heat emits from the oven when opened by a user and/or so that the baked bread cools more rapidly and can be served for consumption more quickly. The active venting flue fan 113 and/or the refrigeration system 141 may be used at or near the end of a bake recipe and/or between a bake recipe and a proof recipe for rapidly cooling the chamber 11. Retard, proof, and/or bake recipes may include different temperature set points at various times of the recipe.

The following 60 minute retard recipes, which the storage medium 15 may include instructions for executing, are provided as additional examples, including various stages listed in order of execution: 1) 20 minutes at 35 degrees F., 20 minutes at 45 degrees F., and 20 minutes at 55 degrees F.; 2) 20 minutes at 65 degrees F., 20 minutes at 60 degrees F., and 20 minutes at 50 degrees F.; 3) 10 minutes at 100 degrees F., 20 minutes at 60 degrees F., and 30 minutes at 50 degrees F.; 4) 20 minutes at 100 degrees F., 20 minutes at 40 degrees F., and 20 minutes at 65 degrees F.; and 5) 20 minutes at 40 degrees F., 20 minutes at 100 degrees F., and 20 minutes at 50 degrees F. Accordingly, the oven 1 may be programmed with retard recipes in which there are multiple stages including differently programmed parameters, in which multiple stages include different durations, in which not only the refrigeration system but also the heating system is used, in which the recipe set point temperature increases over the recipe duration, in which the recipe set point temperature decreases over the recipe duration, in which the recipe set point temperature increases then decreases over the recipe duration, and/or in which the recipe set point temperature decreases then increases over the recipe duration. Desirably, at the end of a retard recipe, the dough is about 50 to 55 degrees F. It may be desirable to heat the dough for a duration of the retard recipe to decrease the time required to bring the dough to such a temperature, or to bring the dough to such a temperature more evenly (i.e., inside and out). It will be appreciated that the 60 minute retard recipe time is provided as an example without limitation. The recipe times may be longer or shorter without departing from the scope of the present invention.

In an aspect of the present invention, the oven 1 may be programmed to provide a user with a warning indication that the end of a recipe is upcoming. The warning indication may be an audio (e.g., an alarm such as a chirp or beep) and/or visual (e.g., flash of the lights 83 inside the chamber 11) indication. For example, the storage medium 165 may include instructions to provide a warning indication when there is 5, 4, 3, 2, and/or 1, etc. minutes remaining on a given recipe (e.g., retard, proof, or bake recipe). This may be useful to remind a user to check on the performance of a recipe while it is being executed and to prompt the user to determine whether the recipe should be altered before it ends. For example, as shown in FIGS. 17, 19, and 21, the run screens for the retard, proof, and bake recipes each include, to the right of the countdown timer, a "plus one minute" actuator represented by "+1" outlined in blue. If a user notices that a certain execution of a recipe could benefit from additional time (e.g., bread not fully retarded, proofed, or baked), the user can press the "+1" actuator to lengthen the recipe in increments of one minute per press of the actuator. The warning indicator may be particularly helpful when recipes are chained together and the user would like to modify (e.g., lengthen) the recipe being executed before the control system automatically starts the next recipe. The next recipe may include significantly different parameters (e.g., temperature, humidity, etc.) such that after the next recipe starts, it would be difficult for the user to quickly recreate the conditions in the chamber used for the previous recipe.

It will be appreciated that food preparation apparatus such as the oven 1 described herein may be used for programming and testing new food preparation recipes. For example, the oven 1 may be used to program retarding, proofing, and/or baking recipes thought to impart desirable characteristics (e.g., taste, texture, color) on baked bread. The graphic representation of the recipes provides convenient understanding of how the programmed relate to each other as a function of time and how modification of various parameters affects the recipe as a whole. The oven can be used to execute the programmed recipes, and if satisfactory, the tested recipes can be used to program production ovens. For example, the tested recipes may be copied from the tangible memory 165 to a USB flash drive (or other portable tangible memory) for uploading to other ovens (e.g., located in remote food service stores).

It will be understood that the user interface 7 disclosed herein has broader applicability than merely for food preparation apparatus such as the oven discussed herein. For example, the user interface 7 may be used in other recipe-implementing apparatus in which it may be desirable to display a graphic representation of a recipe with respect to time. For example without limitation, such a user interface 7 may be used in conjunction with a dish washer (ware washer), clothes washer, food holding cabinet, etc. Recipes having multiple functions and/or multiple stages can be shown graphically with respect to time to facilitate user comprehension of the recipes as programmed. Recipe-implementing apparatus other than ovens or food preparation apparatus may be used without departing from the scope of the present invention.

Referring to FIGS. 31-39, an embodiment of a dough preparation apparatus, which may be referred to as a dough preparation work station, is generally indicated at reference number 1010. The dough preparation apparatus 1010 includes a cabinet 1012 having separate left and right dough preparation chambers 1014, 1015 (FIGS. 33 and 34) that are arranged side-by-side. Other numbers of chambers (e.g., one, three, four, etc.) can be provided without departing from the scope of the present invention. The cabinet 1012 has a counter 1016 above the first and second dough preparation chambers 1014, 1015. The counter 1016 has an exposed upper work surface positioned at about waist height of an average adult person when standing. As explained in further detail below, the dough preparation apparatus 1010 includes multiple chamber conditioning systems configured to independently adjust various environmental conditions of the left and right dough preparation chambers 1014, 1015. As will be appreciated, the dough preparation apparatus 1010 provides a multipurpose dough preparation station for user handling and automated processing of frozen dough prior to proofing.

Figure 42:
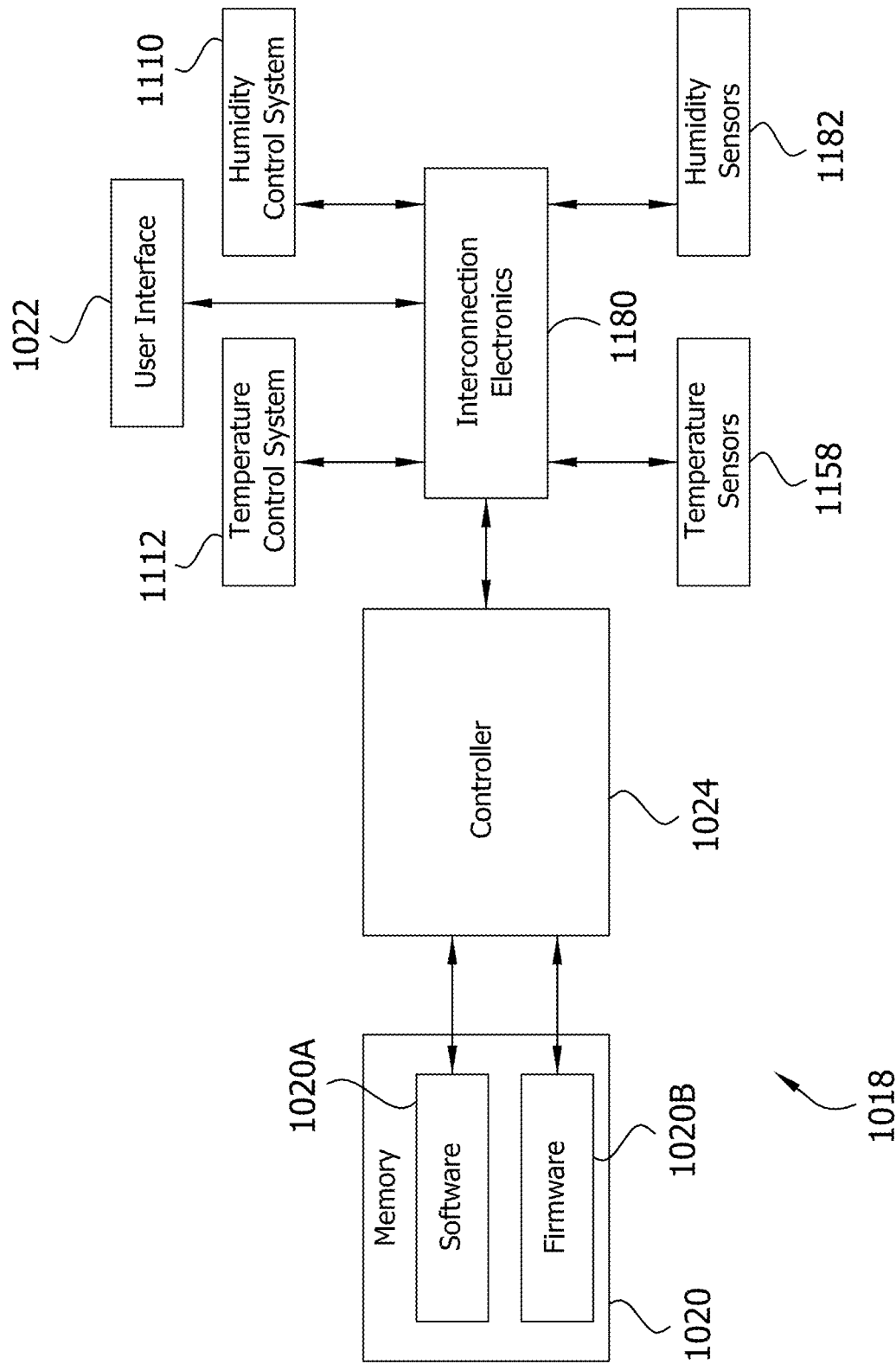
FIG. 42 is a schematic block diagram of a control system of the dough preparation apparatus.

To automate and precisely control various dough preparation processes, the dough preparation apparatus 1010 includes a control system 1018 that, as shown schematically in FIG. 42, comprises a memory 1020 for storing a plurality of dough preparation recipes. As explained below, a user can select a recipe using a user interface 1022, whereby a controller 1024 reads the selected recipe from the memory 1020 and executes the recipe in a selected one of the left and right chambers 1014, 1015 using one or more of the chamber conditioning systems. Exemplary recipes discussed in greater detail below may be configured to slowly thaw dough from a frozen state to a slacked or thawed state and maintain the dough in the slacked or thawed state for extended durations; condition dough from the slacked or thawed state to a conditioned state in which the dough is ready for proofing; hold dough in the conditioned state for a period of time; rapidly thaw dough from a frozen state to the slacked or thawed state; and/or hold dough in a frozen state prior to thawing. As will be appreciated, these exemplary recipes can be used to precisely control aspects of preparing frozen dough for subsequent proofing and baking. It will be appreciated that the dough preparation apparatus provides precise control of the thawing, conditioning, and holding environments. Baked products having improved characteristics are possible because of the consistency and precise control over the preparation environments in the chambers 1014, 1015.

Figure 32:
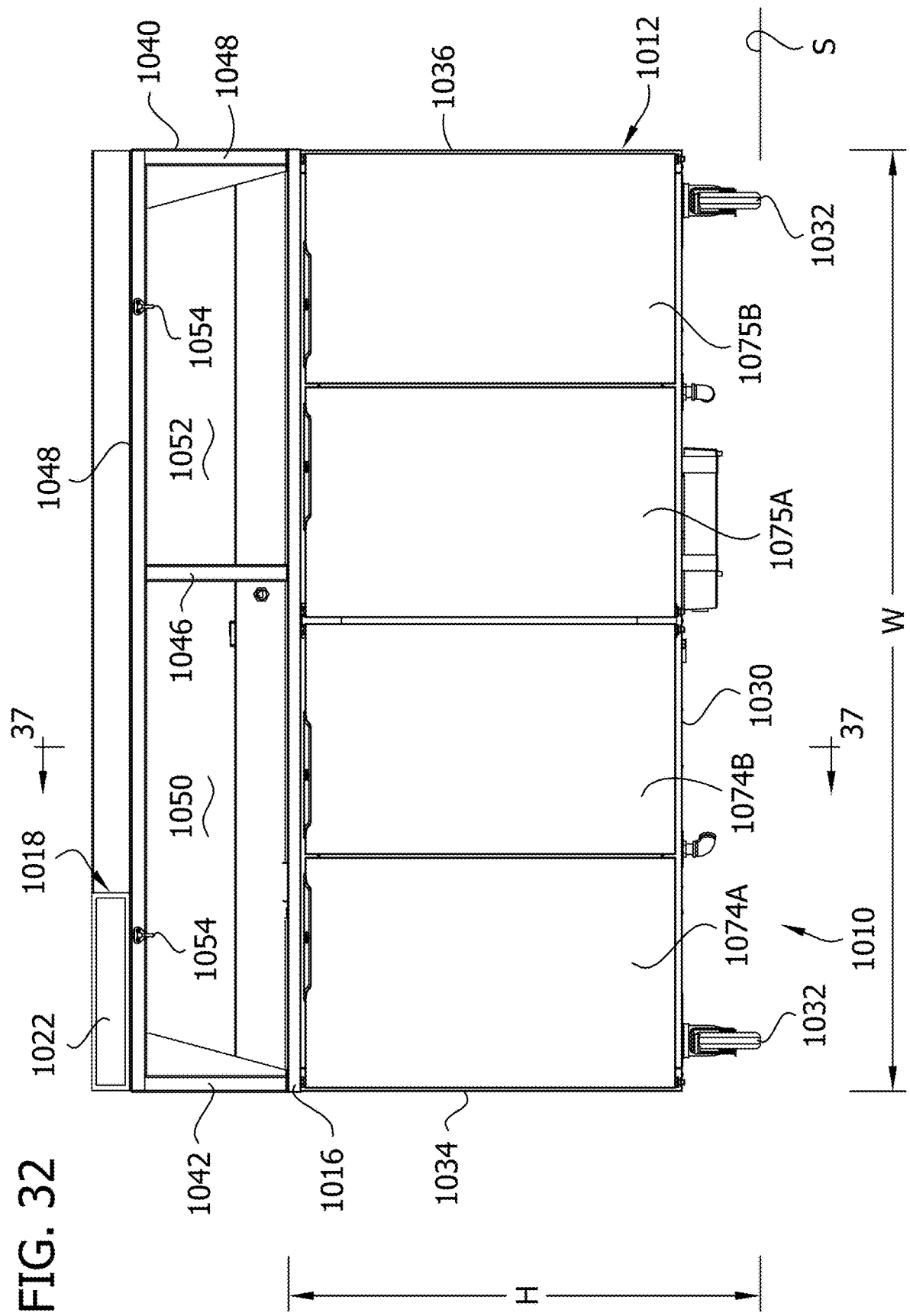
FIG. 32 is a front elevation of the dough preparation apparatus.

Referring to FIGS. 31-33 and 37, the cabinet 1012 includes a plurality of insulated walls, some of which define portions of the left and right dough preparation chambers 1014, 1015. A bottom wall 1030 extends along a width W (FIG. 32) of the cabinet 1012 from a left side margin to a right side margin. The bottom wall 1030 likewise extends along a depth D (FIG. 31) of the cabinet from a front edge margin to a rear edge margin. In the illustrated embodiment, the bottom wall 1030 is mounted on casters 1032 that allow the dough preparation apparatus 1010 to be rolled over a support surface S (FIG. 32). It will be understood that the cabinet may also be supported on the floor in other ways (e.g., by fixed feet, etc.).

Figure 37:
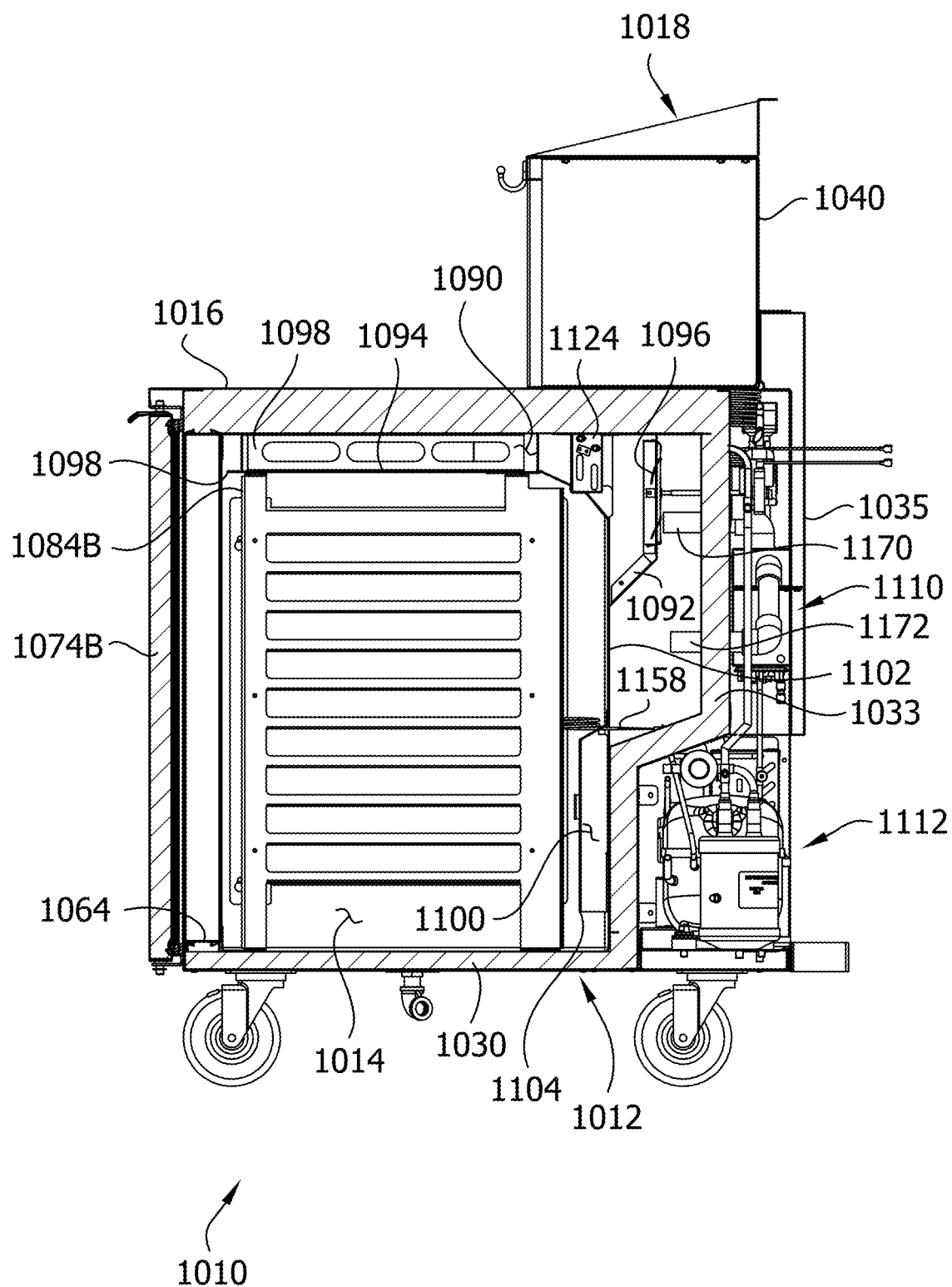
FIG. 37 is a cross section taken in the plane of line 37-37 of FIG. 32.
Figure 38:
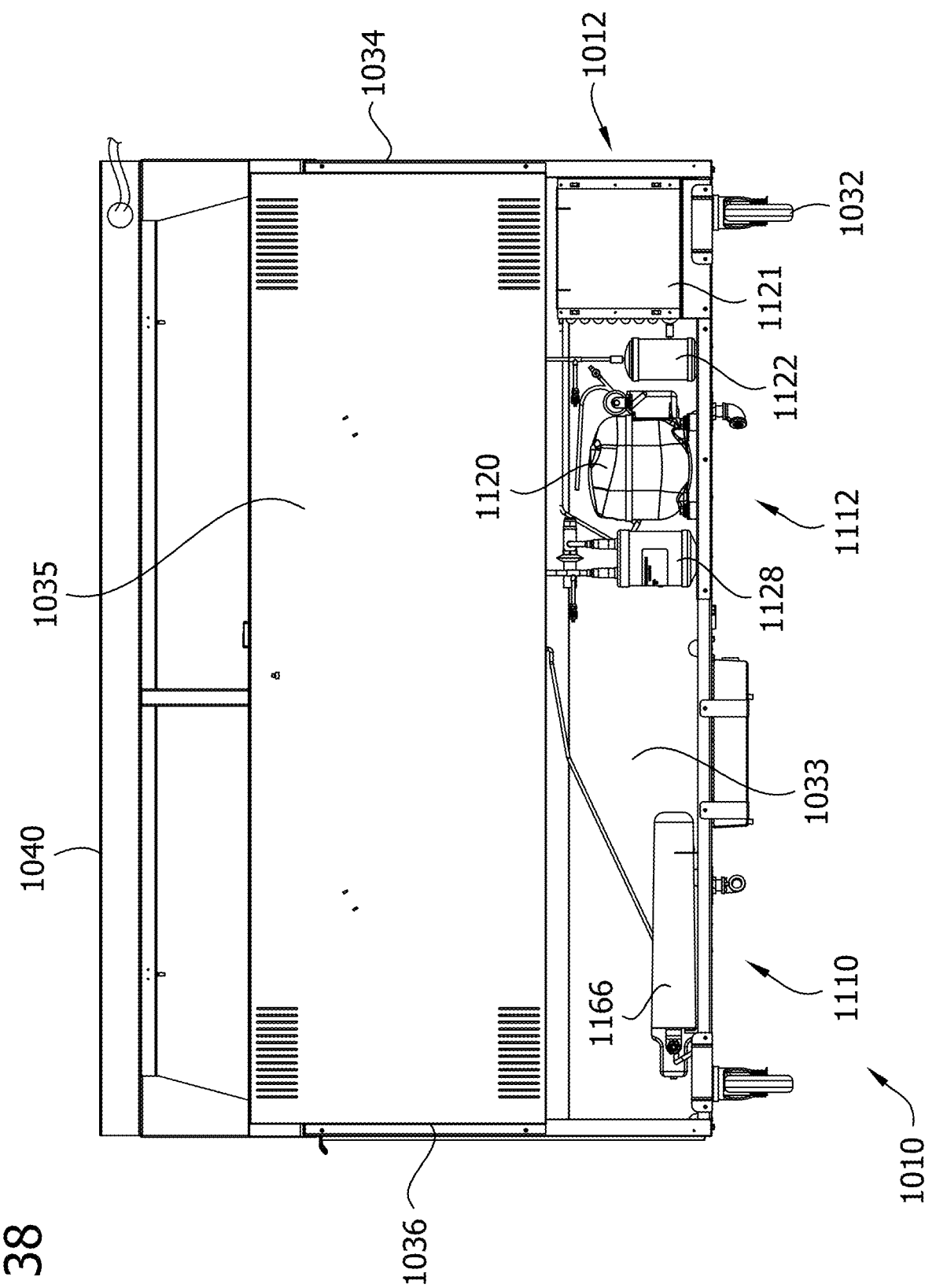
FIG. 38 is a rear elevation of the dough preparation apparatus.

A rear insulating wall 1033 (FIG. 37) extends up from adjacent a rear edge margin of the bottom wall 1030 and extends generally along the width W of the cabinet 1012. In certain embodiments, the rear wall 1033 is formed from separate left and right rear insulating panels. The rear wall may also be formed from a single panel or more than two panels in other embodiments. As will be explained in further detail below, various components of the chamber conditioning systems are mounted on the cabinet 1012 to the rear of the rear insulating wall 1033. In the illustrated embodiment, a lower portion of the rear wall 1033 is positioned forward of an upper portion of the rear wall to provide additional space behind the lower portion of the rear wall for receiving larger components of the chamber conditioning systems. The chamber conditioning systems include components that extend through the rear wall 1033 to communicate with the left and right dough preparation chambers 1014, 1015. As discussed in further detail below, the rear insulating wall 1033 partially defines air handling ducts (broadly, "ducting") used to control the environmental conditions of the left and right chambers 1014, 1015. As shown in FIGS. 37 and 38, a rear access panel 1035 covers some of the system components mounted on the rear insulating wall 1033.

A plurality of parallel, vertically oriented walls 1034, 1036, 1038 that extend up from the bottom wall and along the depth D of the cabinet 1012 define the sides of the left and right chambers 1014, 1015. A left side wall 1034 extends up from adjacent the left side edge margin of the bottom wall 1030 and a right side wall 1036 extends up from adjacent the right side edge margin. A partition wall 1038 (FIGS. 33 and 35) oriented generally parallel to the left and right side walls 1034, 1036 extends up from the bottom wall 1030 at a location spaced apart between the left and right side walls. In the illustrated embodiment, the partition wall 1038 is positioned at about a midpoint along the width W of the cabinet 1012, but it may also be located at other positions (e.g. at about a one-quarter point along the width of the cabinet or at about a one-third point along the width of the cabinet, etc.) without departing from the scope of the invention. The partition wall 1038 divides the interior of the cabinet between the left and right dough preparation chambers 1014, 1015, such that the left dough preparation chamber extends between the left side wall 1034 and the partition wall and the right dough preparation chamber extends between the partition wall and the right side wall 1036.

Desirably, each of the bottom wall 1030, the rear wall 1033, the left side wall 1034, the right side wall 1036, and the partition wall 1038 are formed from a thermally insulating material such as an encapsulated, rigid foam. Thus, the left and right dough preparation chambers 1014, 1015 may be thermally separated or isolated from one another and the ambient environment. As explained below, the thermal or environmental separation of the two chambers 1014, 1015 allows the chamber conditioning systems to control the environmental conditions of each chamber separately. If desired, the two chambers 1014, 1015 can be used at the same time to carry out different dough preparation recipes or the same recipe.

The counter 1016 is desirably positioned on the cabinet 1012 at an elevation at which a user may rest dough or containers (e.g., pans) of dough when handling the dough before, after, and/or during dough preparation recipes carried out by the apparatus 1010 or in conducting other dough preparation work. In the illustrated embodiment, the top surface of the counter 1016 is spaced apart from the support surface S by a height H (FIG. 32). The height H may, for example, be in an inclusive range of from about 30 inches to about 50 inches, and more desirably in an inclusive range from about 32 inches to about 40 inches. Part or all of the counter 1016 may also be used as a temporary or permanent storage shelf for supporting various items, such as countertop food preparation appliances, food storage containers, food processing implements, etc. In the illustrated embodiment, the counter 1016 forms the top wall of the cabinet 1012. The illustrated counter 1016 comprises an insulating material to environmentally isolate the dough preparation chambers 1014, 1015 from the ambient environment. In other embodiments, the counter may be positioned above an insulating top wall of the chambers 1014, 1015 such that the counter need not be insulated. Desirably, the exterior surfaces of the cabinet 1012 (and the other surfaces of the cabinet) are formed by a hard and durable material (e.g., sheet metal) to withstand the rigors of frequent use.

Referring to FIGS. 31-34, an over-shelf 1040 is mounted on the cabinet 1012. The over-shelf 1040 includes a left wall 1042, a right vertical wall 1044, and an intermediate vertical wall 1046 that are oriented parallel to each other and spaced apart from one another along the width W of the cabinet 1012. A horizontal shelf 1048 is supported on the top ends of the vertical walls 1042, 1044, 1046. The over-shelf 1040 extends forward from the rear of the cabinet 1012 and has a depth that is substantially less than the depth D of the cabinet. Thus the over-shelf 1040 does not obstruct access to the front end portion of the counter 1016. The over-shelf 1040 defines storage space below the over-shelf. In the illustrated embodiment, the over-shelf defines a left storage cavity or cubby 1050 that extends between the left vertical wall 1042 and the intermediate vertical wall 1046 and a right storage cavity or cubby 1052 that extends between the intermediate vertical wall and the right vertical wall 1044. The cubbies 1050, 1052 may include lower shelves (not shown) or may receive various items that are supported on the counter 1016. Electrical outlets (e.g., power connectors) for powering appliances and the like may be provided on or adjacent the over-shelf 1040. Hooks 1054 are mounted on the front surface of the horizontal shelf member 1048 to provide hanging storage. In the illustrated embodiment, the over-shelf 1040 supports the control system 1018, but the control system can be positioned in association with the cabinet 1012 in other ways (e.g., supported or mounted on the cabinet in other positions or orientations, or supported or mounted adjacent the cabinet) without departing from the scope of the present invention.

Referring to FIGS. 33-36, the cabinet 1012 includes a front frame 1060 at the front end portions of the counter 1016 and the bottom, left side, right side, and partition walls 1030, 1034, 1036, 1038 of the cabinet. The front frame 1016 defines a left opening 1064 and a right opening 1065. The left opening 1064 provides access to the left dough preparation chamber 1014, and the right opening 1065 provides access to the right dough preparation chamber 1015.

Figure 33:
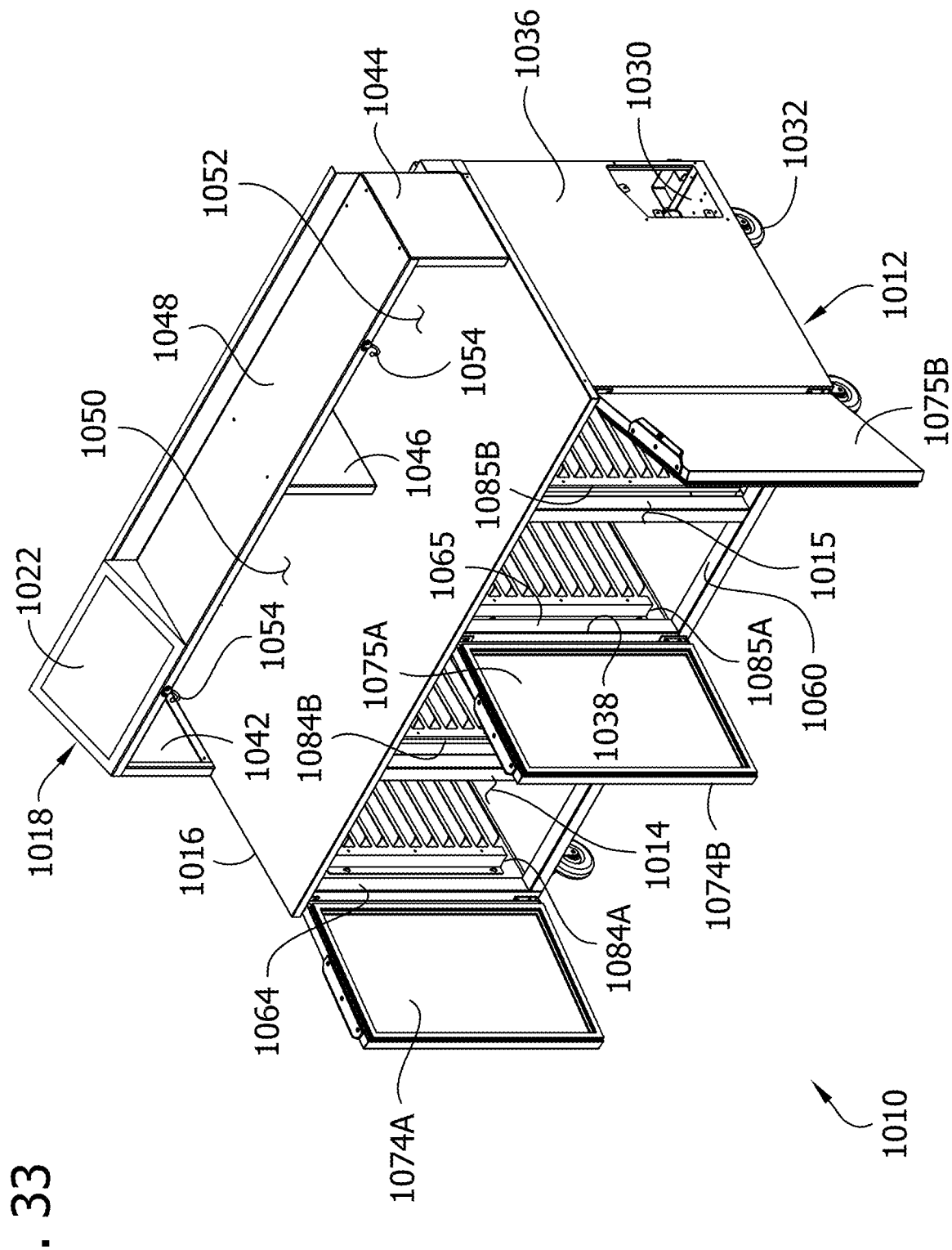
FIG. 33 is a perspective of the dough preparation apparatus with left and right chamber doors thereof shown in open positions.
Figure 34:
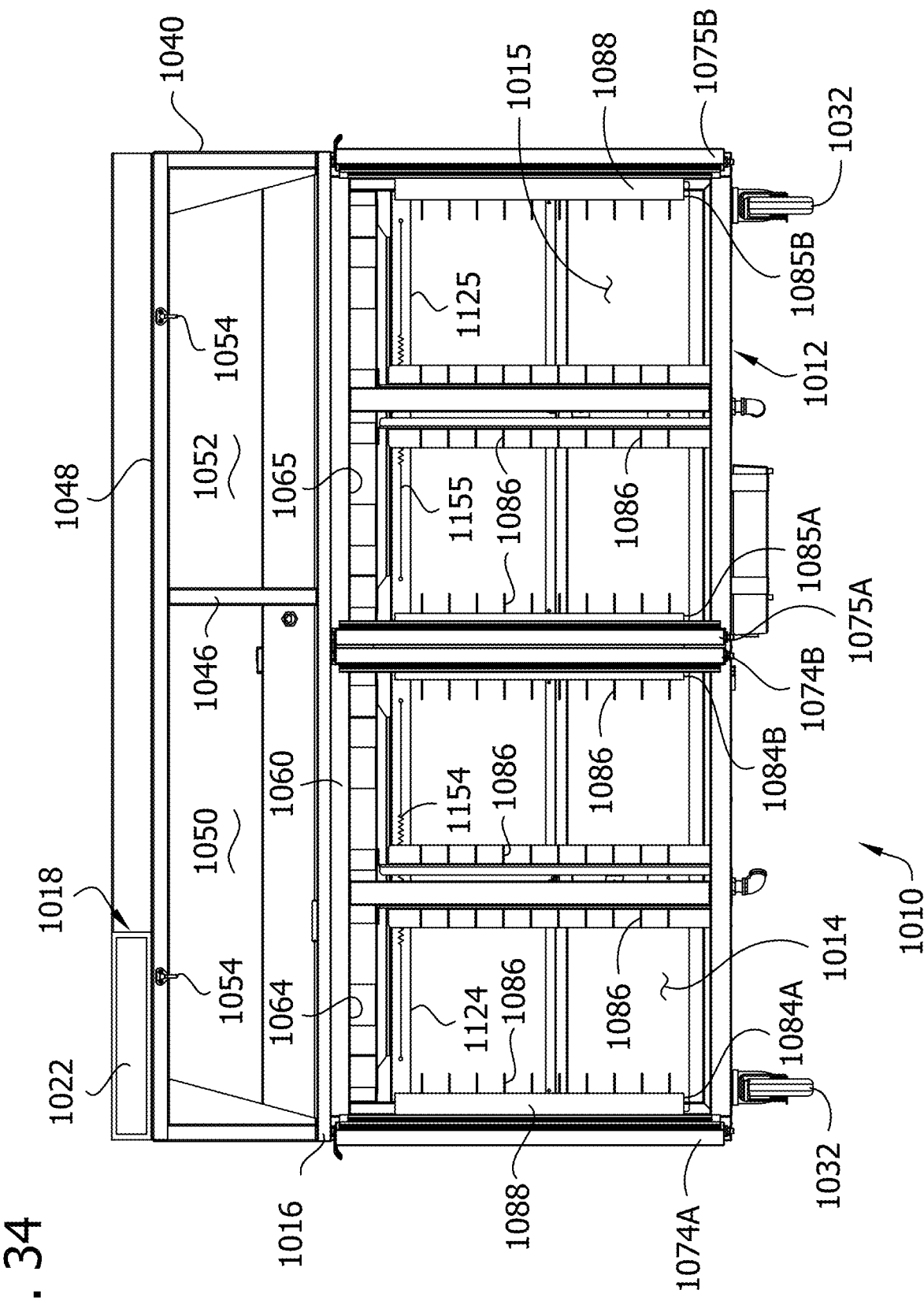
FIG. 34 is a front elevation of the dough preparation apparatus with the chamber doors shown in open positions.
Figure 35:
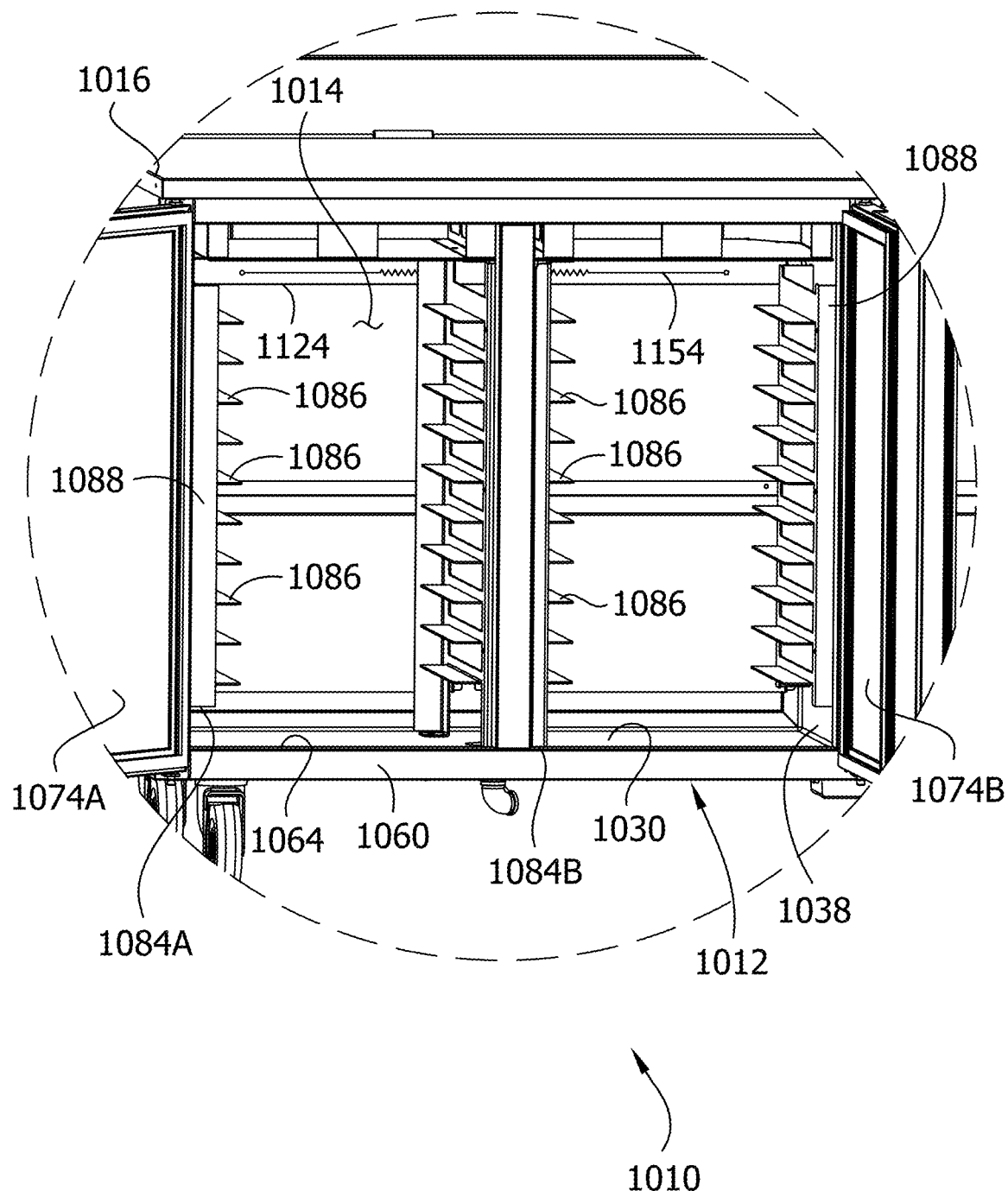
FIG. 35 is an enlarged perspective of a portion of the dough preparation apparatus with the left chamber doors shown in open positions to illustrate the inside of a left dough preparation chamber.

In the illustrated embodiment, first and second left chamber doors 1074A, 1074B are mounted on the cabinet to selectively cover the left opening 1064 and first and second right chamber doors 1075A, 1075B are mounted on the cabinet to selectively cover the right opening 1065. The first and second left chamber doors 1074A, 1074B are pivotably mounted on the front frame 1060 of the cabinet 1012 on opposite sides of the left chamber opening 1065 for pivoting between a closed position (FIGS. 31 and 32) and an open position (FIGS. 33 and 34). The first and second right chamber doors 1075A, 1075B are likewise pivotably mounted on the front frame 1060 on opposite sides of the right chamber opening 1065 for pivoting movement between a closed position and an open position. Each door 1074A, 1074B, 1075A, 1075B includes a gasket or other seal for sealingly engaging the front frame 1060 to environmentally seal the respective chamber opening 1064, 1065 from the ambient environment. The doors 1074A, 1074B, 1075A, 1075B may be constructed, for example, from a material that provides insulation between the left and right dough preparation chambers 1014, 1015 and the ambient environment (e.g., encapsulated foam, glass, etc.).

The dough preparation apparatus 1010 may be constructed so that containers (e.g., trays or forms, etc.) containing dough may be loaded or unloaded from either of the left and right dough preparation chambers 1014, 1015 when one of the respective doors 1074A, 1074B, 1075A, 1075B is open. In the illustrated embodiment, first and second pairs of chamber racks 1084A, 1084B 1085A, 1085B are positioned in each of the left and right dough preparation chambers 1014, 1015 in a side-by-side arrangement. In the illustrated embodiment, the first left chamber rack 1084A is positioned in the left side portion of the left dough preparation chamber 1014, in general alignment with the first left chamber door 1075A along the width W of the cabinet 1012; and the second left chamber rack 1084B is positioned in the right side portion of the left dough preparation chamber 1014, in general alignment with the second left chamber door 1075B along the width W of the cabinet 1012. Similarly, the first right chamber rack 1085A is positioned in the left side portion of the right dough preparation chamber 1015, in general alignment with the first left chamber door 1075A along the width W of the cabinet 1012; and the second right chamber rack 1085B is positioned in the right side portion of the right dough preparation chamber 1015, in general alignment with the second right chamber door 1075B along the width W of the cabinet 1012.

Each rack 1084A, 1084B 1085A, 1085B includes a plurality of guide rails 1086 extending laterally from rack support walls 1088. The guide rails 1086 of each rack 1084A, 1084B, 1085A, 1085B are vertically spaced apart from one another along the height of the respective chamber 1014, 1015. Each of the illustrated guide rails 1086 is formed by a cutout of the rack wall 1088 that is folded inward to a horizontal orientation. The guide rails 1086 are arranged vertically in operative pairs. Each operative pair forms a guide for slidably guiding suitably sized and shaped containers (e.g., trays, pans, and/or forms) onto the respective racks 1084A, 1084B 1085A, 1085B and into the respective dough preparation chambers 1014, 1015. Other rack configurations can be used without departing from the scope of the present invention.

Figure 36:
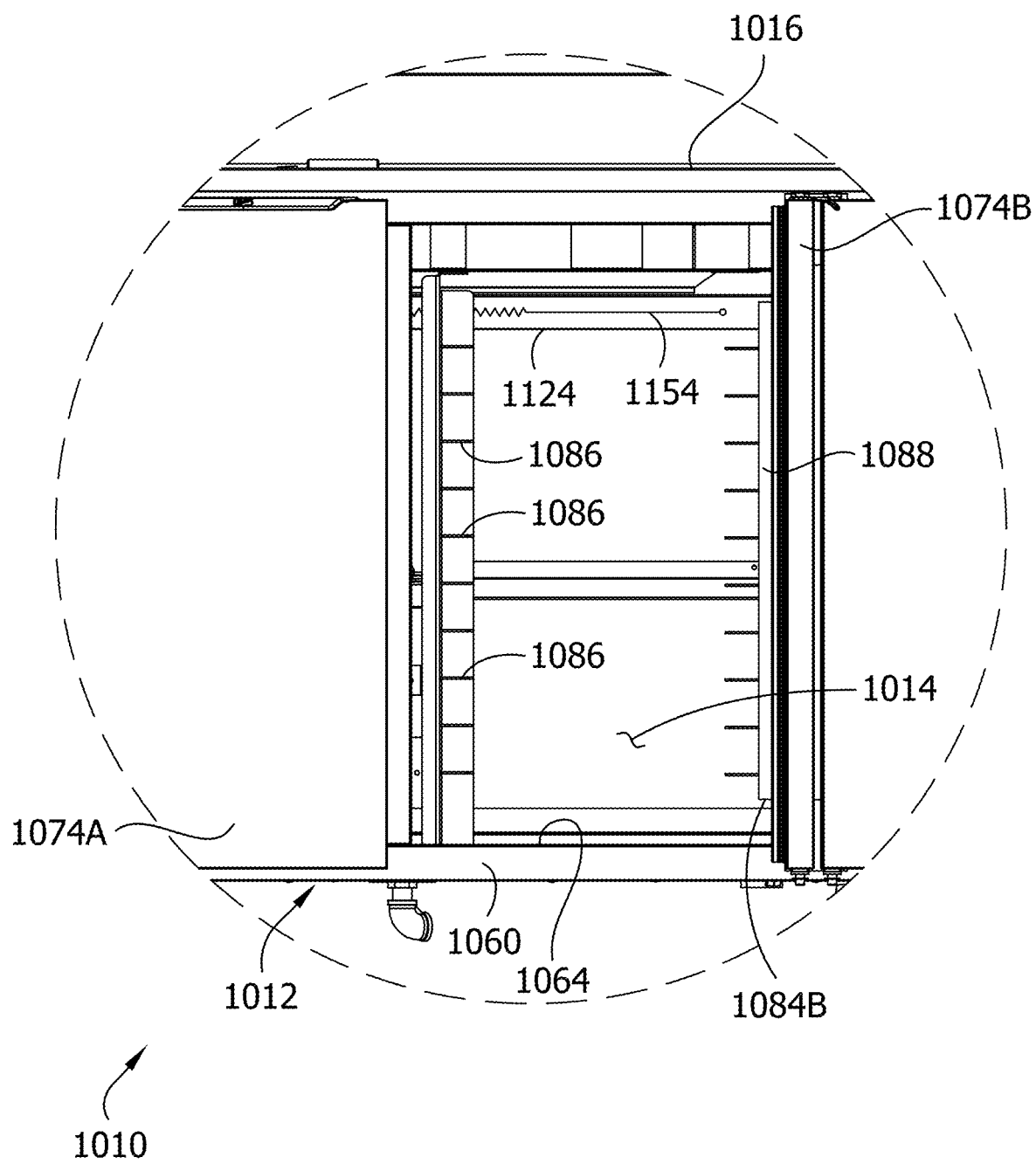
FIG. 36 is an enlarged front elevation of a portion of the dough preparation apparatus with one of the left chamber doors shown in an open position to illustrate a rack of the left dough preparation chamber.

As shown in FIG. 36, when the second left chamber door 1074B is open but the other chamber doors 1074A, 1075A, 1075B are closed, a container containing the dough may be slid into the chamber 1014 and onto the rack 1084B using the guide rails 1086. Similarly, when any one of the other chamber doors 1074A, 1075A, 1075B is open, a container containing the dough may slide into the respective chamber 1015 and onto the respective rack 1084A, 1085A, 1085B using the guide rails 1086. Accordingly, the arrangement of doors 1074A, 1074B, 1075A, 1075B and racks 1084A, 1084B, 1085A, 1085B in the illustrated embodiment allows a portion of the chamber opening 1064, 1065 corresponding generally to the width of the container or the width of the rack 1084A, 1084B (in this case, about one-half of the respective chamber opening 1064, 1065) to be uncovered during loading and unloading of dough from the chamber 1014, 1015. This helps minimize exposure of the environmentally controlled chambers 1014, 1015 to the ambient environment during loading and unloading.

Referring to FIG. 37, the dough preparation apparatus 1010 includes walls arranged in the interior of the cabinet 1012 for providing recirculation ducting for delivering supply air to each of the dough preparation cavities 1014, 1015 and exhausting return air from each of the dough preparation cavities. FIG. 37 depicts the left dough preparation cavity 1014, and it will be understood that the ducting arrangement in the right cavity 1015 is generally the same.

As shown in FIG. 37, the recirculation ducting includes a supply duct 1090 defined by the bottom surface of the counter 1016, an internal divider wall 1092, and an internal supply wall 1094. An upper segment of the internal divider wall 1092 extends downward from the counter 1016 in parallel, spaced apart relationship with the upper portion of the rear cabinet wall 1033. As discussed in further detail below, a fan 1096 is mounted on the internal divider wall for moving air through the recirculation ducting. A lower portion of the internal divider wall 1092 slopes forward to a bottom end that is joined to the bottom end of the internal supply wall 1094. The internal supply wall 1094 includes an upstream segment that extends upward from the bottom end, an intermediate segment that angles upward and forward from the upstream segment, and a downstream segment that extends forward from the upper end of the intermediate segment, generally in parallel spaced apart relationship with the bottom surface of the counter 1016. The supply duct 1090 has a supply outlet 1098 (e.g., one or more openings provided in a forward end of the supply duct) adjacent the top front corner of the left dough preparation chamber 1014. Air passes from the supply duct 1090 to the chamber 1014 through the outlet 1098.

The return duct 1100 is defined by the front surface of the rear wall 1033, the internal divider wall 1092, and an internal return wall 1102. The internal return wall 1102 has a lower upstream segment that extends upward from a lower end at an inlet 1104 of the return duct 110. An intermediate segment of the return wall 1102 angles upward and rearward from the top end of the upstream segment to a lower end of a downstream segment. The downstream segment extends upward from the lower end, generally in parallel spaced apart relationship with the upper segment of the rear wall 1033, to the location where the lower end of the diver wall 1092 is joined to the lower end of the internal supply wall 1094. The internal divider wall 1092 separates the downstream end portion of the return duct 1100 from the upstream end portion of the supply duct 1090. As explained below, the fan 1096 is configured to recirculate air from the chamber 1014 back to the chamber via the return duct 1100 and the supply duct 1090. As explained in further detail below, the air is conditioned in the recirculation ducting for controlling one or more environmental conditions within the respective dough preparation chamber 1014, 1015. It will be appreciated that recirculation ducting having configurations other than described and illustrated herein can be used without departing from the scope of the present invention.

Figure 39:
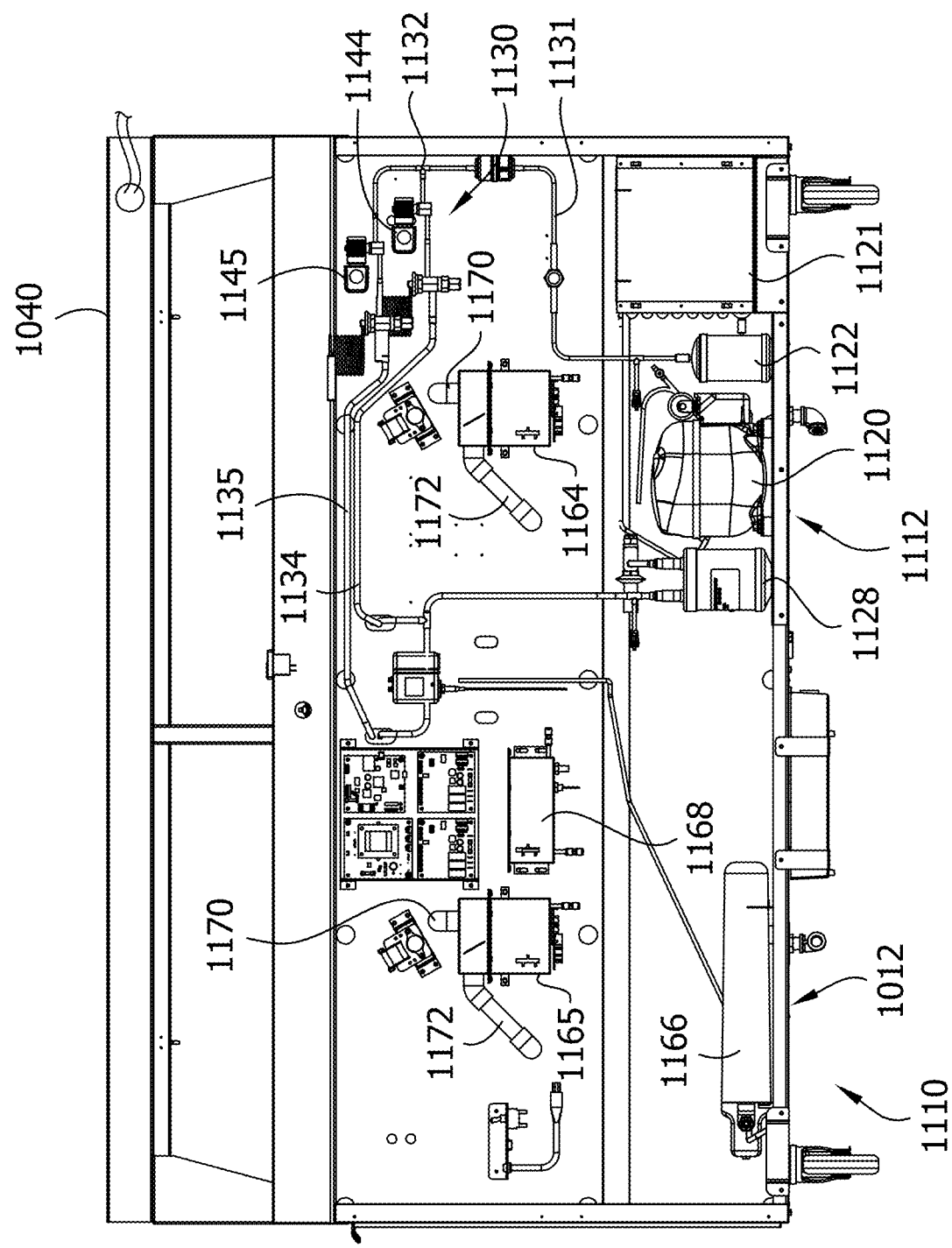
FIG. 39 is a rear elevation of the dough preparation apparatus with an access panel removed to illustrate multiple chamber conditioning devices.

As mentioned above, the dough preparation apparatus 1010 includes multiple chamber conditioning systems that are configured to control the environmental conditions of the left and right dough preparation chambers 1014, 1015 independently. Referring to FIG. 39, the illustrated dough preparation apparatus 1010 includes a humidity control system, generally indicated at 1110, configured to independently control the humidity of each of the dough preparation chambers 1014, 1015, and a temperature control system, generally indicated at 1112, configured to independently control the temperature in each of the first and second dough preparation chambers. Other numbers and types of chamber conditioning systems can be used without departing from the scope of the present invention.

The temperature control system 1112 comprises a multiplexed refrigeration system including a common compressor 1120, condenser 1121, and receiver 1122 and including separate evaporator coils 1124, 1125 (FIG. 34) for the left and right dough preparation chambers 1014, 1015. In the illustrated embodiment, the refrigeration system further includes a common accumulator 1128 upstream of the compressor 1120, but the refrigeration system may lack an accumulator or use chamber-specific accumulators without departing from the scope of the present invention. Moreover, other types of refrigeration systems can be used without departing from the scope of the present invention.

Figure 40:
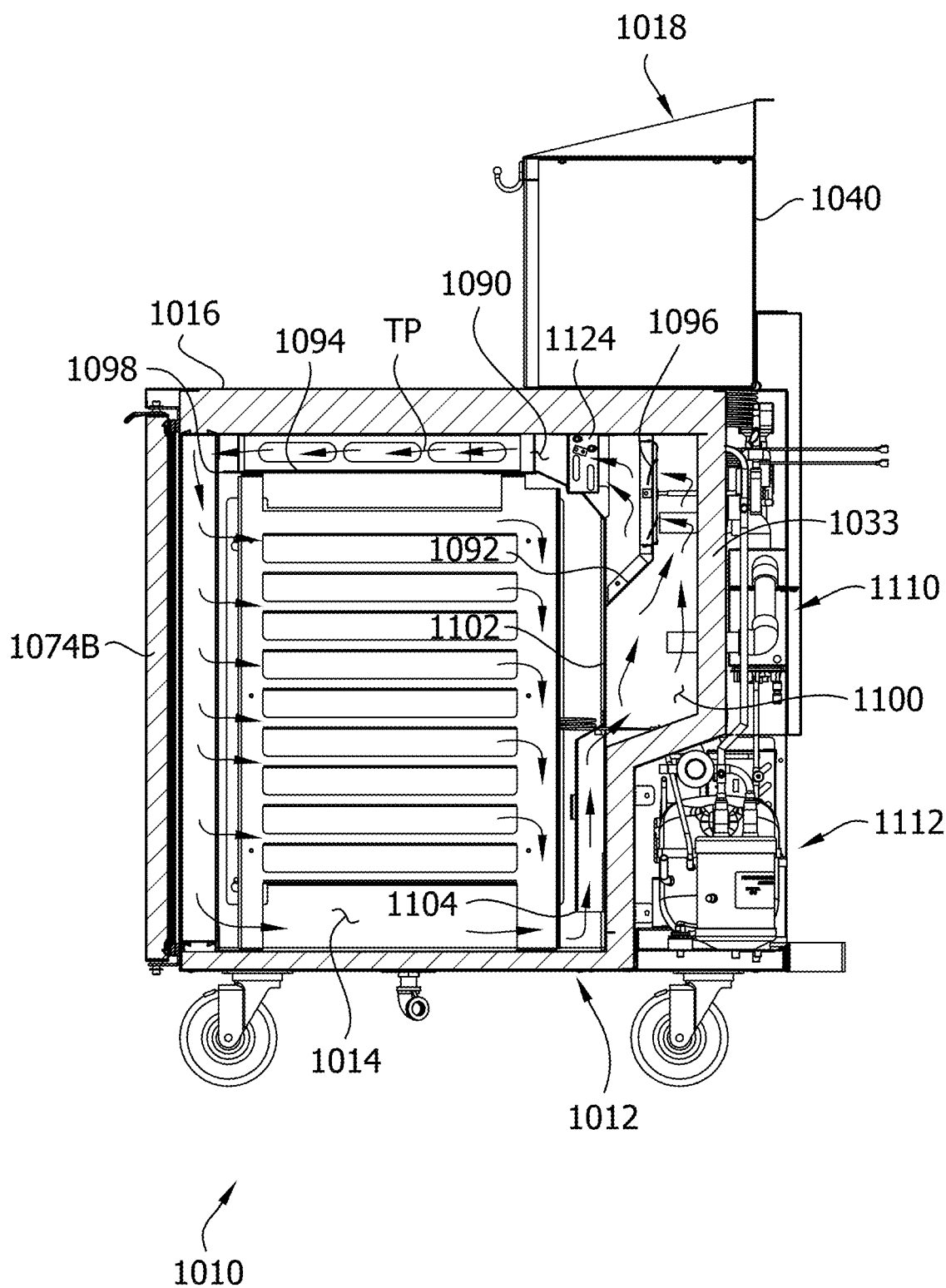
FIG. 40 is a cross section similar to FIG. 37 schematically illustrating a temperature control flow path through the left dough preparation chamber.

Each evaporator coil 1124, 1125 is operatively connected to the respective dough preparation chamber to provide cooling. In the illustrated embodiment, each evaporator coil 1124, 1125 is positioned in the respective supply duct 1090, adjacent and downstream from the fan 1096. As shown in FIG. 40, the fan 1096 in each chamber 1014, 1015 is configured to blow recirculated air from the return air duct 1100 along a temperature control flow path TP that passes through the respective evaporator coil 1124, 1125 and the respective supply duct 1090, out the outlet 1098 of the supply duct, and into the respective dough preparation chamber 1014, 1015. The evaporator coil 1124, 1125 removes heat from the recirculated air as the air passes over the coil. After passing through the dough preparation chamber 1014, 1015, the temperature control flow path enters the return duct 1100 at the return inlet 1104. The air flows through the return duct 1100 and is recirculated by the fan 1096.

To provide independent control of the refrigeration of each of the left and right dough preparation chambers 1014, 1015, the flow of refrigerant from the common receiver 1122 to each evaporator coil 1124, 1125 is independently controlled by a multiplexer, generally indicated at 1130, as shown in FIG. 39. The refrigerant from the receiver 1122 travels along a single liquid line 1131 until it reaches a flow divider 1132 of the multiplexer 1130. Subsequently, a portion of the refrigerant flows through a left chamber liquid line 1134 to the left evaporator coil 1124 and the remainder of the refrigerant flows through a right liquid line 1135 to the right evaporator coil 1125. A first solenoid valve 1144 operatively coupled to the left liquid line 1134 controls the flow of liquid refrigerant to the left evaporator coil 1124, and a second solenoid valve 1145 operatively coupled to the right liquid line 1135 controls the flow of liquid refrigerant to the right evaporator coil 1125.

As shown schematically in FIG. 34, each illustrated evaporator coil 1124, 1125 is fitted with a heating element 1154, 1155 (e.g., on or in the evaporator coils 1124, 1125). Each heating element 1154, 1155 serves two functions in the dough preparation apparatus 1010. First, the heating element 1154, 1155 functions as a defrosting device for defrosting the respective evaporator coil 1124, 1125. Second, the heating element 1154, 1155 functions as a heating element in a heating system for heating the respective one of the dough preparation chambers 1014, 1015. Thus, in the illustrated embodiment, each heating element 1154, 1155 is operatively connected to the respective dough preparation chamber 1014, 1015 to heat the dough preparation chamber and thereby warm dough positioned therein. More specifically, each heating element 1154, 1155 is positioned in the respective supply duct 1090 adjacent the fan 1096 (at about the same location as the respective evaporator coil 1124, 1125). As shown in FIG. 40, each fan 1096 is configured to blow recirculated air from the return air duct 1100 along a temperature control flow path TP that passes through the respective evaporator coil 1124, 1125, through the downstream end of the respective supply duct 1090, out the outlet 1099 of the supply duct, and into the respective dough preparation chamber 1014, 1015. The heating element 1154, 1155 heats the recirculated air as it passes over the heating element to heat the respective chamber 1014, 1015.

To provide closed loop temperature control, the dough preparation apparatus includes at least one temperature sensor 1158 for sensing a temperature of the dough preparation chambers 1014, 1015. Each temperature sensor 1158 is operatively coupled to the respective dough preparation chamber 1014, 1015 to provide an output signal representative of a temperature of the respective dough preparation chamber. In the illustrated embodiment, one temperature sensor 1158 is positioned in the return air duct 1100 of each of the dough preparation chambers 1014, 1015. Temperature sensors can be provided in other locations or omitted without departing from the scope of the present invention. As explained below, the controller 1024 receives and uses the output signals from the temperature sensors 1158 when carrying out dough preparation recipes.

It will be understood that other kinds of temperature control systems for controlling the temperatures of first and second dough preparation chambers independently can be used without departing from the scope of the present invention. For example, instead of using a multiplexed refrigeration system to cool the chambers, other separate refrigeration systems can be provided for each chamber. Likewise, instead of using a heating system comprising separate heating elements located at the evaporator coils of the refrigeration system, a temperature control system could include a multiplexed heating system or a heating system with separate heating elements in other locations. Other variations are also possible. Moreover, it will be appreciated that the illustrated temperature control system 1112 operates as a closed-loop system, but open-loop or time-based systems (e.g., without sensors) can be used without departing from the scope of the present invention.

Referring to FIG. 39, the humidity control system 1110 includes left and right humidifiers 1164, 1165 that are mounted on the rear wall 1033 of the cabinet 1012. The left humidifier 1164 is configured to supply humidity to the left dough preparation chamber 1014 and the right humidifier 1165 is configured to supply humidity to the right dough preparation chamber 1015. In the illustrated embodiment, each humidifier 1164, 1165 is a cool air ultrasonic humidifier (e.g., ultrasonic mister), but other types of humidifiers can be used without departing from the scope of the present invention. It will be understood that the humidity control system could be a multiplexed system, instead of comprising separate humidifiers.

In addition to the humidifiers 1164, 1165, the humidity control system 1110 includes other components. For example, the humidity control system 1110 includes a filter 1166 that is fluidly connected to a water supply. The filter 1166 is located upstream of the humidifiers 1164, 1165 within the humidity control system 1110. The filter 1166 is configured to filter supply water before it is received by the humidifiers. The humidity control system 110 also includes a buffer tank 1168 upstream of the humidifiers 1164, 1165 for storing and pretreating a volume of filtered water before supplying it to the humidifiers. Conduits (not shown) extend from the buffer tank 1168 to the humidifiers 1164, 1165 to carry the filtered and treated water from the buffer tank to the humidifier.

Figure 41:
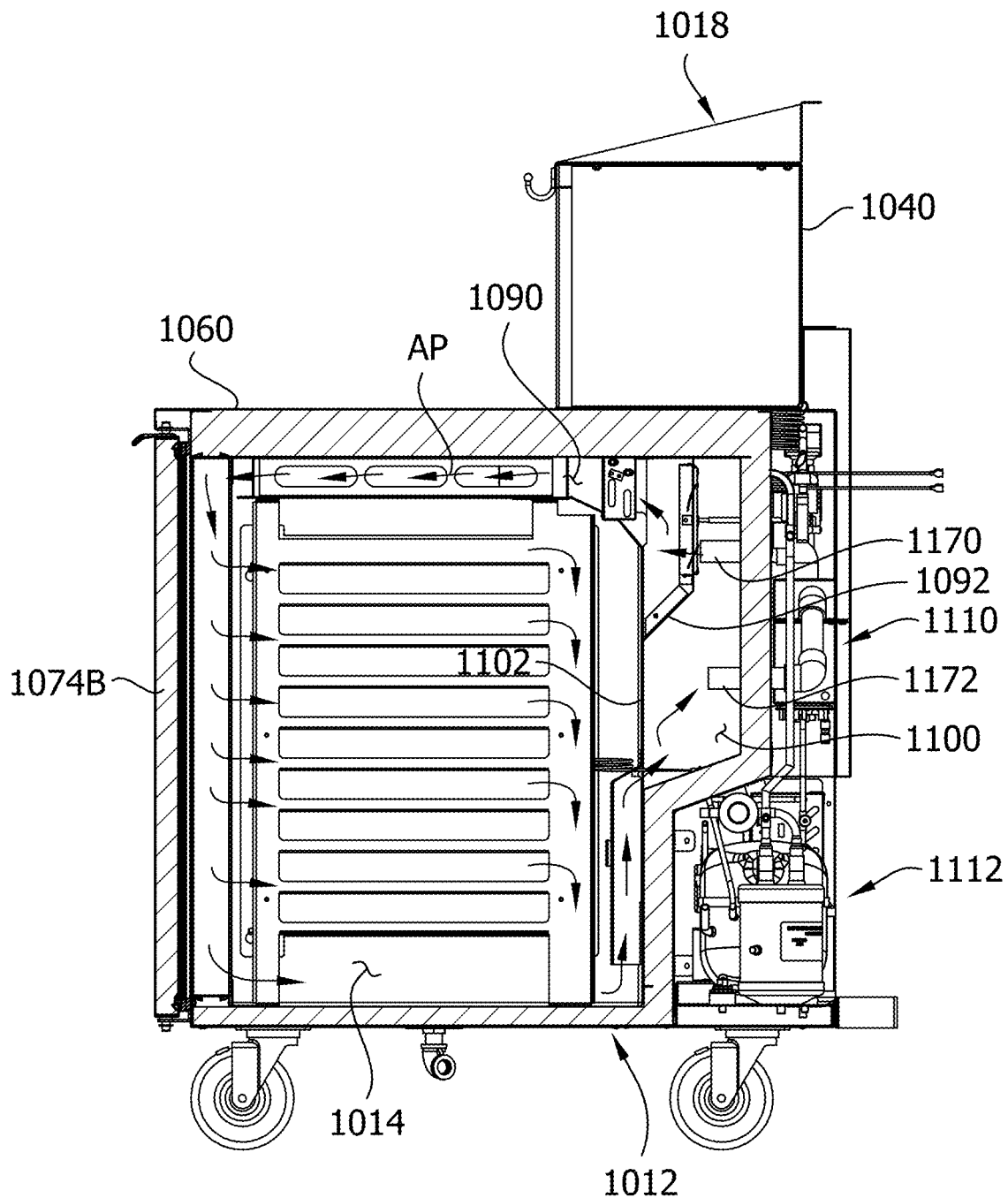
FIG. 41 is a cross section similar to FIG. 37 schematically illustrating a humidity control flow path through the dough preparation chamber.

Referring to FIGS. 39 and 41 each humidifier 1164, 1165 is configured to generate moisture-entrained air. A supply conduit 1170 extends from each humidifier 1164, 1165 to supply the moisture-entrained air to the respective dough preparation chamber 1014, 1015. In the illustrated embodiment each supply conduit 1170 extends from the top end of the respective humidifier 1164, 1165 and has an outlet end positioned immediately upstream of the fan 1096. Each humidifier 1164 also has a return conduit 1172 that has an inlet end located within the return air duct 1100 of the respective chamber 1014, 1015. As explained below, each humidifier 1164, 1165 receives air from the return air duct 1100 through the return conduit 1172 and uses the return air to humidify the respective chamber 1014, 1015.

Referring to FIG. 41, the humidity control system 1110 is configured to direct moisture-entrained air through each of the dough preparation chambers 1014, 1015 along a humidity control flow path HP to increase the humidity within the respective chamber. More specifically, the fan 1096 (and, in some embodiments, an internal humidifier fan, not shown) draws moisture-entrained air out of the outlet of the respective supply conduit 1170 and drives the moisture-entrained air through the respective supply duct 1090. The moisture-entrained air flows out of the outlet 1098 of the supply duct 1090 into the respective chamber 1014, 1015. Recirculated air is drawn from the return inlet 1104 through the return duct 1100 and into the return conduit 1172 of the respective humidifier 1164, 1165. The humidifier 1164, 1165 entrains moisture in the recirculated air and the flow cycle repeats.

To control the amount of humidity that the humidity control system 1110 provides to each chamber 1014, 1015, the humidity control system is configured to provide moisture-entrained air to each of the chambers at an independently controllable duty cycle. For example, over a predetermined period of time (i.e., a humidity cycle period), each humidifier 1164, 1165 may be "on" or "active," delivering moisture-entrained air to the respective chamber 1014, 1015, for a certain percentage of the time period, and "off" or "inactive," not delivering any moisture to the respective chamber, for the remainder of the time period. The duty cycle for each humidifier 1064, 1065, which may be set by the controller 1024 as explained below, is the percentage of each predetermined time period during which the humidifier 1164, 1165 is "on" or "active" and delivering moisture to the respective chamber 1014, 1015. Accordingly, it will be appreciated that the illustrated humidity control system 1110 operates as an open-loop or time-based system, but a closed-loop (e.g., including a humidity sensor 1182 (FIG. 42)) can be used without departing from the scope of the present invention.

Although the illustrated embodiment includes multiple chamber conditioning systems including a humidity control system 1110 and a temperature control system 1112, it will be understood that other numbers and/or other types of chamber conditioning systems can be provided without departing from the scope of the present invention.

As shown schematically in FIG. 42, the control system 1018 of the dough preparation apparatus includes the controller 1024 (e.g., dough preparation controller), which may be a microprocessor, programmable logic controller, or the like. The memory 1020, which is operatively connected to the controller, is a tangible storage medium (e.g., including forms of storage such as software 1020A and firmware 1020B). The control system 1018 includes interconnection electronics 1180 that operatively connect the various components of the control system 1018 with other components of the dough preparation apparatus, such as the user interface 1022, the temperature control system 1112, the humidity control system 1110, the temperature sensors 1158, and optional humidity sensors 1182 that are operatively connected to the dough preparation chambers 1014, 1015 for sensing humidity therein. For example, the interconnection electronics 1180 may include electrical or fiber optic lines or wireless communication devices. The controller 1024 is adapted for reading and executing instructions stored in the memory 1020, and is responsive to the user interface 1022, for controlling the various components and systems of the dough preparation apparatus 1010. A user can enter or modify instructions stored in the memory 1020 via the user interface 1022. In the illustrated embodiment, the user interface 1022 is a touch screen, as explained in further detail below. Other types of user interfaces can be used without departing from the scope of the present invention. The user interface 1022 provides command signals via the interconnection electronics 1180 to the controller 1024. The command signals can include execution instructions that direct the controller 1024 to execute one or more of the recipes stored on the memory 1020 in one of the dough preparation chambers 1014, 1015 using the components of the dough preparation apparatus 1010. The controller 1024 responds to the command signals and provides control signals corresponding thereto via the interconnection electronics 1180 to the various components and systems of the apparatus 1010.

Referring again to FIG. 31, in the illustrated embodiment, the control system 1018 includes a touchscreen user interface 1022 that is mounted on the over-shelf 1040 in a housing 1184. The control system 1018 may be an all-in-one device in the sense that the housing 1184 for the user interface 1022 may also contain the memory 1020 and the controller 1024 of the control system 1018. It will be understood that, in other embodiments, the resources of the control system 1018 may be distributed across multiple devices and/or locations. By supporting or mounting the user interface on the over-shelf 1040 (or other suitable location adjacent the upper end of the cabinet 1012), the user interface 1022 is readily associated with the dough preparation apparatus and positioned for easy user access during dough preparation. It will be understood that a user interface can be associated with the cabinet 1012 in other ways without departing from the scope of the present invention. For example, instead of being supported on the over-shelf 1040, the user interface could be supported on the work top 1016 or elsewhere on the apparatus 1010 (e.g., one or more of the doors 1074A, 1074B, 1075A, 1075B). In still other embodiments, the user interface could be mounted or supported independent from the apparatus 1010 (e.g., but adjacent to the apparatus).

As will be described in further detail below, the control system 1018 permits the user to initiate various "dough preparation recipes" using the dough preparation apparatus. The recipes may be stored on the memory 1020 and include control instructions that define various parameters of the apparatus 1010 during execution of the respective recipe. The parameters can define operational states (e.g., active or inactive) of the chamber conditioning systems, such as the humidity control system 1110 and the temperature control system 1112, etc. For example, start times and durations of various stages of a recipe can be defined with respect to a recipe time (e.g., countdown time). As explained below, the user interface 1022 may display to the user in graphical format operational states of the chamber conditioning systems and recipes for enhanced user understanding of the recipe. This may be particularly useful when a recipe includes combined functions such as humidification and temperature control, which may include stages and/or operational states having overlapping or sequential durations. For example, operational states for the food preparation environment control devices may include the state of being "active" (e.g., "on") or "inactive" (e.g., "off").

Figure 43:
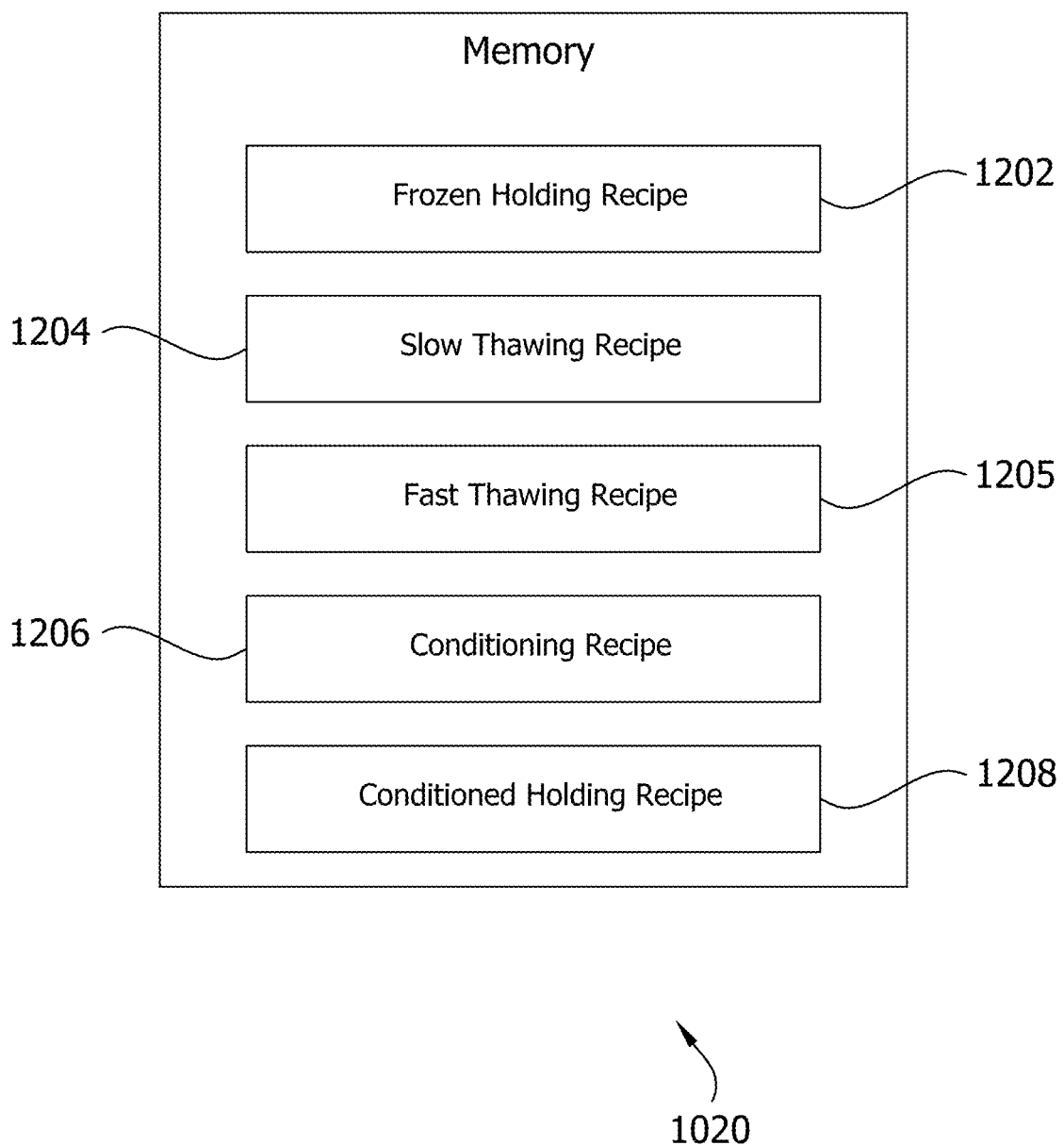
FIG. 43 is a schematic block diagram of a memory of the control system, schematically illustrating recipes that are stored on the memory.

Referring to FIG. 43, the illustrated memory 1020 stores five recipes 1202, 1204, 1205, 1206, 1208 that can be used in various ways to prepare dough for proofing and baking. Each of the recipes 1202, 1204, 1205, 1206, 1208 defines control instructions for controlling one or more environmental conditions of a dough preparation chamber 1014, 1015 using one or more of the chamber conditioning systems 1110, 1112. As explained below, any of the recipes 1202, 1204, 1205, 1206, 1208 may be selectively executed in either of the dough preparation chambers 1014, 1015 based on inputs the user provides to the user interface 1022. The illustrated memory 1020 stores a frozen holding recipe 1202, a slow thawing or slacking recipe 1204, a fast thawing or slacking recipe 1205, a dough conditioning recipe 1206, and a conditioned holding (e.g., retarding) recipe 1208, which are configured for preparing dough prior to proofing. It will be understood that the memory may store other recipes, such as other thawing recipes, conditioning recipes, holding recipes, proofing recipes, and/or baking recipes, retarding recipes, etc., without departing from the scope of the present invention.

Figure 44:
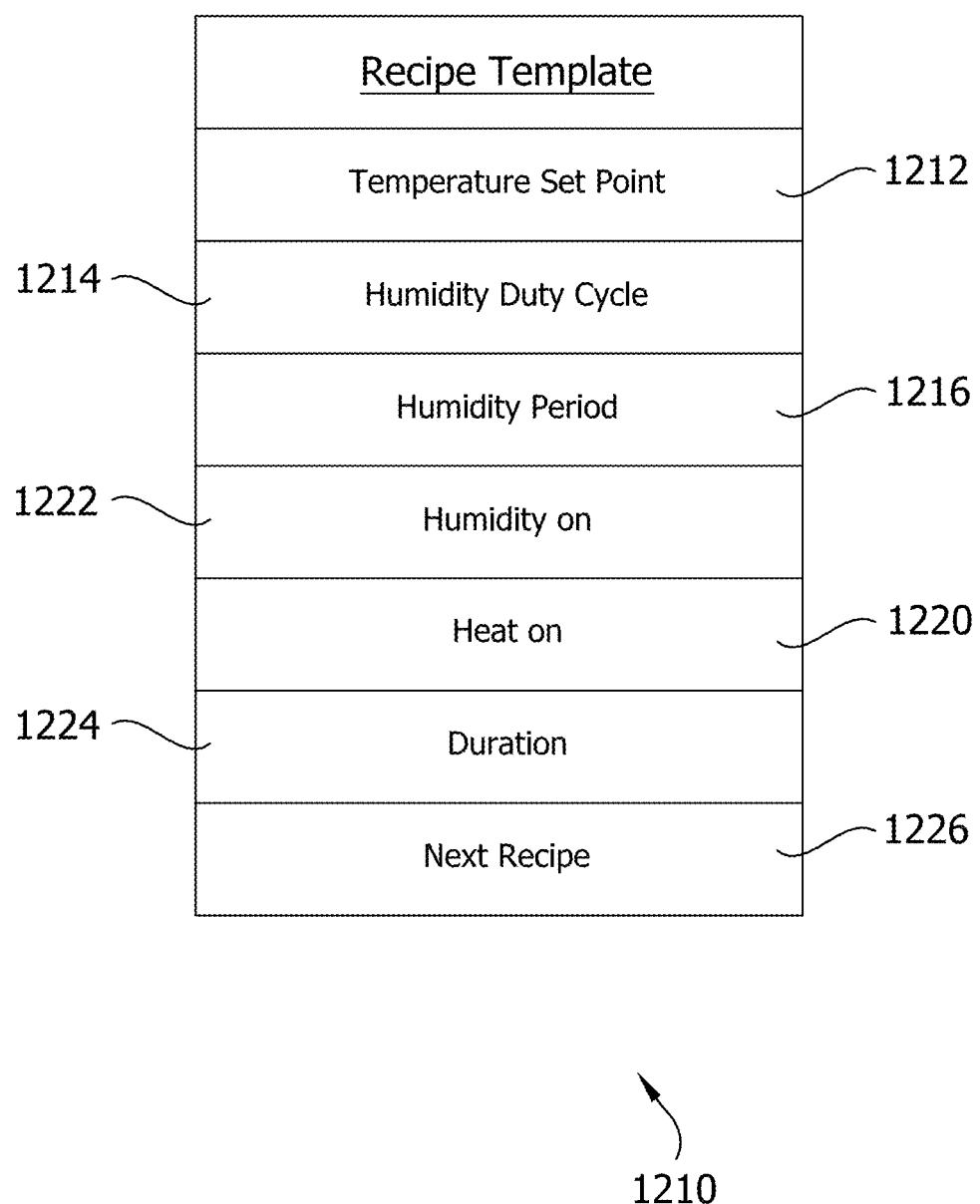
FIG. 44 is a schematic block diagram illustrating a recipe template for the recipes stored on the memory.

Referring to FIG. 44, each of the illustrated recipes 1202, 1204, 1206, 1208 includes a plurality of parameters defined by a recipe template 1210. In general, the recipe template 1210 provides a uniform list of parameters that define the recipes and are used to provide control instructions for controlling one or more environmental conditions of a dough preparation chamber 1014, 1015 using one or more of the chamber conditioning systems 1110, 1112. It will be understood that recipes may have other templates or be formatted independently of one another without departing from the scope of the present invention. As explained below, the controller 1224 is configured to read recipes formatted according to the template 1210 and execute the control instructions of the recipe using the temperature control system 1112 and the humidity control system 1110.

In the illustrated embodiment, the recipe template 1210 includes a temperature set point parameter 1212 for controlling the temperature control system 1112 using closed loop control. The recipe template 1210 also includes humidity control parameters 1214, 1216, including a humidity duty cycle and a humidity period, for controlling the humidity control system 1110 using duty cycle control (i.e., alternating timed periods of activity and inactivity). Parameters suitable for other control schemes may also be used to control the temperature control system and/or the humidity control system. The recipe template 1210 defines Boolean logic parameters 1220, 1222 that determine whether the heating system of the temperature control system 1112 and the humidity system 1110, respectively, are active (parameter set to True) or inactive (parameter set to False) during execution of the recipe. The refrigeration system of the temperature control system 1112 is always active based on the illustrated recipe template 1210. However, other recipe templates could include a parameter for selectively activating the refrigeration system in different recipes. Finally, the recipe template 1210 includes a duration parameter 1224 that determines a recipe duration and a next recipe parameter 1226 that provides a pointer to another recipe for automatically switching from one recipe to the next after a recipe duration has elapsed. For recipes having indefinite runtimes, each of the parameters 1224 and 1226 are set to NA. Other recipe templates can include additional and/or different parameters, and other recipe conventions can be used, without departing from the scope of the invention. As used herein, the term "recipe" can refer to a single recipe, or multiple (e.g., sequential) recipes or recipe stages making up a combined recipe.

As shown in Table 1 below, in one embodiment, the frozen holding recipe 1202 sets the Boolean logic parameters 1220, 1222 to False to provide an indication that neither the heating system of the temperature control system 1112 nor the humidity system 1110 is to be used during execution of the frozen holding recipe. It will be understood, however, that the heating elements 1154, 1155 may nonetheless be used in their capacity of evaporator coil defrosting elements (independent from a dough preparation recipe) during the frozen holding recipe to defrost the evaporator coils 1124, 1125. Because the humidity on parameter 1222 is set to false, the humidity control parameters 1214, 1216 are set to NA. The recipe shown in Table 1 defines a frozen holding recipe that has an unlimited duration, as indicated by the duration and next recipe parameters 1224, 1226 being set to NA. After initiation of the frozen holding recipe 1202 in one of the chambers 1014, 1015, the controller will not initiate another recipe in the chamber until the user interface 1022 receives a user input initiating another recipe. In the illustrated embodiment, the frozen holding temperature set point parameter 1212 is set to 27° F. Thus, when the illustrated frozen holding recipe 1202 is executed, the controller operates the refrigeration system of the temperature control system 1112 in a closed loop manner to maintain the refrigeration system at about 27° F. The frozen holding recipe 1202 is therefore configured to freeze dough and/or maintain dough in a frozen state for an extended duration. It will be understood that the frozen holding recipe 1202 may define other frozen holding temperature set points, such as a frozen holding temperature set point in an inclusive range of from about 0° F. to about 32° F., and more desirably in an inclusive range from about 0° F. to about 20° F., without departing from the scope of the present invention. The parameters of the frozen holding recipe can also vary from those shown in Table 1 in other ways without departing from the scope of the present invention.

TABLE 1

| Parameter | Value |
| --- | --- |
| Temperature Set Point (° F.) | 27 |
| Humidity Duty Cycle (%) | NA |
| Humidity Period (s) | NA |
| Humidity on | False |
| Heat on | False |
| Duration (hr) | NA |
| Next Recipe | NA |

The slow thawing recipe 1204 and the fast thawing recipe 1205 define instructions for controlling environmental conditions of a dough preparation chamber 1014, 1015 using the humidity control system 1110 and the temperature control system 1112 to thaw dough in the dough preparation chamber from a frozen state to a slacked or thawed state. For purposes of this disclosure, dough in a "slacked state" will be understood to mean dough that is partially-thawed (at a higher temperature relative to its previous temperature) and ready for being worked in one or more dough preparation processes (e.g., scoring, stretching, seasoning, etc.). As explained below, the slow thawing recipe 1204 is configured when executed to slowly thaw frozen dough to a slacked or thawed state and to hold the slacked or thawed dough in the slacked or thawed state. Desirably, dough in the slacked or thawed state has an internal temperature in the inclusive range of about 25 degrees F. to about 40 degrees F., more desirably in the inclusive range of about 30 degrees F. to about 40 degrees F., and more desirably in the inclusive range of about 30 degrees F. to about 36 degrees F. (e.g., about 32 degrees F.). The fast thawing recipe 1205 is configured when executed to thaw frozen dough to the slacked or thawed state more quickly than the slow thawing recipe 1204. In general, it is contemplated that the slow thawing recipe 1204 may be used for thawing frozen dough overnight so that the dough is in a ready-to-use condition (slacked or thawed state) when a user arrives in a food preparation facility in the morning. The fast thawing recipe 1205 may be used for a more immediate (e.g., unexpected) need for slacked or thawed dough arises and frozen dough must be thawed to a slacked or thawed state more quickly.

As shown in Table 2 below, in one embodiment, when the controller 1024 executes the slow thawing recipe 1204, it uses ambient heating and the refrigeration system of the temperature control system 1112 to adjust the temperature of a selected dough preparation chamber 1014, 1015 toward a slow thawing temperature set point. In the illustrated embodiment, the slow thawing temperature set point parameter 1212 is 32° F. In other embodiments, the slow thawing temperature set point defined in the control instructions of a slow thawing recipe may be in an inclusive range of from about 25° F. to about 40° F., in an inclusive range from about 25° F. to about 35° F., in an inclusive range of from about 30° F. to about 40° F., or more desirably in an inclusive range from about 30° F. to about 36° F. Other slow thawing temperature set points can be used without departing from the scope of the present invention.

TABLE 2

| Parameter | Value |
| --- | --- |
| Temperature Set Point (° F.) | 32 |
| Humidity Duty Cycle (%) | 12 |
| Humidity Period (s) | 350 |
| Humidity on | True |
| Heat on | False |
| Duration (hr) | 30 |
| Next Recipe | Alarm |

When executing the slow thawing recipe 1204, the controller is operative to control the temperature control system 1112 to adjust the temperature of the dough preparation chamber toward the slow thawing temperature set point. In the illustrated slow thawing recipe 1204, the heat on parameter 1220 is set to False. Thus, the slow thawing recipe 1204 includes an indication (e.g., the False heat on parameter 1220) that the temperature control system 1112 is not to be used to heat the dough preparation chamber 1014, 1015 during execution of the slow thawing recipe. In other words, the slow thawing recipe 1204 is free of a parameter that indicates that a heating system is used to warm the chamber (However, it will be understood that the heating elements 1154, 1155 may nonetheless be used in their capacity of evaporator coil defrosting elements (independent from a dough preparation recipe) during the slow thawing recipe to defrost the evaporator coils 1124, 1125.) The controller executes the slow thawing recipe 1204 using closed loop temperature control based on a temperature signal from the temperature sensor 1158 associated with the respective chamber 1014, 1015. Because the heat on parameter is set to False, the controller 1024 is operative to control the temperature control system 1112 so that ambient heating (and not an active heating system) heats the dough preparation chamber 1014, 1015 when the temperature of the dough preparation chamber is lower than the slow thawing temperature set point. When the temperature in the dough preparation chamber 1014, 1015 is greater than or equal to a hysteresis temperature, higher than the slow thawing temperature set point (e.g., 4 degrees higher than the slow thawing temperature set point), the controller is operative to control the refrigeration system of the temperature control system 1112 to cool the dough preparation chamber. The refrigeration system is activated until the temperature in the chamber reaches the slow thawing temperature set point, and the refrigeration system remains idle until the temperature is once greater than or equal to the hysteresis temperature.

The slow thawing recipe 1204 illustrated in Table 2 also defines slow thawing humidity parameters 1214, 1216 at which the controller 1024 is configured to operate the humidity control system 1110 when the slow thawing recipe is executed. In the illustrated embodiment, the slow thawing recipe defines a slow thawing humidity duty cycle of about 12% and a slow thawing humidity cycle period of about 350 seconds. In other embodiments, the slow thawing recipe can define a slow thawing humidity duty cycle in an inclusive range of from about 10% to about 20% and a slow thawing humidity cycle period in an inclusive range of from about 100 seconds to about 600 seconds. Other slow thawing humidity parameters can be used without departing from the scope of the present invention.

In the illustrated embodiment, the slow thawing recipe 1204 functions to both thaw frozen dough from a frozen state to a slacked or thawed state and to subsequently maintain the slacked or thawed dough in the slacked or thawed state for an extended period of time. The recipe duration parameter 1224 is set to 30 hours, and the next recipe parameter is set to Alarm. The slow thawing recipe 1204 is, therefore, set to run for a duration of 30 hours during which dough can be maintained in a slacked or thawed state according to the parameters of the recipe. After the slow thawing duration has elapsed, the controller 1024 is configured to provide an alarm signal to the user through the user interface indicating that the dough should be removed because it has been maintained in a slacked or thawed state for a maximum duration. The controller 1024 is configured to continue operating the chamber conditioning systems 1110, 1112 according to the slow thawing parameters, even after providing the alarm. It will be understood that the recipe duration parameter 1224 and the next recipe parameter 1226 could be set to NA so that the thawing recipe runs indefinitely, without any alarm.

Although the illustrated slow thawing recipe 1204 is a single stage recipe, it is expressly contemplated that the slow thawing recipe can include multiple stages for sequentially thawing dough and holding thawed or slacked dough. For example, the slow thawing recipe can include a first slow thawing instance of the recipe template 1210 with parameters defined for thawing dough from a frozen state. The first recipe instance can include a recipe duration parameter 1224 and a next recipe parameter that points to a second instance of the recipe template 1210 with parameters defined for holding the dough in a slacked or thawed state. For example, the holding instance of the recipe template 1210 may have a lower set point temperature than the thawing instance. Still other slow thawing recipe stages (e.g., multiple thawing stages, etc.) may be used without departing from the scope of the present invention.

As shown in Table 3 below, in one embodiment, when the controller 1024 executes the fast thawing recipe 1205, the controller initially uses heating provided by a heating element 1154, 1155 to adjust the temperature of a selected dough preparation chamber 1014, 1015 toward a fast thawing temperature set point. In the illustrated embodiment, the fast thawing temperature set point parameter 1212 is 100° F. Other fast thawing temperature set points can be used for a fast thawing recipe without departing from the scope of the present invention. For example, the fast thawing temperature set point can be in an inclusive range of from about 45° F. to about 150° F., from about 45° F. to about 100° F., from about 70° F. to about 150° F., or from about 45° F. to about 85° F. Other thawing temperature set points can also be used, and staged thawing temperature set points (e.g., first set point, then lower set point, etc.) can also be used for a fast thawing recipe without departing from the scope of the present invention.

TABLE 3

| Parameter | Value |
| --- | --- |
| Temperature Set Point (° F.) | 100 |
| Humidity Duty Cycle (%) | 12 |
| Humidity Period (s) | 350 |
| Humidity on | True |
| Heat on | True |
| Duration (hr) | 1.5 |
| Next Recipe | Slow Thawing |

When executing the fast thawing recipe 1205, the controller is operative to control the temperature control system 1112 to adjust the temperature of the dough preparation chamber 1014, 1015 toward the fast thawing temperature set point. In the illustrated fast thawing recipe 1204, the heat on parameter 1220 is set to True. Thus, the fast thawing recipe 1205 includes an indication (e.g., the True heat on parameter 1220) that the temperature control system 1112 is to be used to heat the dough preparation chamber 1014, 1015 during execution of the fast thawing recipe. The controller executes the fast thawing recipe 1204 using closed loop temperature control based on a temperature signal from the temperature sensor 1158 associated with the respective chamber 1014, 1015. Because the heat on parameter 1220 is set to True, the controller 1024 is operative to control the heating element 1158 to heat the dough preparation chamber 1014, 1015 when the temperature of the dough preparation chamber is less than or equal to a hysteresis temperature lower than the fast thawing temperature set point (e.g., 4 degrees lower than the fast thawing temperature set point). As explained below, the duration of the fast thawing recipe instance 1205 is set so that the temperature of the dough preparation chamber 1014, 1015 fails to reach the fast thawing set point temperature before the fast thawing recipe transitions to a slacked or thawed holding stage. The refrigeration system of the temperature control system 1112 is not used until the fast thawing recipe reaches a slacked or thawed holding stage.

The fast thawing recipe 1205 illustrated in Table 3 also defines fast thawing humidity parameters 1214, 1216 according to which the controller 1024 is configured to operate the humidity control system 1110 when the fast thawing recipe is executed. In the illustrated embodiment, the fast thawing recipe defines a fast thawing humidity duty cycle of about 12% and a fast thawing humidity cycle period of about 350 seconds. For example, the fast thawing recipe can define a fast thawing humidity duty cycle in an inclusive range of from about 10% to about 20% and a fast thawing humidity cycle period in an inclusive range of from about 100 seconds to about 600 seconds. Fast thawing recipes can define still other humidity parameters without departing from the scope of the present invention.

In the illustrated embodiment, the fast thawing recipe 1205 functions to rapidly thaw frozen dough, and automatically transitions to a second recipe stage for maintaining the dough in a slacked or thawed state. To transition the fast thawing recipe from thawing to holding, the recipe duration parameter 1224 is set to 1.5 hours and the next recipe parameter is set to "Slow Thawing." The fast thawing recipe 1205 is, therefore, set to run for a duration (1.5 hours, though other durations, such as those in an inclusive range of from about 0.5 hours to about 4.0 hours, can be used) over which frozen dough can be at least partially thawed by operating the chamber conditioning systems 1110, 1112 according to the fast thawing parameters. After the fast thawing duration has elapsed, the controller 1024 is configured to automatically initiate the slow thawing recipe 1204, which as explained above, is well-suited for maintaining dough in a slacked or thawed state. It is understood that, instead of transitioning to the slow thawing recipe 1204, the next recipe parameter 1226 could be set to another holding recipe suitable for maintaining dough in a slacked or thawed state. It will be appreciated that by the end of the heating stage of the fast thawing recipe, or at some point during the holding stage of the fast thawing recipe, the dough desirably achieves the thawed or slacked state in which the dough has an internal temperature in the inclusive range of about 25 degrees F. to about 40 degrees F., more desirably in the inclusive range of about 30 degrees F. to about 40 degrees F., and more desirably in the inclusive range of about 30 degrees F. to about 36 degrees F. (e.g., about 32 degrees F.).

Although the illustrated fast thawing recipe 1225 includes only a single thawing stage that transitions to a holding stage, it is expressly contemplated that in other embodiments a fast thawing recipe can include multiple thawing stages for sequentially thawing frozen dough using different chamber conditioning system parameters. For example, the fast thawing recipe can include sequential thawing stages that vary in set point temperature (e.g., stepping down in set point temperature with each successive stage, stepping up in set point temperature with each successive stage, etc.) and/or humidity duty cycle (e.g., stepping down in humidity duty cycle with each successive stage, stepping up in humidity duty cycle with each successive stage, etc.).

As shown in Table 4 below, the dough conditioning recipe 1206 is configured to condition dough in one of the dough preparation chambers 1014, 1015 so that the dough transitions from the slacked or thawed state to a conditioned state in which the dough is ready for proofing. Desirably, the dough in the conditioned state has an internal temperature in the inclusive range of about 40° F. to about 60° F., from about 40° F. to about 55° F., or from about 40° F. to about 50° F. (e.g., about 50 degrees F.). In one embodiment, when the controller 1024 executes the conditioning recipe 1206, the controller uses heating provided by a heating element 1154, 1155 to adjust the temperature of a selected dough preparation chamber 1014, 1015 toward a conditioning temperature set point. In the illustrated embodiment, the conditioning temperature set point parameter 1212 is 65° F. The conditioning temperature set point for a conditioning recipe can be in an inclusive range of from about 55° F. to about 75° F., or from about 45° F. to about 80° F. Still other conditioning temperature set points can be used without departing from the scope of the present invention.

TABLE 4

| Parameter | Value |
| --- | --- |
| Temperature Set Point (° F.) | 65 |
| Humidity Duty Cycle (%) | 15 |
| Humidity Period (s) | 350 |
| Humidity on | True |
| Heat on | True |
| Duration (hr) | 0.5 |
| Next Recipe | Conditioned Holding |

When executing the conditioning recipe 1206, the controller 1024 is operative to control the temperature control system 1112 to adjust the temperature of the dough preparation chamber 1014, 1015 toward the conditioning temperature set point. In the illustrated fast thawing recipe 1204, during an initial heating stage, the heat on parameter 1220 is set to True. Thus, the conditioning recipe 1206 includes an indication (e.g., the True heat on parameter 1220) that the temperature control system 1112 is to be used to heat the dough preparation chamber 1014, 1015 during execution of the conditioning recipe. The controller 1024 executes the conditioning recipe 1206 using closed loop temperature control based on a temperature signal from the temperature sensor 1158 associated with the respective chamber 1014, 1015. Because the heat on parameter 1220 is set to True, the controller 1024 is operative to control the heating element 1158 to heat the dough preparation chamber 1014, 1015 when the temperature of the dough preparation chamber is less than or equal to a hysteresis temperature lower than the conditioning temperature set point (e.g., four degrees F. lower than the conditioning temperature set point). As explained below, the duration of the conditioning recipe instance 1205 is set so that the temperature of the dough preparation chamber 1014, 1015 fails to reach the conditioning temperature set point before the conditioning recipe transitions to a holding recipe. The refrigeration system of the temperature control system 1112 is not used until the conditioning recipe 1206 reaches a holding stage.

The conditioning recipe 1206 shown in Table 4 also defines conditioning humidity parameters 1214, 1216 according to which the controller 1024 is configured to operate the humidity control system 1110 when the conditioning recipe is executed. In the illustrated embodiment, the conditioning recipe defines a conditioning humidity duty cycle of about 15% and a conditioning humidity cycle period of about 350 seconds. Thus, the conditioning humidity duty cycle may be greater than the thawing humidity duty cycle to provide more moisture during dough conditioning than dough thawing. The conditioning recipe can define a conditioning humidity duty cycle in an inclusive range of from about 10% to about 20% and a conditioning humidity cycle period in an inclusive range of from about 100 seconds to about 600 seconds. Conditioning recipes can define still other humidity parameters without departing from the scope of the present invention.

In the illustrated embodiment, the conditioning recipe 1206 functions to transition slacked or thawed dough to the conditioned state and hold the dough in the conditioned state. For transitioning to a conditioned holding function, the recipe duration parameter 1224 is set to 0.5 hours and the next recipe parameter is set to Conditioned Holding. The conditioning recipe 1206 is, therefore, set to run for a duration (0.5 hours, though other durations, such as those in an inclusive range of from about 0.25 hours to about 3.0 hours, may also be used in other embodiments) at which slacked or thawed dough can be conditioned by operating the chamber conditioning systems 1110, 1112 according to the listed parameters. After the conditioning duration has elapsed, the controller 1024 is configured to automatically initiate the conditioned holding recipe 1208, which as explained below is well-suited for maintaining dough in a conditioned state.

As shown in Table 5 below, the conditioned holding recipe 1208 is configured to hold dough in the conditioned state in one of the preparation chambers 1014, 1015 for an extended period. In one embodiment, when the controller 1024 executes the conditioned holding recipe 1206, the controller uses ambient heating and refrigeration provided by the temperature control system 1112 to adjust the temperature of a selected dough preparation chamber 1014, 1015 toward a conditioned holding temperature set point. In the illustrated embodiment, the conditioned holding temperature set point parameter 1212 is less than the conditioning temperature set point parameter shown in Table 4. More specifically, the conditioned holding temperature set point is about 50° F. The conditioned holding temperature set point defined in the control instructions of a conditioned holding recipe can be in an inclusive range of from about 40° F. to about 60° F., from about 40° F. to about 55° F., or from about 40° F. to about 50° F. Still other holding temperature set points can be used without departing from the scope of the present invention.

TABLE 5

| Parameter | Value |
| --- | --- |
| Temperature Set Point (° F.) | 50 |
| Humidity Duty Cycle (%) | 15 |
| Humidity Period (s) | 350 |
| Humidity on | True |
| Heat on | False |

TABLE 5-continued

| Parameter | Value |
| --- | --- |
| Duration (hr) | 4 |
| Next Recipe | Alarm |

When executing the conditioned holding recipe 1208 (which may also be referred to as a retarding recipe), the controller 1024 is operative to control the temperature control system 1112 to adjust the temperature of the dough preparation chamber 1014, 1015 toward the conditioned holding temperature set point. In the illustrated conditioned holding recipe 1208, the heat on parameter 1220 is set to False. Thus, the conditioned holding recipe 1208 includes an indication (e.g., the False heat on parameter 1220) that the temperature control system 1112 is not to be used to heat the dough preparation chamber 1014, 1015 during execution of the conditioned holding recipe. The controller 1024 executes the conditioned holding recipe 1208 using closed loop temperature control based on a temperature signal from the temperature sensor 1158 associated with the respective chamber 1014, 1015. Because the heat on parameter is set to False, the controller 1024 is operative to control the temperature control system 1112 so that ambient heating (and not an active heating system) heats the dough preparation chamber 1014, 1015 when the temperature of the dough preparation chamber is lower than the conditioned holding temperature set point. When the temperature in the dough preparation chamber 1014, 1015 is greater than or equal to a hysteresis temperature higher than the conditioned holding temperature set point (e.g., four degrees higher than the conditioned holding temperature set point), the controller is operative to control the refrigeration system of the temperature control system 1112 to cool the dough preparation chamber.

The conditioned holding recipe 1208 shown in Table 5 also defines conditioned holding humidity parameters 1214, 1216 at which the controller 1024 is configured to operate the humidity control system 1110 when the conditioned holding recipe is executed. In the illustrated embodiment, the conditioned holding recipe defines a conditioned holding humidity duty cycle of about 15% and a conditioned holding humidity cycle period of about 350 seconds. Thus, the conditioned holding humidity control parameters are the same as the conditioning humidity parameters. The conditioned holding recipe can define a conditioned holding humidity duty cycle in an inclusive range of from about 10% to about 20% and a conditioned holding humidity cycle period in an inclusive range of from about 100 seconds to about 600 seconds. Conditioned holding recipes can define still other humidity parameters without departing from the scope of the present invention.

In the illustrated embodiment, the conditioned holding recipe 1208 functions to maintain the dough in the conditioned state for an extended period of time after execution of the conditioning recipe 1206. It will be appreciated that holding the dough in the conditioned state according to the conditioned holding recipe assists in enhancing the flavor of the baked bread because the extended holding period delays (retards) fermentation of yeast in the dough. The recipe duration parameter 1224 is set to 4 hours, and the next recipe parameter is set to Alarm. The conditioned holding recipe 1208 is, therefore, set to run for a duration over which dough can be maintained in the conditioned state according to the parameters of the recipe. After the duration has elapsed, the controller 1024 is configured to provide an alarm signal (e.g., an audio and/or visual indication) to the user through the user interface indicating that the dough should be removed because it has been maintained in a conditioned state for a maximum duration. The controller 1024 is configured to continue operating the chamber conditioning systems 1110, 1112 according to the holding parameters, even after providing the alarm. It will be understood that the dough can achieve the desired temperature of the conditioned state during the heating stage of the conditioning recipe or during the holding stage of the conditioning recipe.

Figure 45:
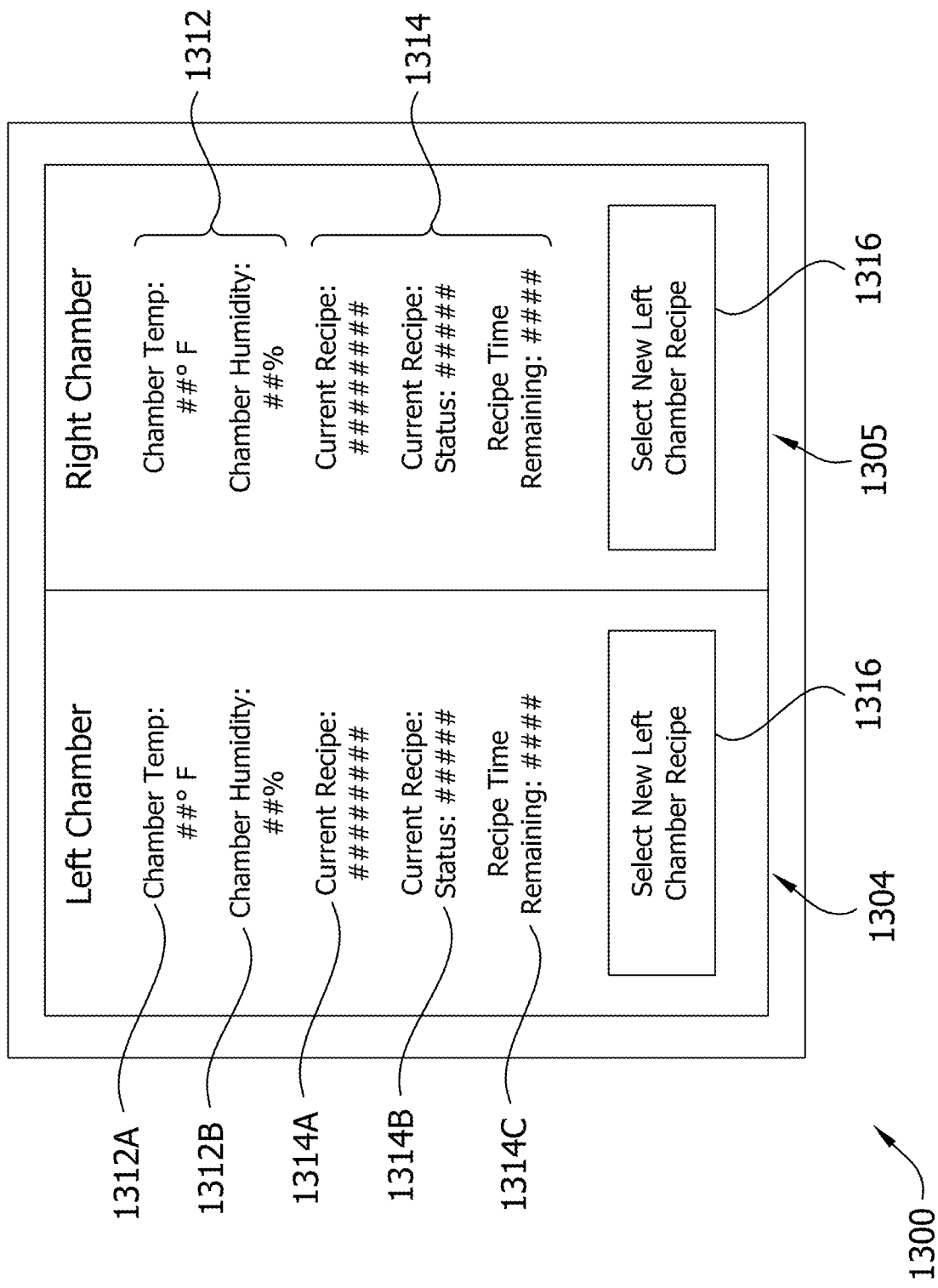
FIG. 45 is a schematic screenshot of an overview screen for a user interface of the control system.
Figure 46:
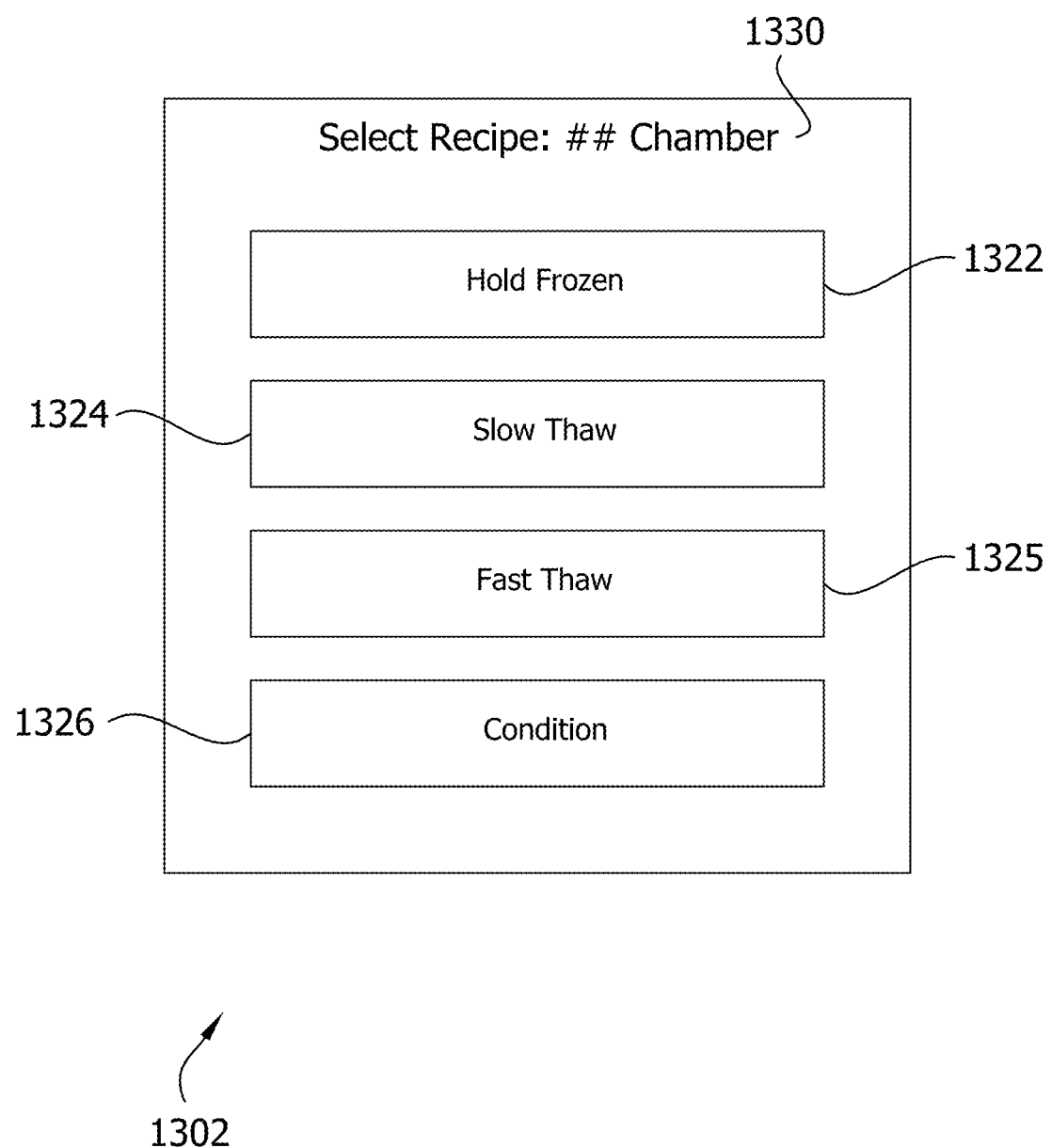
FIG. 46 is a schematic screenshot of the user interface showing recipe actuators for selection by a user.
Figure 47:
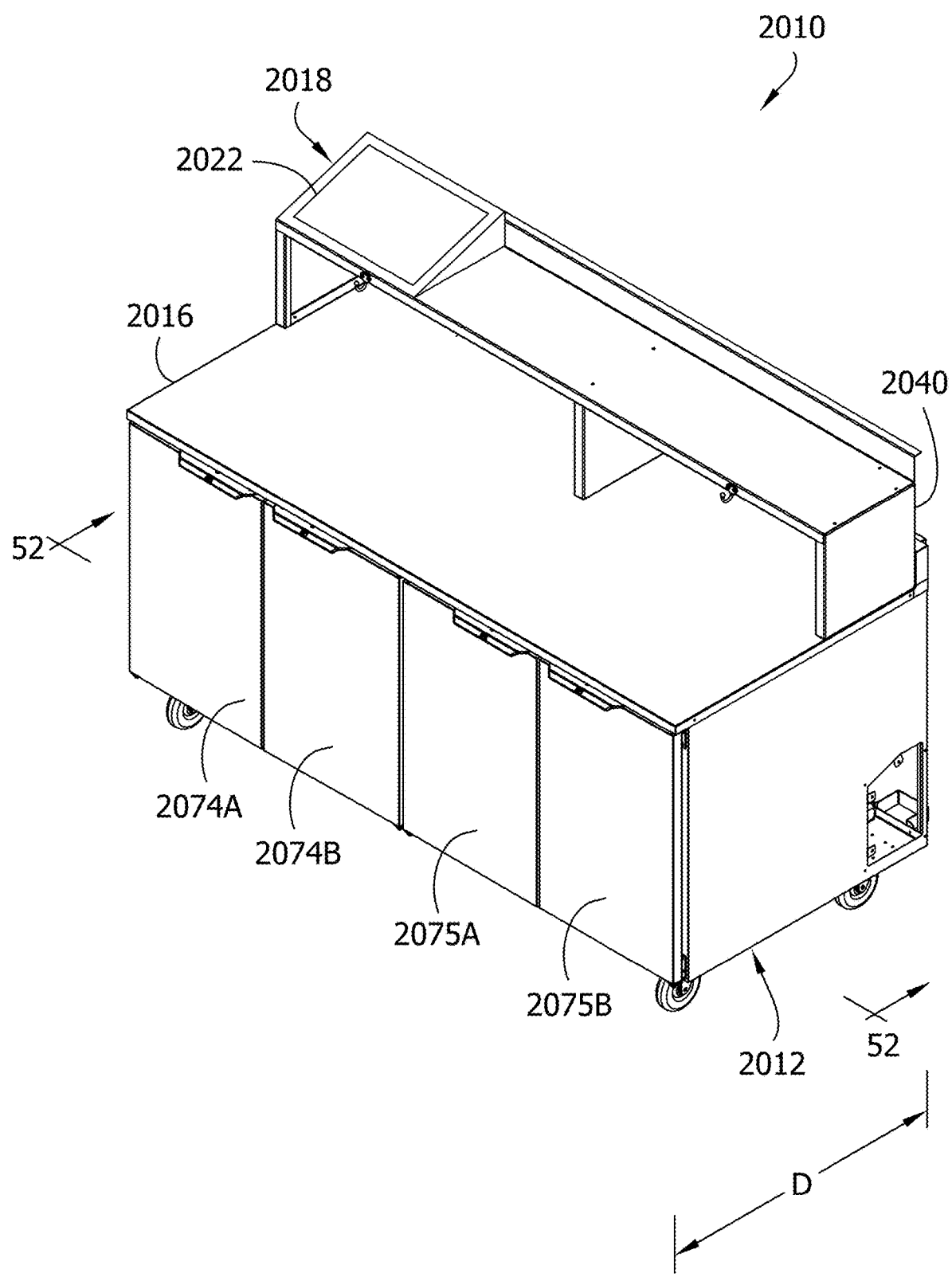
FIG. 47 is a perspective of another embodiment of a dough preparation apparatus.

Referring to FIGS. 45 and 46, the user interface 1022 is configured to generate a plurality of screens 1300, 1302 (e.g., displayed on a touch sensitive display) that provide an output to the user representing a dough preparation characteristic of each of the dough preparation chambers 1014, 1015 and provide a control input that allows a user to selectively execute the dough preparation recipes in either chamber. FIG. 45 illustrates an exemplary overview screen 1300, which provides a visual output of information about the operational characteristics of each of the left and right dough preparation chambers 1014, 1015. It will be understood that the user interface 1010 could also comprise a speaker or other sound generating device for audibly providing output information (e.g., alarm indications, etc.) to the user. The overview screen 1300 includes a left chamber section 1304 for providing output information about the left dough preparation chamber 1014 and a right chamber section 1305 for providing output information about the right dough preparation chamber 1015. Output information about first and second dough preparation chambers could be arranged differently and/or on other screens without departing from the scope of the present invention.

In the illustrated embodiment, the overview screen 1300 includes chamber condition display indicators 1312 for each of the left and right chambers 1014, 1015. More specifically, the illustrated screen 1300 includes a temperature indicator 1312A that indicates the current temperature of the respective chamber 1014, 1015 and a humidity indicator 1312B that indicates the current relative humidity of the chamber. Other chamber condition indicators may also be displayed in other embodiments. The controller 1024 receives output signals representative of chamber temperature and relative humidity from the temperature sensors 1158 and humidity sensors 1182 (if supplied) associated with each dough preparation chamber 1014, 1015 and provides the output signals to the user interface 1022. The user interface displays the temperature and relative humidity information in the output signals in the indicators 1312A, 1312B in each chamber section 1304, 1305.

Each of the chamber sections 1304, 1305 also includes recipe indicators 1314 that indicate the recipe that is currently being executed in the respective chamber 1014, 1015. The recipe indicators 1314 include a current recipe indicator 1314A, which identifies the recipe that is currently being executed in the respective chamber 1014, 1015. A recipe status indicator 1314B is also displayed in each section 1304, 1305 to provide a visual summary of the status of the recipe being executed in the respective chamber 1014, 1015. For example, for a multi-stage recipe, the status indicator 1314B may include an indication of which stage is currently being executed. Alarm information indicating that the maximum duration for the current recipe has elapsed may also be provided in the recipe status indicator 1314B. The recipe status indicator 1314B may also include an indication of any actions a user is permitted or not permitted to take based on the current status of the recipes. The illustrated overview section 1300 further provides a time remaining indicator 1314C, which provides an indication of the time remaining until the recipe reaches its maximum duration. In other embodiments, the recipe information indicators may also include a stage time indicator that provides information about the time remaining until the recipe automatically switches to another stage.

In addition to the informational indicators 1312, 1314, each chamber display section 1304, 1305 in the illustrated overview screen 1300 includes a selection actuator 1316 for executing a new recipe in the respective chamber 1014, 1015. In the illustrated embodiment, each selection actuator 1316 is a touch-sensitive icon or button on the touchscreen display. Other types of selection actuators can be provided without departing from the scope of the present invention.

When the user actuates the selection actuator 1316, the user interface 1022 navigates to a control actuator screen 1302. The control actuator screen 1302 displays a plurality of recipe selection actuators 1322, 1324, 1325, 1326, which function as control actuators operative to receive a user input selecting one of the dough preparation recipes 1202, 1204, 1205, 1206 for execution. The control actuator screen 1302 also displays a chamber indicator 1330, which identifies the chamber 1014, 1015 that was selected using the selection actuator 1316 to navigate to the control actuator screen. When a user actuates a recipe selection actuator 1322, 1324, 1325, 1326, the controller 1024 executes the respective recipe 1202, 1204, 1205, 1206 in the chamber 1014, 1015 indicated in the chamber identifier indicator 1330.

From the control actuator screen 1302, the user can select any of the dough preparation recipes 1202, 1204, 1205, 1206 for execution in the respective chamber 1014, 1015 by touching the display at the location of the respective selection actuators 1322, 1324, 1325, 1326. In the illustrated embodiment, the control actuator screen 1302 "collapses" multiple recipes into multi-stage recipes having a single selection actuator. So even though the conditioning recipe 1306 automatically transitions to the conditioned holding recipe 1308, the control actuator screen displays a single conditioning recipe control actuator 1326. Likewise, even though the fast thawing recipe 1205 automatically transitions to the slow thawing recipe 1204 after the fast thawing duration, the control actuator screen displays the fast thawing recipe as a single control actuator 1324. When the user actuates the hold frozen actuator 1322, the slow thaw icon 1324, the fast thaw icon 1325, or the condition icon 1326 the controller 1024 executes the respective recipes 1202, 1204, 1205, 1206, 1208 in the manner described above. Thus, the controller 1024 operatively connects the control actuators 1322, 1324, 1325, 1326 displayed in the control actuator screen 1302 to the chamber conditioning systems 1110, 1112 for executing the respective recipes 1202, 1204, 1205, 1206, 1208 based on control inputs provided by the user.

Although the illustrated embodiment uses the control actuator screen 1302 to provide touch-selectable control actuators for selectively actuating the recipes, it will be understood that other types of control actuators may also be used. For example, instead of graphical icons displayed on a touchscreen device, actuators may be provided in the form of buttons, switches, knobs, and/or microphones (for voice actuation) without departing from the scope of the present invention.

One exemplary method of using the dough preparation apparatus will now be described. It will be understood that, although the description references the left and right chambers 1014, 1015 in a specific sequence, either of the chambers or a single chamber may be used to perform any of the functions in the method.

Around the close of business of a first day at a food preparation facility, a user may access the overview display 1300 on the user interface 1022 and select, for example, the left chamber selection actuator 1316 to navigate to the left chamber control actuator screen 1302. From the control actuator screen 1302 the user actuates the slow thawing control actuator 1324 to begin the slow thaw recipe 1204. If dough is already present in the left chamber 1014 and the frozen holding recipe 1202 is being executed, the slow thaw immediately begins for thawing the frozen dough to a slacked or thawed state. The slow thawing recipe 1204 may be configured to automatically display an alarm indication on the overview screen 1300 if the temperature in the chamber 1014 exceeds a maximum initial thawing temperature (e.g., about 40 degrees F.) thus instructing the user to wait to place the frozen dough in the chamber. Once the temperature of the left dough preparation chamber 1014 is less than or equal to the maximum initial thawing temperature, the user places the frozen dough into the left dough preparation chamber. The chamber 1014 permits the frozen dough to thaw to a slacked or thawed state overnight and maintains the dough in the slacked or thawed state until the dough is needed.

Because the slow thawing recipe thaws the dough at a relatively slow rate, a minimum thawing time (e.g., about four hours) may need to pass before the dough is sufficiently slacked or thawed to proceed to the next dough preparation step. In one embodiment, the recipe state indicator 1314B on the overview display 1300 automatically provides an indication that the dough is not ready for removal before the minimum thawing time has elapsed and/or an indication that the dough is ready for removal after the minimum thawing time has elapsed.

When slacked or thawed dough is needed, the dough is removed from the left dough preparation chamber 1014 and subjected to further preparation steps by the user before conditioning. Some dough can be maintained in the slacked or thawed condition in the left chamber 1014 for the maximum thawing duration defined in the slow thawing recipe 1204. If only a portion of the dough in the chamber 1014 is needed, one of the left chamber doors 1074A, 1074B can be opened to remove the needed portion of the dough. The other chamber door 1074A, 1074B can remain closed to minimize the exposure of the dough preparation chamber 1014 to ambient air. The user can prepare the dough for conditioning by scoring, stretching, spraying (e.g., with water), and/or seasoning (e.g., with cheese, herbs, and/or spices). In particular, the user removes one or more containers of dough from the cabinet and performs these manual steps on the dough while the dough is outside the cabinet. It will be appreciated that the upper work surface of the counter 1016 is a suitable and convenient location for the user to support the dough while performing such manual steps.

In the meantime, the user may access the overview screen 1300 on the user interface 1022 and actuate the right chamber selection actuator 1316 to navigate to the right chamber control actuator screen 1302. On the control actuator screen 1302 the user can actuate the dough conditioning recipe control actuator 1326 to begin the conditioning recipe 1206. The user removes the dough from the counter 1016 and places the dough in the right dough preparation chamber 1015, and the controller executes the dough conditioning recipe 1206. In an initial stage, the controller 1024 executes the conditioning recipe 1206 in the right dough preparation chamber 1015 to condition the dough during the conditioning duration defined in the conditioning recipe. Then, in a second stage, the controller 1024 automatically switches to the conditioned holding recipe 1208 to hold the dough in the conditioned state until the dough is removed from the dough preparation apparatus 1010 for proofing and baking.

Because implementation of the conditioning recipe on the dough enhances taste of the baked bread, it may be desirable to ensure the user leaves the dough in the cabinet for a sufficient time during the conditioning recipe. For example, a minimum conditioning time (e.g., about 45 minutes) may need to pass before the dough is sufficiently conditioned to proceed to proofing. The 45 minutes includes the 30 minutes of the conditioning heating stage, and the initial 15 minutes of the conditioned holding stage. In one embodiment, the recipe state indicator 1314B on the overview display 1300 automatically provides an indication that the dough is not ready for removal before the minimum conditioning time has elapsed and/or an indication that the dough is ready for removal after the minimum thawing time has elapsed.

If the available slacked or thawed dough is depleted from the left dough preparation chamber 1014 and additional slacked or thawed dough is required in a relatively short timeframe (e.g., the same day), the user may access the overview screen 1300 on the user interface 1022 and actuate the left chamber selection actuator 1316 to navigate to the left chamber control actuator screen 1302. On the control actuator screen 1302 the user actuates the fast thaw control actuator 1325 to begin the fast thaw recipe 1205. Because the left chamber previously executed the slow thawing recipe in this example, the chamber temperature will be below the maximum initial thawing temperature. The dough can be immediately placed in the left dough preparation chamber 1014. If in another method of use, a fast thaw recipe is executed in a chamber that previously executed a conditioning recipe 1206 or conditioned holding recipe 1208, a cool down period may be required before loading the dough into the chamber. The controller executes the fast thaw recipe 1205 to rapidly thaw the dough from the frozen state to a slacked or thawed state. The slacked or thawed dough may subsequently be prepared via manual steps as described above then subjected to the conditioning recipe.

As is now understood, the disclosed dough preparation chamber can be used to carry out various steps in a process for preparing frozen dough for being proofed. The arrangement of the dough preparation apparatus 1010 allows a user to seamlessly integrate user performed steps (e.g., using the counter 1016 as a work surface) with automated steps carried out by the controller 1024. The user interface 1022 provides intuitive controls for executing the recipes at a pace and in a sequence that suits a user's needs. By providing two side-by-side preparation chambers 1014, 1015, the dough preparation apparatus can perform multiple preparation functions at the same time, which streamlines the dough preparation workflow and provides flexibility in the event of unexpected demand for dough. The apparatus provides an integrated solution for many steps necessary for preparing dough from a frozen state to a conditioned state ready for proofing.

Referring to FIGS. 47-52, another embodiment of a dough preparation apparatus, which may be referred to as a dough preparation work station, is generally indicated at reference number 2010. The dough preparation apparatus has a similar construction to the dough preparation apparatus 1010 described above, and like components are indicated by like reference numbers, plus 1000. For example, the dough preparation apparatus 2010 includes a cabinet 2012 having separate left and right dough preparation chambers 2014, 2015 (FIG. 48) that are arranged side-by-side. Other numbers of chambers (e.g., one, three, four, etc.) can be provided without departing from the scope of the present invention. The cabinet 2012 has a counter 2016 above the first and second dough preparation chambers 2014, 2015. The counter 2016 has an exposed upper work surface positioned at about waist height of an average adult person when standing. As explained in further detail below, the dough preparation apparatus 2010 includes multiple chamber conditioning systems configured to independently adjust environmental conditions of the left and right dough preparation chambers 2014, 2015. As will be appreciated, like the dough preparation apparatus 1010, the dough preparation apparatus 2010 provides a multipurpose dough preparation station for user handling and automated processing of frozen dough prior to proofing.

To automate and precisely control various dough preparation processes, the dough preparation apparatus 2010 includes a control system 2018 that can have the same construction as the control system 1018 as shown schematically in FIG. 42. A user can select a recipe using a user interface 2022, whereby a controller reads the selected recipe from a memory and executes the recipe in a selected one of the left and right chambers 2014, 2015 using one or more of the chamber conditioning systems. Recipes such as those discussed with respect to embodiments above can be used. For example, recipes can be configured to slowly thaw dough from a frozen state to a slacked or thawed state and maintain the dough in the slacked or thawed state for extended durations; condition dough from the slacked or thawed state to a conditioned state in which the dough is ready for proofing; hold dough in the conditioned state for a period of time; rapidly thaw dough from a frozen state to the slacked or thawed state; and/or hold dough in a frozen state prior to thawing. As will be appreciated, these exemplary recipes can be used to precisely control aspects of preparing frozen dough for subsequent proofing and baking. It will be appreciated that the dough preparation apparatus provides precise control of the thawing, conditioning, and holding environments. Baked products having improved characteristics are possible because of the consistency and precise control of the preparation environments in the chambers 2014, 2015.

Figure 48:
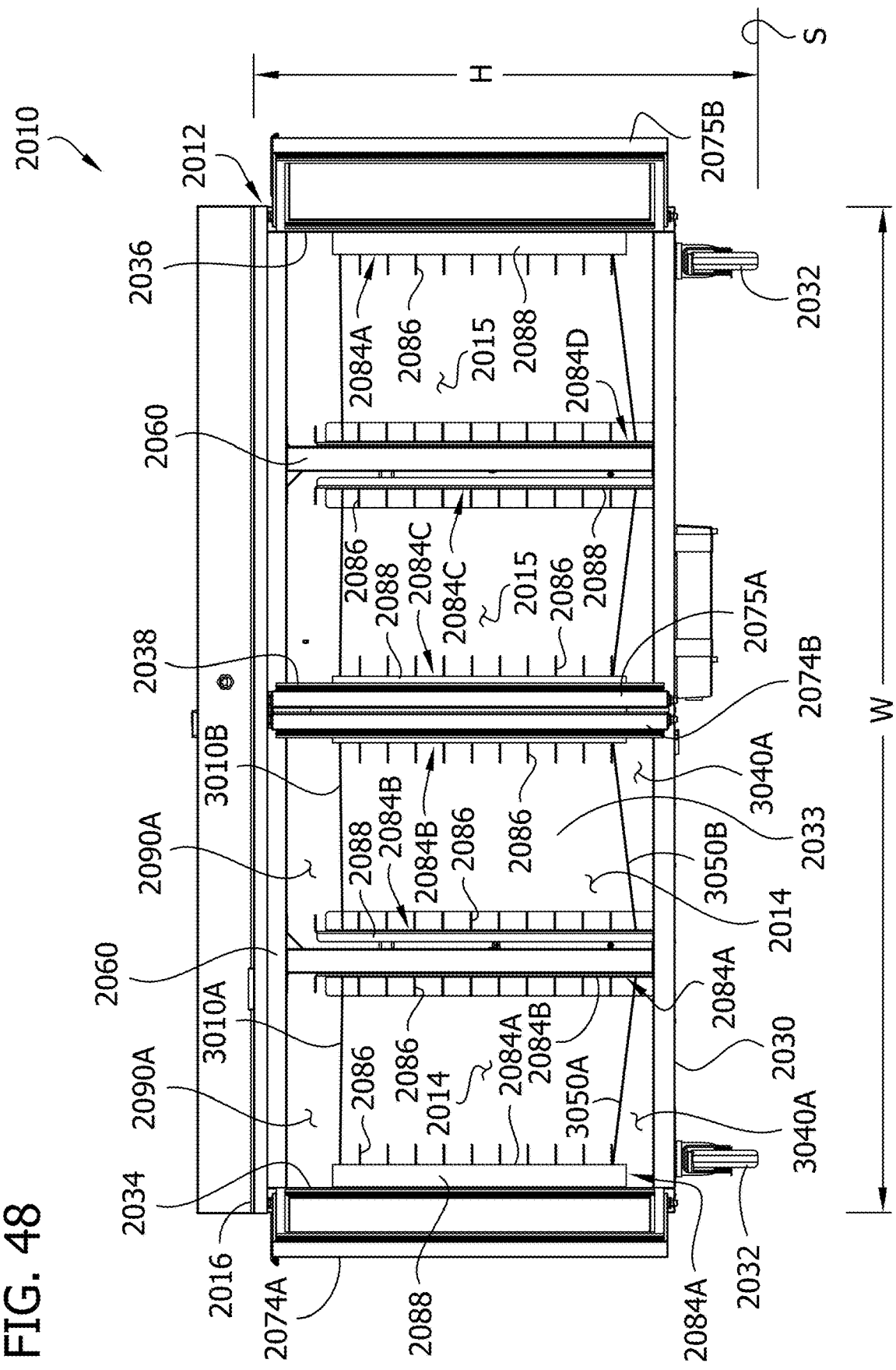
FIG. 48 is a front elevation of the dough preparation apparatus of FIG. 47 omitting an over-shelf and having doors open to expose dough conditioning chambers.
Figure 49:
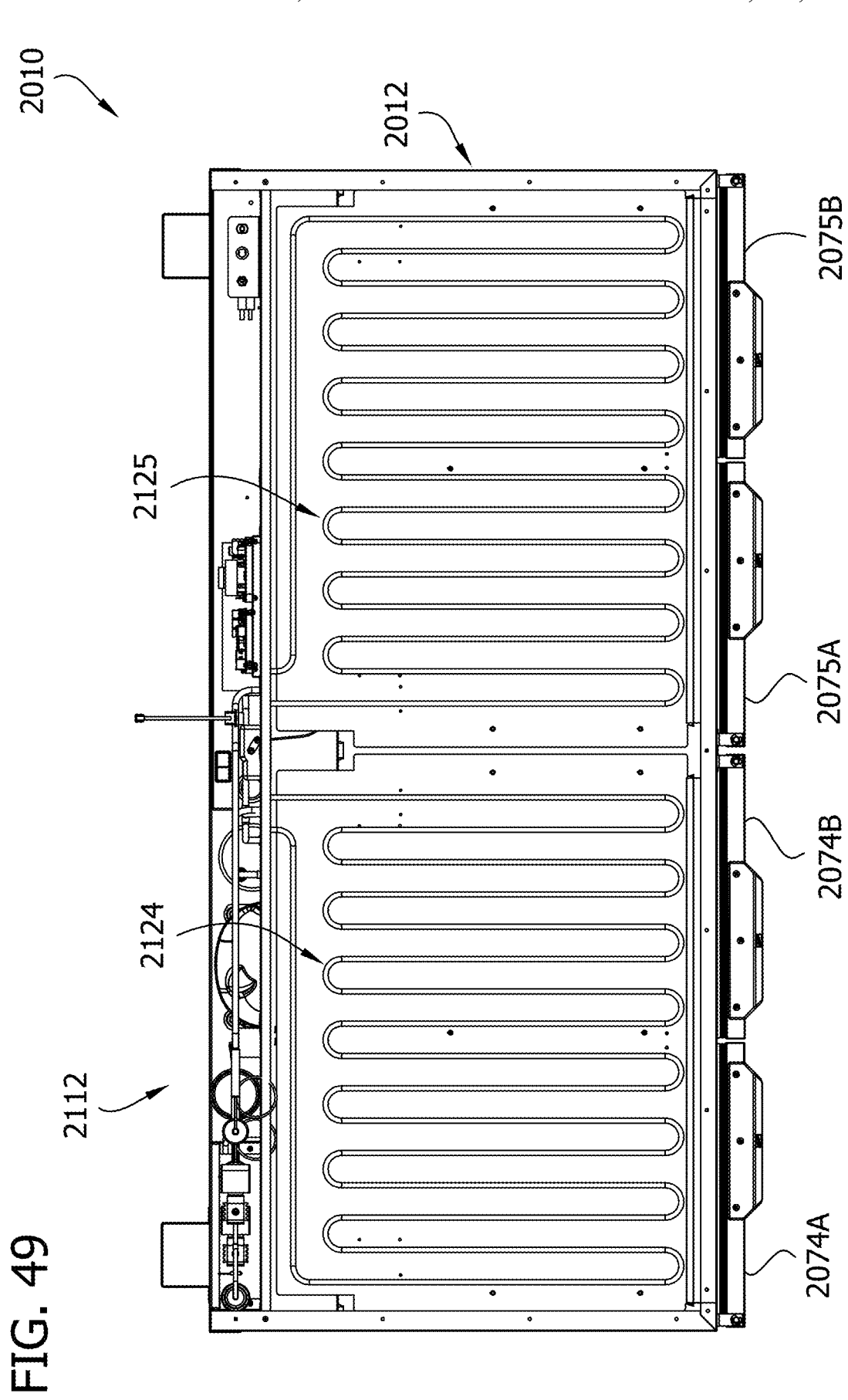
FIG. 49 is a top view of the dough preparation apparatus having components removed to show coils of a refrigeration system.
Figure 50:
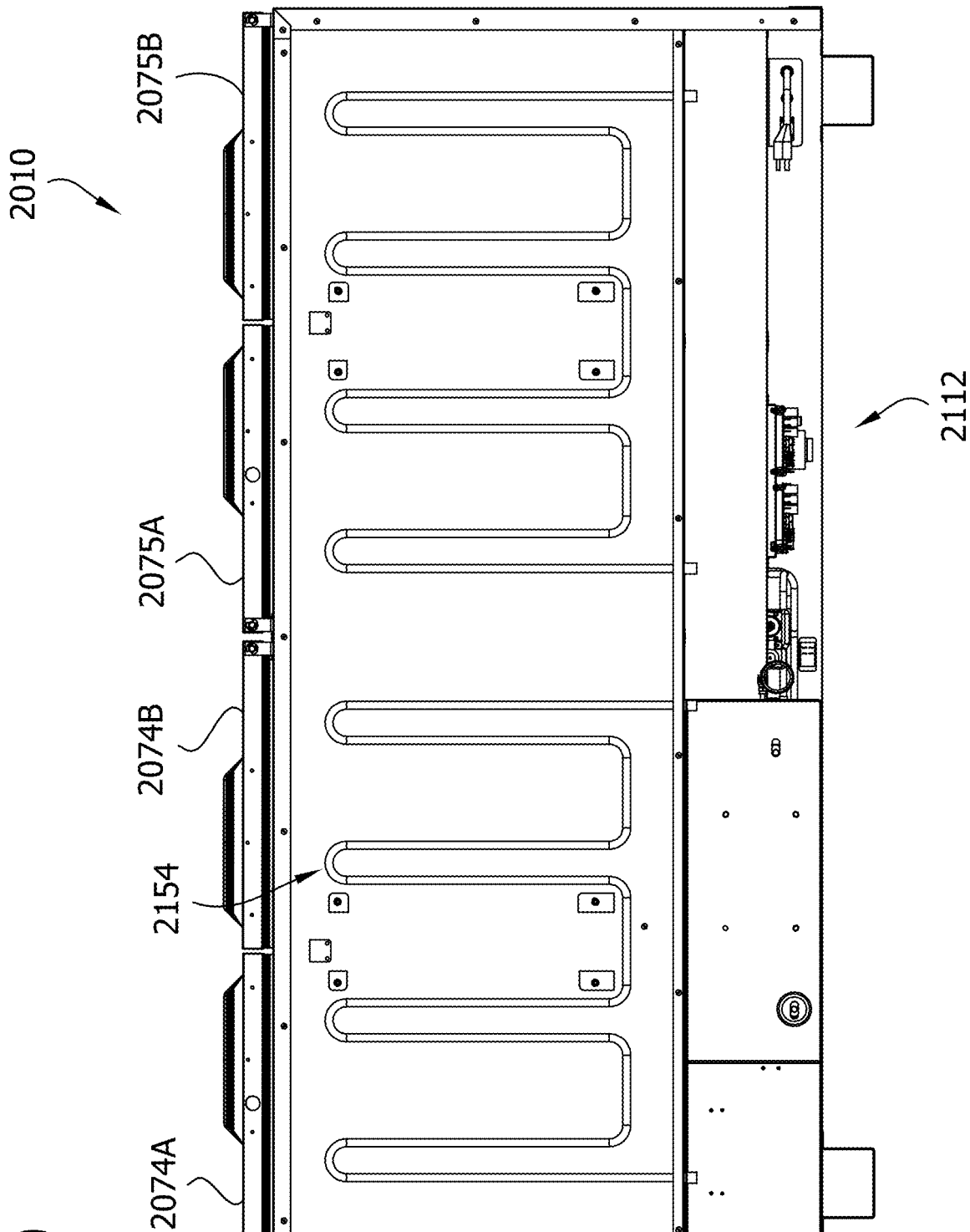
FIG. 50 is a bottom view of the dough preparation apparatus having components removed to show coils of a heating system.

Referring to FIG. 48, the cabinet 2012 includes a plurality of insulated walls, some of which define portions of the left and right dough preparation chambers 2014, 2015. A bottom wall 2030 extends along a width W (FIG. 48) of the cabinet 2012 from a left side margin to a right side margin. The bottom wall 2030 likewise extends along a depth D (FIG. 47) of the cabinet from a front edge margin to a rear edge margin. In the illustrated embodiment, the bottom wall 2030 is mounted on casters 2032 that allow the dough preparation apparatus 2010 to be rolled over a support surface S (FIG. 48) such as the floor. It will be understood that the cabinet may also be supported on the floor in other ways (e.g., by fixed feet, etc.).

A rear insulating wall 2033 (FIG. 48) extends up from adjacent a rear edge margin of the bottom wall 2030 and extends generally along the width W of the cabinet 2012. In certain embodiments, the rear wall 2033 is formed from separate left and right rear insulating panels. The rear wall may also be formed from a single panel or more than two panels in other embodiments. As will be explained in further detail below, various components of the chamber conditioning systems are mounted on the cabinet 2012 to the rear of the rear insulating wall 2033. The chamber conditioning systems include components that extend through the rear wall 2033.

A plurality of parallel, vertically oriented walls 2034, 2036, 2038 that extend up from the bottom wall and along the depth D of the cabinet 2012 define the sides of the left and right chambers 2014, 2015. A left side wall 2034 extends up from adjacent the left side edge margin of the bottom wall 2030 and a right side wall 2036 extends up from adjacent the right side edge margin. A partition wall 2038 (FIG. 52) oriented generally parallel to the left and right side walls 2034, 2036 extends up from the bottom wall 2030 at a location spaced apart between the left and right side walls. In the illustrated embodiment, the partition wall 2038 is positioned at about a midpoint along the width W of the cabinet 2012, but it may also be located at other positions (e.g. at about a one-quarter point along the width of the cabinet or at about a one-third point along the width of the cabinet, etc.) or omitted (i.e., one chamber) without departing from the scope of the invention. The partition wall 2038 divides the interior of the cabinet between the left and right dough preparation chambers 2014, 2015, such that the left dough preparation chamber extends between the left side wall 2034 and the partition wall and the right dough preparation chamber extends between the partition wall and the right side wall 2036.

Desirably, each of the bottom wall 2030, the rear wall 2033, the left side wall 2034, the right side wall 2036, and the partition wall 2038 are formed from a thermally insulating material such as an encapsulated, rigid foam. Thus, the left and right dough preparation chambers 2014, 2015 may be thermally separated or isolated from one another and the ambient environment. As explained below, the thermal or environmental separation of the two chambers 2014, 2015 allows the chamber conditioning systems to control the environmental conditions of each chamber separately. If desired, the two chambers 2014, 2015 can be used at the same time to carry out different dough preparation recipes or the same recipe.

The counter 2016 is desirably positioned on the cabinet 2012 at an elevation at which a user may rest dough or containers (e.g., pans) of dough when handling the dough before, after, and/or during dough preparation recipes carried out by the apparatus 2010 or in conducting other dough preparation work. In the illustrated embodiment, the top surface of the counter 2016 is spaced apart from the support surface S by a height H (FIG. 48). The height H may, for example, be in an inclusive range of from about 30 inches to about 50 inches, and more desirably in an inclusive range from about 32 inches to about 40 inches. Part or all of the counter 2016 may also be used as a temporary or permanent storage shelf for supporting various items, such as countertop food preparation appliances, food storage containers, food processing implements, etc. In the illustrated embodiment, the counter 2016 forms the top wall of the cabinet 2012. The illustrated counter 2016 comprises an insulating material to environmentally isolate the dough preparation chambers 2014, 2015 from the ambient environment. In other embodiments, the counter may be positioned above an insulating top wall of the chambers 2014, 2015 such that the counter need not be insulated. Desirably, the exterior surfaces of the cabinet 2012 (and the other surfaces of the cabinet) are formed by a hard and durable material (e.g., sheet metal) to withstand the rigors of frequent use. The dough preparation apparatus 2010 also includes an overshelf 2040 and associated components having the same features as described above with respect to the over-shelf 1040.

Referring to FIG. 48, the cabinet 2012 includes a front frame 2060 at the front end portions of the counter 2016 and the bottom, left side, right side, and partition walls 2030, 2034, 2036, 2038 of the cabinet. The front frame 2060 defines a left opening providing access to the left dough preparation chamber 2014, and defines a right opening providing access to the right dough preparation chamber 2015. In the illustrated embodiment, first and second left chamber doors 2074A, 2074B are mounted on the cabinet to selectively cover the left opening 2064 and first and second right chamber doors 2075A, 2075B are mounted on the cabinet to selectively cover the right opening 2065. The first and second left chamber doors 2074A, 2074B are pivotably mounted on the front frame 2060 of the cabinet 2012 on opposite sides of the left chamber opening 2065 for pivoting between a closed position (FIG. 47) and an open position (FIG. 48). The first and second right chamber doors 2075A, 2075B are likewise pivotably mounted on the front frame 2060 on opposite sides of the right chamber opening 2065 for pivoting movement between a closed position and an open position. Each door 2074A, 2074B, 2075A, 2075B includes a gasket or other seal for sealingly engaging the front frame 2060 to environmentally seal the respective chamber from the ambient environment. The doors 2074A, 2074B, 2075A, 2075B may be constructed, for example, from a material that provides insulation between the left and right dough preparation chambers 2014, 2015 and the ambient environment (e.g., encapsulated foam, glass, etc.).

The dough preparation apparatus 2010 may be constructed so that containers (e.g., trays or forms, etc.) containing dough may be loaded or unloaded from either of the left and right dough preparation chambers 2014, 2015 when one of the respective doors 2074A, 2074B, 2075A, 2075B is open. In the illustrated embodiment, first and second pairs of chamber racks 2084A, 2084B 2085A, 2085B are positioned in each of the left and right dough preparation chambers 2014, 2015 in a side-by-side arrangement. In the illustrated embodiment, the first left chamber rack 2084A is positioned in the left side portion of the left dough preparation chamber 2014, in general alignment with the first left chamber door 2075A along the width W of the cabinet 2012; and the second left chamber rack 2084B is positioned in the right side portion of the left dough preparation chamber 2014, in general alignment with the second left chamber door 2075B along the width W of the cabinet 2012. Similarly, the first right chamber rack 2085A is positioned in the left side portion of the right dough preparation chamber 2015, in general alignment with the first left chamber door 2075A along the width W of the cabinet 2012; and the second right chamber rack 2085B is positioned in the right side portion of the right dough preparation chamber 2015, in general alignment with the second right chamber door 2075B along the width W of the cabinet 2012.

Each rack 2084A, 2084B 2085A, 2085B includes a plurality of guide rails 2086 extending laterally from rack support walls 2088. The guide rails 2086 of each rack 2084A, 2084B, 2085A, 2085B are vertically spaced apart from one another along the height of the respective chamber 2014, 2015. Each of the illustrated guide rails 2086 is formed by a cutout (forming an air flow opening, as explained further below) of the rack wall 2088 that is folded inward to a horizontal orientation. The guide rails 2086 are arranged vertically in operative pairs. Each operative pair forms a guide for slidably guiding suitably sized and shaped containers (e.g., trays, pans, and/or forms) onto the respective racks 2084A, 2084B 2085A, 2085B and into the respective dough preparation chambers 2014, 2015. Other rack configurations can be used without departing from the scope of the present invention.

When the second left chamber door 2074B is open but the other chamber doors 2074A, 2075A, 2075B are closed, a container containing the dough may be slid into the chamber 2014 and onto the rack 2084B using the guide rails 2086. Similarly, when any one of the other chamber doors 2074A, 2075A, 2075B is open, a container containing the dough may slide into the respective chamber 2014, 2015 and onto the respective rack 2084A, 2085A, 2085B using the guide rails 2086. Accordingly, the arrangement of doors 2074A, 2074B, 2075A, 2075B and racks 2084A, 2084B, 2085A, 2085B in the illustrated embodiment allows a portion of the chamber opening 2064, 2065 corresponding generally to the width of the container or the width of the rack 2084A, 2084B (in this case, about one-half of the respective chamber opening) to be uncovered during loading and unloading of dough from the chamber 2014, 2015. This helps minimize exposure of the environmentally controlled chambers 2014, 2015 to the ambient environment during loading and unloading.

Figure 52:
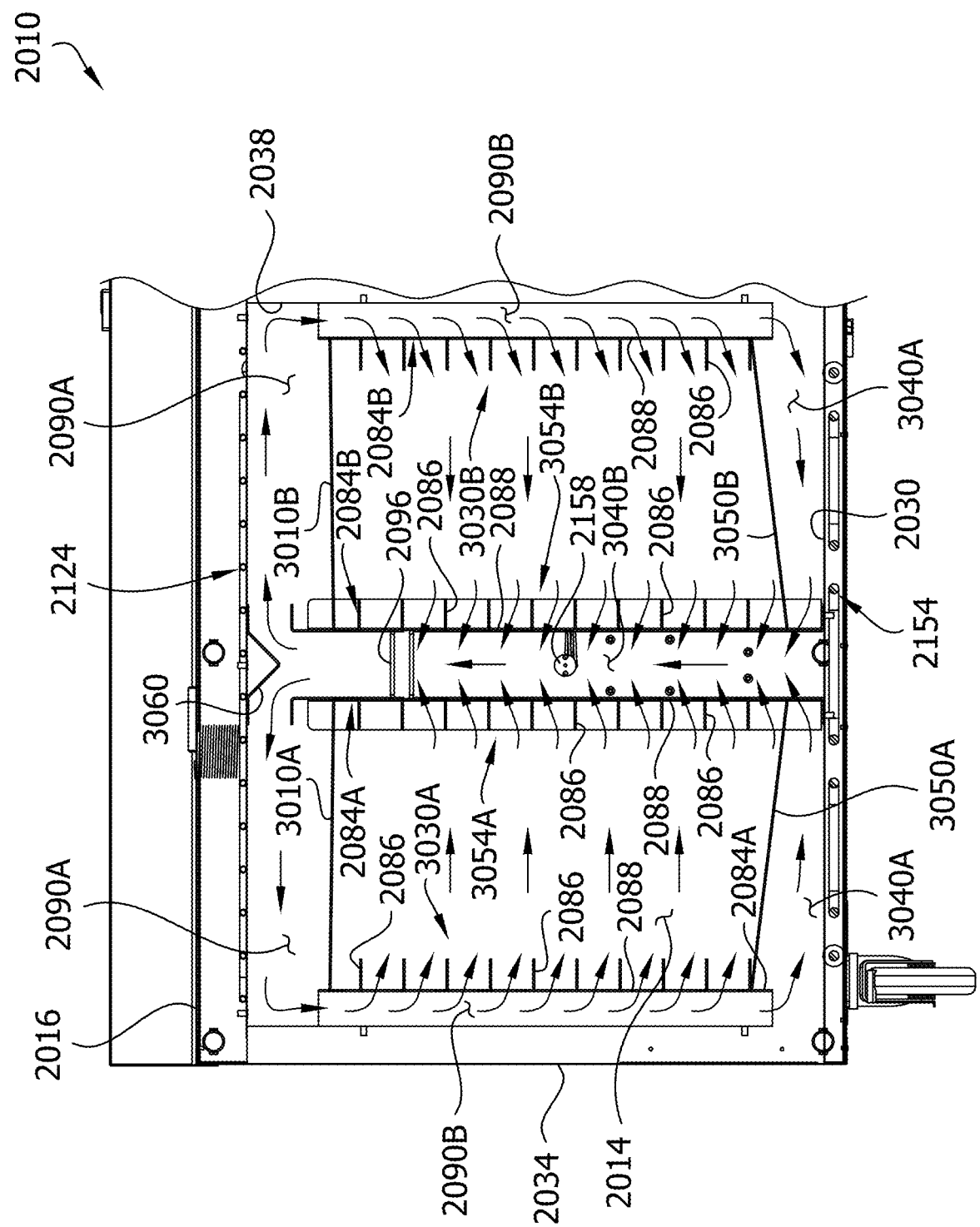
FIG. 52 is a fragmentary section of the dough preparation apparatus taken in a plane including the line 52-52 of FIG. 47.

Referring to FIG. 52, the dough preparation apparatus 2010 includes walls arranged in the interior of the cabinet 2012 for providing recirculation ducting for delivering supply air to each of the dough preparation cavities 2014, 2015 and exhausting return air from each of the dough preparation cavities. FIG. 52 depicts the left dough preparation cavity 2014, and it will be understood that the ducting arrangement in the right cavity 2015 is generally the same. As shown in FIG. 52, the recirculation ducting includes a supply duct having left and right upper supply duct portions 2090A. The upper left supply duct portion 2090A is defined by the bottom surface of the counter 2016 and an upper panel or wall 3010A, which extends widthwise above the left side of the chamber 2014 between the racks 2084A. The upper right supply duct portion 2090A is defined by the bottom surface of the counter 2016 and an upper panel or wall 3010B, which extends widthwise above the right side of the chamber 2014 between the racks 2084B. The supply duct also includes left and right side supply duct portions 2090B. The left side supply duct portion 2090B extends downwardly along the left side of the chamber 2014 and is defined by the left wall 2034 and the left rack 2084A. The right side supply duct portion 2090B extends downwardly along the right side of the chamber 2014 and is defined by the partition wall 2038 and the right rack 2084B. The supply duct 2090 has a left outlet 3030A for delivering supply air to the left side of the chamber and a right outlet 3030B for delivering supply air to the right side of the chamber. In the illustrated embodiment, the outlets each comprise a plurality of openings in the racks 2084A, 2084B below respective guide rails 2086. The openings are generally rectangular and extend along the depth of the chamber, like the openings below each guide rail 1086 shown in FIG. 35.

The recirculation ducting also includes a return duct including a lower left and right return duct portion 3040A. The lower left return duct portion 3040A is defined by the upper surface of the bottom wall 2030 and a left lower panel or wall 3050A. The lower right return duct portion 3040A is defined by the upper surface of the bottom wall 2030 and a right lower panel or wall 3050B. The return duct also includes an intermediate return duct portion 3040B extending upwardly between the left and right portions of the chamber 2014. The intermediate return duct portion 3040B is defined by the right and left racks 2084A, 2084B. The return duct includes left and right exhaust air inlets 3054A, 3054B for receiving exhaust air from the left and right portions of the chamber 2014. The exhaust air inlets 3054A, 3054B comprise a plurality of openings in the racks 2084A, 2084B under the guide rails 2086 similar to the openings forming the supply air outlets 3030A, 3030B.

A fan 2096 mounted at an upper end of the intermediate return duct portion 3040B is configured for moving air through the recirculation ducting. As explained in further detail below, the air is conditioned in the recirculation ducting for controlling one or more environmental conditions within the respective dough preparation chamber 2014. The fan 2096 is configured to recirculate air from the chamber 2014 back to the chamber via the return duct and the supply duct. The fan 2096 is configured to move air at a relatively low flow rate, such as in the inclusive range of 5-60 cfm or 10-40 cfm, such as about 18 cfm. The arrangement is such that the fan 2096 moves air along two recirculation flow paths, one associated with the left portion of the chamber 2014, and the other associated with the right portion of the chamber. A wedge-shaped air divider 3060 is provided above the fan for separating the air flow into the left and right recirculation flow paths. The left recirculation flow path extends along the supply air duct over the left portion of the chamber 2014 and down the left side of the chamber. A majority of the supply air is delivered to the chamber 2014 through the supply air outlet 3030A, but some of the supply air enters the lower left portion 3040A of the return duct and flows under the left portion of the chamber, bypassing the chamber. Air from the chamber 2014 exhausts through the inlet 3054A into the intermediate return duct portion 3040B, where it converges with air from the lower left return duct portion 3040A. The flow of air through the right side recirculation ducting and right portion of the chamber 2014 happens in a similar fashion but down the right side of the chamber and then to the left toward the intermediate portion 3040B of the return duct, from the chamber and the lower right portion 3040A of the return duct. Thus, the recirculation ducting defines a left counterclockwise air flow path and a right clockwise air flow path. The loop air flow paths extend in the recirculation ducting around the respective left and right portions of the chamber 2014. It is believed the looped air flow paths assist in providing more uniform flow of air through the left and right portions of the chamber 2014. It will be appreciated that recirculation ducting having configurations other than described and illustrated herein can be used without departing from the scope of the present invention.

As mentioned above, the dough preparation apparatus 2010 includes a chamber conditioning system configured to control environmental conditions of the left and right dough preparation chambers 2014, 2015 independently. The illustrated dough preparation apparatus 2010 includes a temperature control system, generally indicated at 2112, configured to independently control the temperature in each of the first and second dough preparation chambers 2014, 2015. Other numbers and types of chamber conditioning systems can be used without departing from the scope of the present invention. In this embodiment, a humidity control system is not provided, but a humidity control system could be provided, similar to those described above or otherwise, without departing from the scope of the present invention.

The temperature control system 2112 comprises a multiplexed refrigeration system including a common compressor 2120, condenser 2121, and receiver 2122 and including separate evaporator coils 2124, 2125 (FIG. 49) for the left and right dough preparation chambers 2014, 2015. In the illustrated embodiment, the refrigeration system further includes a common accumulator 2128 upstream of the compressor 2120, but the refrigeration system may lack an accumulator or use chamber-specific accumulators without departing from the scope of the present invention. Moreover, other types of refrigeration systems can be used without departing from the scope of the present invention.

Each evaporator coil 2124, 2125 is associated with a respective dough preparation chamber 2014, 2015 to provide cooling. In the illustrated embodiment, the evaporator coils 2124, 2125 (broadly, "cooling elements") are positioned outside the recirculation ducting, and more particularly above the left and right upper portions 2090A of the supply air duct, downstream from the fan 2096. Other types of cooling elements can be used without departing from the scope of the present invention. The position of the evaporator coil 2124 with respect to the recirculation ducting of the left chamber 2014 is shown in FIG. 52. Desirably, the evaporator coil 2124 is configured to cool substantially all of the upper surface of the left and right upper portions 2090A of the supply air duct to provide a large surface area for cooling. Desirably, the evaporator coil 2124 is in conductive heat transfer contact with outside surfaces of the recirculation ducting. For example, a thermal mastic (e.g., heat sink compound) can be used to secure the coil 2124 to the ducting. The evaporator coil 2124 removes heat from the ducting and thus from the supply air as the air passes through the upper left and right portions 2090A of the supply duct. It will be understood that the right evaporator coil 2125 is arranged similarly with respect to the recirculation ducting for the right chamber 2015.

Figure 51:
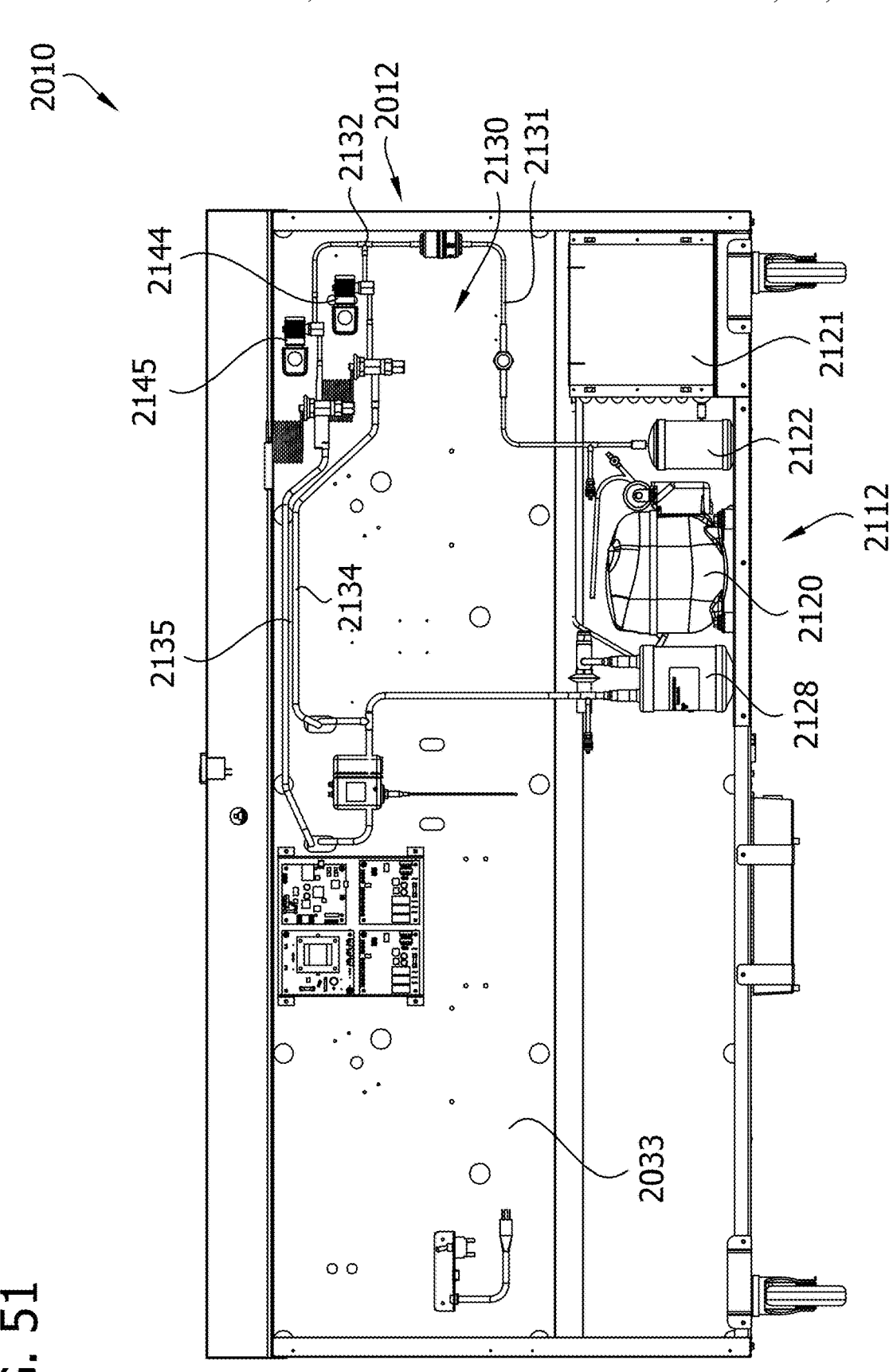
FIG. 51 is a rear elevation of the dough preparation apparatus.

To provide independent control of the refrigeration of each of the left and right dough preparation chambers 2014, 2015, the flow of refrigerant from the common receiver 2122 to each evaporator coil 2124, 2125 is independently controlled by a multiplexer, generally indicated at 2130, as shown in FIG. 51. The refrigerant from the receiver 2122 travels along a single liquid line 2131 until it reaches a flow divider 2132 of the multiplexer 2130. Subsequently, a portion of the refrigerant flows through a left chamber liquid line 2134 to the left evaporator coil 2124 and the remainder of the refrigerant flows through a right liquid line 2135 to the right evaporator coil 2125. A first solenoid valve 2144 operatively coupled to the left liquid line 2134 controls the flow of liquid refrigerant to the left evaporator coil 2124, and a second solenoid valve 2145 operatively coupled to the right liquid line 2135 controls the flow of liquid refrigerant to the right evaporator coil 2125.

The temperature control system 2112 also includes a heating system including separate heating elements 2154, 2155 (FIG. 49) for the left and right dough preparation chambers 2014, 2015. In the illustrated embodiment, the heating elements are resistance heating coils, but other types of heating elements can be used without departing from the scope of the present invention. Each heating coil 2154, 2155 is associated with a respective dough preparation chamber 2014, 2015 to provide heating. As shown in FIG. 52, the left heating coil 2154 is associated with the left chamber 2014. The heating coil 2154 is positioned outside the recirculation ducting, and more particularly below the left and right lower portions of the return air duct (in the bottom wall), upstream from the fan 2096. Desirably, the heating coil 2154 is configured to heat substantially all of the lower surface of the left and right lower portions of the return air duct to provide a large surface area for heating. Desirably, the heating coils 2154, 2155 are in conductive heat transfer contact with outside surfaces of the recirculation ducting. For example, heating coils 2154, 2155 can be part of a foil heater including layers of foil sandwiching or laminating the heating coils and applied to the outside surface of the ducting. The heating coil 2154 heats the ducting and thus the air in the lower portions 3040A of the return duct. It will be understood that the right heating coil 2155 is arranged similarly with respect to the recirculation ducting for the right chamber 2015.

To provide closed loop temperature control, the dough preparation apparatus 2010 includes at least one temperature sensor 2158 for sensing a temperature of the dough preparation chambers 2014, 2015. Each temperature sensor 2158 is operatively coupled to the respective dough preparation chamber 2014, 2015 to provide an output signal representative of a temperature of the respective dough preparation chamber. As shown in FIG. 52, in the illustrated embodiment, one temperature sensor 2158 is positioned in the intermediate portion of the return air duct 3040B for the chamber 2014, and it will be appreciated another sensor is similarly positioned for the chamber 2015. Temperature sensors can be provided in other locations or omitted without departing from the scope of the present invention. As explained above with respect to other embodiments, the temperature sensors can be used in closed-loop temperature control for carrying out dough preparation recipes.

It will be understood that other kinds of temperature control systems for controlling the temperatures of first and second dough preparation chambers independently can be used without departing from the scope of the present invention. For example, instead of using a multiplexed refrigeration system to cool the chambers, other separate refrigeration systems can be provided. Likewise, other heating systems having other numbers or types of heating elements can be used. Other variations are also possible. Moreover, it will be appreciated that the illustrated temperature control system operates as a closed-loop system, but open-loop or time-based systems (e.g., without sensors) can be used without departing from the scope of the present invention. Moreover, it will be understood that other numbers and/or other types of chamber conditioning systems can be provided without departing from the scope of the present invention.

The control system 2018 of the dough preparation apparatus 2010 including the controller (e.g., dough preparation controller), can be essentially the same as the control system 1018 described above with respect to FIG. 42. Moreover, the control system can be used to implement recipes as explained with respect to FIGS. 43-46 and/or recipes described with respect to other embodiments. Moreover, the left and right chambers 2014 and 2015 can be used in the manners described above with respect to the chambers 1014 and 1015.

In one example method of using the dough preparation apparatus 2010, frozen dough is taken from a freezer and placed in a chamber 2014, 2015. The dough can be left in the chamber overnight to thaw. A thawing or slacking recipe pre-programmed in the control system is executed (e.g., by actuation of an actuator on the user interface) to slowly thaw the dough and hold it in a thawed or slacked state. For example, a refrigeration set point of 34 degrees F. can be used with suitable hysteresis routine. It will be appreciated that the refrigeration system may not turn on for some time, because the frozen dough cools the chamber sufficiently to prevent the temperature sensor from indicating cooling is needed. When the employee arrives the following morning, the dough is thawed or slacked and being refrigerated according to the thawing or slacking recipe. The employee can actuate an actuator on the user interface of the controller to end the thawing or slacking recipe and begin a "prep mode" in which the heating system is operated according to a conditioning recipe at a set point of 65 degrees F. for 10 minutes, during which time the chamber may rise to 50 to 55 degrees F. After the 10 minutes, the heating system is turned off, and refrigeration begins at a set point of 50 degrees F. A suitable alarm can sound to notify the employee that the prep mode has ended and the dough is ready to be prepared. The employee can remove the dough and prepare it, such as by stretching and seasoning the dough. At this time the dough is ready for moving to an oven for proofing/baking. Alternatively, the dough can be held in the chamber at the 50 degrees F. refrigeration set point for up to 4 hours (e.g., which can be signaled to employee by the control system by a suitable audible and/or visible alarm) before moving the dough to the oven. Yeast in the dough will likely be activated when the dough reaches an internal temperature of about 36 degrees F., and the dough can be held in the preparation apparatus for only a limited amount of time after activation of the yeast. It will be appreciated that the preparation apparatus provides a controlled, consistent means of preparing dough before proofing and baking that results in better bread.

The Title, Field of Invention, and Background are provided to help the reader quickly ascertain the nature of the technical disclosure. They are submitted with the understanding that they will not be used to interpret or limit the scope or meaning of the claims. They are provided to introduce a selection of concepts in simplified form that are further described in the Detailed Description. The Title, Field of Invention, and Background are not intended to identify key features or essential features of the claimed subject matter, nor is it intended to be used as an aid in determining the claimed subject matter.

For purposes of illustration, programs and other executable program components, such as the operating system, are illustrated herein as discrete blocks. It is recognized, however, that such programs and components reside at various times in different storage components of a computing device, and are executed by a data processor(s) of the device.

Although described in connection with an exemplary computing system environment, embodiments of the aspects of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well-known computing systems, environments, and/or configurations that may be suitable for use with aspects of the invention include, but are not limited to, personal computers, server computers, handheld or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the invention may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments of the aspects of the invention may be implemented with processor-executable instructions. The processor-executable instructions may be organized into one or more processor-executable components or modules on a tangible processor readable storage medium. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and methods without departing from the scope of aspects of the invention. In the preceding specification, various embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

What is claimed is:

1. A dough preparation apparatus comprising:
a cabinet defining a dough preparation chamber;
recirculation ducting for recirculating air from the dough preparation chamber back to the dough preparation chamber;
a fan configured to move air in the recirculation ducting from the dough preparation chamber back to the dough preparation chamber;
a heating element outside the recirculation ducting configured to heat air in the recirculation ducting while the air is in the recirculation ducting, the heating element being positioned to heat a first portion of the recirculation ducting;
a cooling element outside the recirculation ducting configured to cool air in the recirculation ducting while the air is in the recirculation ducting, the cooling element being positioned to cool a second portion of the recirculation ducting positioned higher than the first portion; and
a dough preparation controller configured to operate the fan and said at least one of the heating element or cooling element for preparing dough in the dough preparation chamber.

2. A dough preparation apparatus as set forth in claim 1 wherein the heating element is in conductive heat transfer contact with an outside surface of a portion of the recirculation ducting for heating the first portion of the recirculation ducting by conduction.

3. A dough preparation apparatus as set forth in claim 2 wherein the cooling element is in conductive heat transfer contact with an outside surface of a portion of the recirculation ducting for cooling the second portion of the recirculation ducting by conduction.

4. A dough preparation apparatus as set forth in claim 3, wherein the cooling element is positioned higher than the dough preparation chamber.

5. A dough preparation apparatus as set forth in claim 3 wherein the cooling element is thermally coupled to the outside surface of the recirculation ducting by a thermal mastic.

6. A dough preparation apparatus as set forth in claim 1 wherein the heating element is positioned lower than the dough preparation chamber.

7. A dough preparation apparatus as set forth in claim 1, wherein the heating element and the cooling element are out of direct contact with the air in the recirculation ducting.

8. A dough preparation apparatus as set forth in claim 1, wherein the recirculation ducting extends from an outlet of the dough preparation chamber to an inlet of the dough preparation chamber.

9. A dough preparation apparatus as set forth in claim 1, wherein one or more walls of the recirculation ducting partition the heating element and the cooling element from an interior of the recirculation ducting through which air moves.

10. A dough preparation apparatus as set forth in claim 1, wherein the heating element and the cooling element are isolated from air that flows through the recirculation ducting.

11. A dough preparation apparatus as set forth in claim 1, wherein at least one of the heating element or the cooling element is isolated from air that flows through the recirculation ducting.

12. A dough preparation apparatus comprising:
a cabinet defining a dough preparation chamber;
recirculation ducting for recirculating gas from the dough preparation chamber back to the dough preparation chamber, the recirculation ducting including an outlet for supplying air from the recirculation ducting to the dough preparation chamber and including an inlet for exhausting air from the dough preparation chamber to the recirculation ducting, and the recirculation ducting including a return duct portion extending downstream from the outlet to said inlet for bypassing the dough preparation chamber;
a fan configured to move air in the recirculation ducting for moving the air from the dough preparation chamber back to the dough preparation chamber; and
a heating element configured to heat air in the recirculation ducting or a cooling element configured to cool air in the recirculation ducting; and
a dough preparation controller configured to operate the fan and said at least one of the heating element or cooling element for preparing dough in the dough preparation chamber;
wherein the dough preparation chamber includes a left portion and a right portion, the outlet is a first outlet associated with the left chamber portion, the inlet is a first inlet associated with the left chamber portion, and the return duct portion is a first return duct portion associated with the left chamber portion, the recirculation ducting further comprising a second outlet associated with the right chamber portion, a second inlet associated with the right chamber portion, and a second return duct portion associated with the right chamber portion, the second return duct portion extending downstream from the second outlet to said second inlet for bypassing the dough preparation chamber.

13. A dough preparation apparatus as set forth in claim 12 wherein the recirculation ducting provides a loop air flow path in the recirculation ducting extending downstream from the fan back to the fan without entering the dough preparation chamber.

14. A dough preparation apparatus as set forth in claim 12 wherein the outlet is positioned on a first side of the dough preparation chamber and the inlet is provided on a second side of the dough preparation chamber opposite the first side.

15. A dough preparation apparatus as set forth in claim 12 wherein the at least one of a heating element or a cooling element comprises a heating element and a cooling element, the heating element being positioned lower than the cooling element.

16. A dough preparation apparatus as set forth in claim 15 wherein the fan is configured for moving air in an inclusive range of 5 to 60 cfm.

17. A dough preparation apparatus as set forth in claim 12 wherein said at least one of the heating element or cooling element is positioned outside the recirculation ducting and is in conductive heat transfer contact with the recirculation ducting for heating or cooling air in the recirculation ducting.

* * * * *